US 8,117,370 B2

(12) United States Patent
Rofougaran et al.

(10) Patent No.: US 8,117,370 B2
(45) Date of Patent: Feb. 14, 2012

(54) IC FOR HANDHELD COMPUTING UNIT OF A COMPUTING DEVICE

(75) Inventors: Ahmadreza (Reza) Rofougaran, Newport Coast, CA (US); Timothy W. Markison, Lahaina, HI (US)

(73) Assignee: Broadcom Corporation, Irvine, CA (US)

( * ) Notice: Subject to any disclaimer, the term of this patent is extended or adjusted under 35 U.S.C. 154(b) by 66 days.

(21) Appl. No.: 12/026,689

(22) Filed: Feb. 6, 2008

(65) Prior Publication Data

US 2009/0198855 A1    Aug. 6, 2009

(51) Int. Cl.
G06F 13/00    (2006.01)
(52) U.S. Cl. .................. 710/303; 710/104; 710/304
(58) Field of Classification Search .................. 710/303, 710/104, 304
See application file for complete search history.

(56) References Cited

U.S. PATENT DOCUMENTS

| | | | |
|---|---|---|---|
| 4,807,183 A | 2/1989 | Kung | |
| 5,502,683 A | 3/1996 | Marchioro | |
| 5,754,948 A | 5/1998 | Metze | |
| 5,786,912 A | 7/1998 | Kartalopoulos | |
| 5,809,321 A | 9/1998 | Hansen | |
| 5,884,104 A | 3/1999 | Chase | |
| 6,182,203 B1 | 1/2001 | Simar | |
| 6,438,622 B1 | 8/2002 | Haghighi | |
| 6,500,070 B1 | 12/2002 | Tomizawa et al. | |
| 6,663,295 B2 | 12/2003 | Kami et al. | |
| 6,735,663 B2 * | 5/2004 | Watts et al. ................. 710/313 |
| 6,735,708 B2 | 5/2004 | Watts, Jr. | |
| 6,801,974 B1 | 10/2004 | Watts, Jr. et al. | |
| 6,816,925 B2 * | 11/2004 | Watts, Jr. ................. 710/36 |
| 7,065,326 B2 | 6/2006 | Lovberg | |
| 7,082,285 B2 | 7/2006 | Linde | |
| 7,149,837 B2 | 12/2006 | Watts, Jr. et al. | |
| 7,159,099 B2 | 1/2007 | Lucas | |
| 7,171,050 B2 | 1/2007 | Kim | |
| 7,197,584 B2 | 3/2007 | Huber et al. | |

(Continued)

FOREIGN PATENT DOCUMENTS

EP    1499070 A2    1/2005

(Continued)

OTHER PUBLICATIONS

Dr. Lynn Fuller, "Microelectromechanical Systems (MEMs) Applications—Microphones," Rochester Institute of Technology Microelectronic Engineering, Apr. 25, 2005, pp. 1-43.

(Continued)

*Primary Examiner* — Paul R. Myers
*Assistant Examiner* — Jeremy S Cerullo
(74) *Attorney, Agent, or Firm* — Garlick Harrison & Markison; Kevin L. Smith

(57) ABSTRACT

An IC includes a processing module, on-chip memory, one or more block input/output (I/O) interfaces for coupling to one or more off-chip block I/O devices, one or more character I/O interfaces for coupling to one or more off-chip character I/O devices when active, a main memory interface for coupling to off-chip main memory, a baseband processing module, an RF section, a processing module interface, and an IC bus structure. The processing module interface couples the processing module to an off-chip connection structure, wherein, when a handheld computing unit that includes the IC is docked to an extended computing unit, the off-chip connection structure couples the handheld computing unit to the extended computing unit such that the IC is in a docked mode.

18 Claims, 41 Drawing Sheets

U.S. PATENT DOCUMENTS

| | | |
|---|---|---|
| 7,218,143 B1 | 5/2007 | Young |
| 7,257,093 B1 | 8/2007 | Witzke |
| 7,330,702 B2 | 2/2008 | Chen et al. |
| 7,406,062 B2 | 7/2008 | Hsu |
| 7,444,393 B2 | 10/2008 | Chung |
| 7,903,724 B2 | 3/2011 | Rofougaran |
| 7,929,474 B2 | 4/2011 | Pettus |
| 2002/0022521 A1 | 2/2002 | Idaka |
| 2002/0049806 A1 | 4/2002 | Gatz et al. |
| 2002/0061012 A1 | 5/2002 | Thi |
| 2002/0107010 A1 | 8/2002 | Witte |
| 2002/0164945 A1 | 11/2002 | Olsen |
| 2003/0001882 A1 | 1/2003 | Macer et al. |
| 2003/0017845 A1 | 1/2003 | Doviak |
| 2003/0040284 A1 | 2/2003 | Sato |
| 2003/0059022 A1 | 3/2003 | Nebiker |
| 2003/0078071 A1 | 4/2003 | Uchimyama |
| 2003/0112585 A1 | 6/2003 | Silvester |
| 2003/0126335 A1 | 7/2003 | Silvester |
| 2003/0128712 A1 | 7/2003 | Moriwaki |
| 2003/0162503 A1 | 8/2003 | LeCren |
| 2003/0172380 A1 | 9/2003 | Kikinis |
| 2003/0221036 A1 | 11/2003 | Konetski |
| 2004/0054776 A1 | 3/2004 | Klotz |
| 2004/0062308 A1 | 4/2004 | Kamosa |
| 2004/0117442 A1 | 6/2004 | Thielen |
| 2004/0123113 A1 * | 6/2004 | Mathiassen et al. .......... 713/185 |
| 2004/0153863 A1 | 8/2004 | Klotz |
| 2004/0157559 A1 | 8/2004 | Sugikawa |
| 2004/0174431 A1 | 9/2004 | Stienstra |
| 2004/0203364 A1 | 10/2004 | Silvester |
| 2004/0266336 A1 | 12/2004 | Patsiokas et al. |
| 2005/0014468 A1 | 1/2005 | Salokannel |
| 2005/0060598 A1 | 3/2005 | Klotz |
| 2005/0124307 A1 | 6/2005 | Ammar et al. |
| 2005/0185364 A1 | 8/2005 | Bell |
| 2005/0250531 A1 | 11/2005 | Takebe et al. |
| 2006/0026348 A1 | 2/2006 | Wallace |
| 2006/0038731 A1 | 2/2006 | Turner |
| 2006/0046762 A1 | 3/2006 | Yoon et al. |
| 2006/0085675 A1 | 4/2006 | Popell |
| 2006/0101164 A1 | 5/2006 | Lee |
| 2006/0148568 A1 | 7/2006 | Schultz et al. |
| 2006/0164271 A1 | 7/2006 | Hirt |
| 2006/0167784 A1 | 7/2006 | Hoffberg |
| 2006/0176851 A1 | 8/2006 | Bennett |
| 2006/0190691 A1 | 8/2006 | Chauve |
| 2006/0203758 A1 | 9/2006 | Tee et al. |
| 2006/0252470 A1 | 11/2006 | Seshadri |
| 2006/0260546 A1 | 11/2006 | Usami |
| 2006/0262026 A1 | 11/2006 | Gainey et al. |
| 2006/0269004 A1 | 11/2006 | Ibrahim |
| 2006/0282635 A1 | 12/2006 | Mather |
| 2007/0015558 A1 | 1/2007 | Zalewski et al. |
| 2007/0038808 A1 | 2/2007 | Yim |
| 2007/0147152 A1 | 6/2007 | Sekiguchi |
| 2007/0155502 A1 | 7/2007 | Wu |
| 2007/0167149 A1 | 7/2007 | Comstock |
| 2007/0229270 A1 | 10/2007 | Rofougaran |
| 2007/0239929 A1 | 10/2007 | Chen |
| 2007/0268481 A1 | 11/2007 | Raskar et al. |
| 2007/0298882 A1 | 12/2007 | Marks et al. |
| 2008/0020843 A1 | 1/2008 | Wolinsky |
| 2008/0028118 A1 | 1/2008 | Sayers et al. |
| 2008/0040541 A1 | 2/2008 | Brockmann |
| 2008/0063236 A1 | 3/2008 | Ikenoue et al. |
| 2008/0070516 A1 | 3/2008 | Lee |
| 2008/0076406 A1 | 3/2008 | Chen |
| 2008/0151847 A1 | 6/2008 | Abujbara |
| 2009/0006640 A1 | 1/2009 | Brouwer |
| 2009/0198854 A1 | 8/2009 | Rofougaran |
| 2009/0215533 A1 | 8/2009 | Zalewski et al. |
| 2010/0146199 A1 | 6/2010 | Shaeffer |

FOREIGN PATENT DOCUMENTS

WO 2009002464 A2 12/2008

OTHER PUBLICATIONS

Radio Control Adapter; IBM Technical Disclosure Bulletin NN86081337; IBM; Aug. 1986.

XILINX Inc.: Spartan-3AN FPGA Family Data Sheet, DS557, Jun. 2, 2008, pp. 5.

Elsadek, et al.; "A Compact 3-D Microwave Holographic Pointer System Using a Size Reduced Microstrip Planar Array"; Department of Electrical and Computer Engineering; University of California; pp. 1-5, 2001.

Elsadek, et al.; "Microstrip Multi-element Diversity Antenna Array for Three Dimensional Microwave Holographic Input Pointer (Holo3D)"; Department of Electrical and Computer Engineering; University of California; pp. 1-4, date unknown.

E3 Wii Controller; Nintendo Wilmote; Technology Limitations; XGaming, Inc.; pp. 1-5, 2005.

\* cited by examiner

| devices | HH remote | HH Quasi docked | HH docked |
|---|---|---|---|
| power supply | HH – batt.: EXT – PS (off) | HH – batt.: EXT – PS (on) | HH – PS &/or BC: EXT – PS (on) |
| removable drive | HH – none: EXT-maybe (off) | HH – none: EXT-maybe (off) | HH – none: EXT-maybe (on) |
| CD-ROM/DVD-ROM drive | HH-no: EXT-yes (off) | HH-no: EXT-yes (off) | HH-no: EXT-yes (on) |
| Tape Drive | HH-no: EXT-maybe (off) | HH-no: EXT-maybe (off) | HH-no: EXT-maybe (on) |
| Hard Drive | HH-mini (on): EXT-maybe (off) | HH-mini (on): EXT-maybe (on) | HH-mini (on): EXT-maybe (on) |
| Floppy Drive | HH-no: EXT-maybe (off) | HH-no: EXT-maybe (on) | HH-no: EXT-maybe (on) |
| Host controller | HH-no: EXT-yes (off) | HH-no: EXT-yes (on) | HH-no: EXT-yes (on) |
| AGP expansion slot | HH-no: EXT-yes (off) | HH-no: EXT-yes (on) | HH-no: EXT-yes (on) |
| PCI expansion slot | HH-ind. interface: EXT-yes (off) | HH-ind. interface: EXT-yes (on) | HH-ind. interface: EXT-yes (on) |
| Video card | HH-LCD (on): EXT-yes (off) | HH-LCD (on): EXT-yes (on/off) | HH-LCD (off): EXT-yes (on) |
| sound card | HH-codec (on): EXT-yes (off) | HH-codec (on): EXT-yes (on/off) | HH-codec (off): EXT-yes (on) |
| RAM | HH-yes (on): EXT-yes (off) | HH-yes (on): EXT-yes (on/off) | HH-yes (on/off): EXT-yes (on) |
| RTC | HH-yes (on): EXT-no | HH-yes (on): EXT-no | HH-yes (on): EXT-no |
| CMOS memory (config info) | HH-yes (on): EXT-maybe (on) | HH-yes (on): EXT-maybe (on) | HH-yes (on): EXT-maybe (on) |
| BIOS | HH-yes (on): EXT-maybe (off) | HH-yes (on): EXT-maybe (off) | HH-yes (on): EXT-maybe (on) |
| Microprocessor | HH-yes (on): EXT-yes (off) | HH-yes (on): EXT-yes (on/off) | HH-yes (on/off): EXT-yes (on) |
| USB | HH-yes (on): EXT-yes (off) | HH-yes (on): EXT-yes (on/off) | HH-yes (on/off): EXT-yes (on) |
| Mouse port | HH-no: EXT-yes (off) | HH-no: EXT-yes (off) | HH-no: EXT-yes (on) |
| keyboard port | HH-keypad (on): EXT-yes (off) | HH-keypad (on): EXT-yes (off) | HH-keypad (on/off): EXT-yes (on) |
| Network connection | HH-yes (on): EXT-yes (off) | HH-yes (on): EXT-yes (on/off) | HH-yes (on/off): EXT-yes (on) |
| Parallel port | HH-no: EXT-yes (off) | HH-no: EXT-yes (on/off) | HH-no: EXT-yes (on) |
| Serial ports | HH-maybe: EXT-maybe (off) | HH-maybe: EXT-maybe (on/off) | HH-maybe: EXT-maybe (on) |
| Flash memory card slot | HH-yes (on): EXT-maybe (off) | HH-yes (on): EXT-maybe (on/off) | HH-yes (on): EXT-maybe (on) |
| cell phone | HH-yes (on): EXT-VoIP (off) | HH-yes (on): EXT-VoIP (off) | HH-yes (transfer): EXT-VoIP (on) |

FIG. 19

IC FOR HANDHELD COMPUTING UNIT OF A COMPUTING DEVICE

CROSS REFERENCE TO RELATED PATENTS

This invention is related to the following co-pending patent applications:

COMPUTING DEVICE WITH HANDHELD AND EXTENDED COMPUTING UNITS, having the same filing date as the present application, having a Ser. No. 12/026,681, and A/V CONTROL FOR A COMPUTING DEVICE WITH HANDHELD AND EXTENDED COMPUTING UNITS, having the same filing date as the present application, having a Ser. No. 12/026,704.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to communication systems and more particularly to computing devices used in such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless or wired networks. The wireless and/or wire lined communication devices may be personal computers, laptop computers, personal digital assistants (PDA), cellular telephones, personal digital video players, personal digital audio players, global positioning system (GPS) receivers, video game consoles, entertainment devices, etc.

Many of the communication devices include a similar basic architecture: that being a processing core, memory, and peripheral devices. In general, the memory stores operating instructions that the processing core uses to generate data, which may also be stored in the memory. The peripheral devices allow a user of the communication device to direct the processing core as to which operating instructions to execute, to enter data, etc. and to see the resulting data. For example, a personal computer includes a keyboard, a mouse, and a display, which a user uses to cause the processing core to execute one or more of a plurality of applications.

While the various communication devices have a similar basic architecture, they each have their own processing core, memory, and peripheral devices and provide distinctly different functions. For example, a cellular telephone is designed to provide wireless voice and/or data communications in accordance with one or more wireless communication standards (e.g., IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof). As another example, a personal digital audio player is designed to decompress a stored digital audio file and render the decompressed digital audio file audible.

Over the past few years, integration of the some of the communication device functions into a single device has occurred. For example, many cellular telephones now offer personal digital audio playback functions, PDA functions, and/or GPS receiver functions. Typically, to load one or more of these functions, files, or other applications onto a handheld communication device (e.g., a cellular telephone, a personal digital audio and/or video player, a PDA, a GPS receiver), the handheld communication device needs to be coupled to a personal computer or laptop computer. In this instance, the desired application, function, and/or file is first loaded on to the computer and then copied to the handheld communication device; resulting in two copies of the application, function, and/or file.

To facilitate such loading of the application, function, and/or file in this manner, the handheld communication device and the computer each require hardware and corresponding software to transfer the application, function, and/or file from the computer to the handheld communication device. As such, two copies of the corresponding software exist as well as having two hardware components (one for the handheld device and the second for the computer). In addition to the redundancy of software, timing issues, different versions of the software, incompatible hardware, and a plethora of other reasons cause the transfer of the application, function, and/or file to fail.

In addition to integration of some functions into a single handheld device, handheld digital audio players may be docked into a speaker system to provide audible signals via the speakers as opposed to a headphone. Similarly, a laptop computer may be docked to provide connection to a full size keyboard, a separate monitor, a printer, and a mouse. In each of these docking systems, the core architecture is not changed.

Therefore, a need exists for a computing device that includes a handheld computing unit and an extended computing unit.

BRIEF SUMMARY OF THE INVENTION

The present invention is directed to apparatus and methods of operation that are further described in the following Brief Description of the Several Views of the Drawing(s), the Detailed Description of the Drawings, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 19 is a table of an example of devices within a handheld computing unit and extended computing unit that may be active in various modes in accordance with the present invention;

DETAILED DESCRIPTION OF THE DRAWINGS

Figure 1:
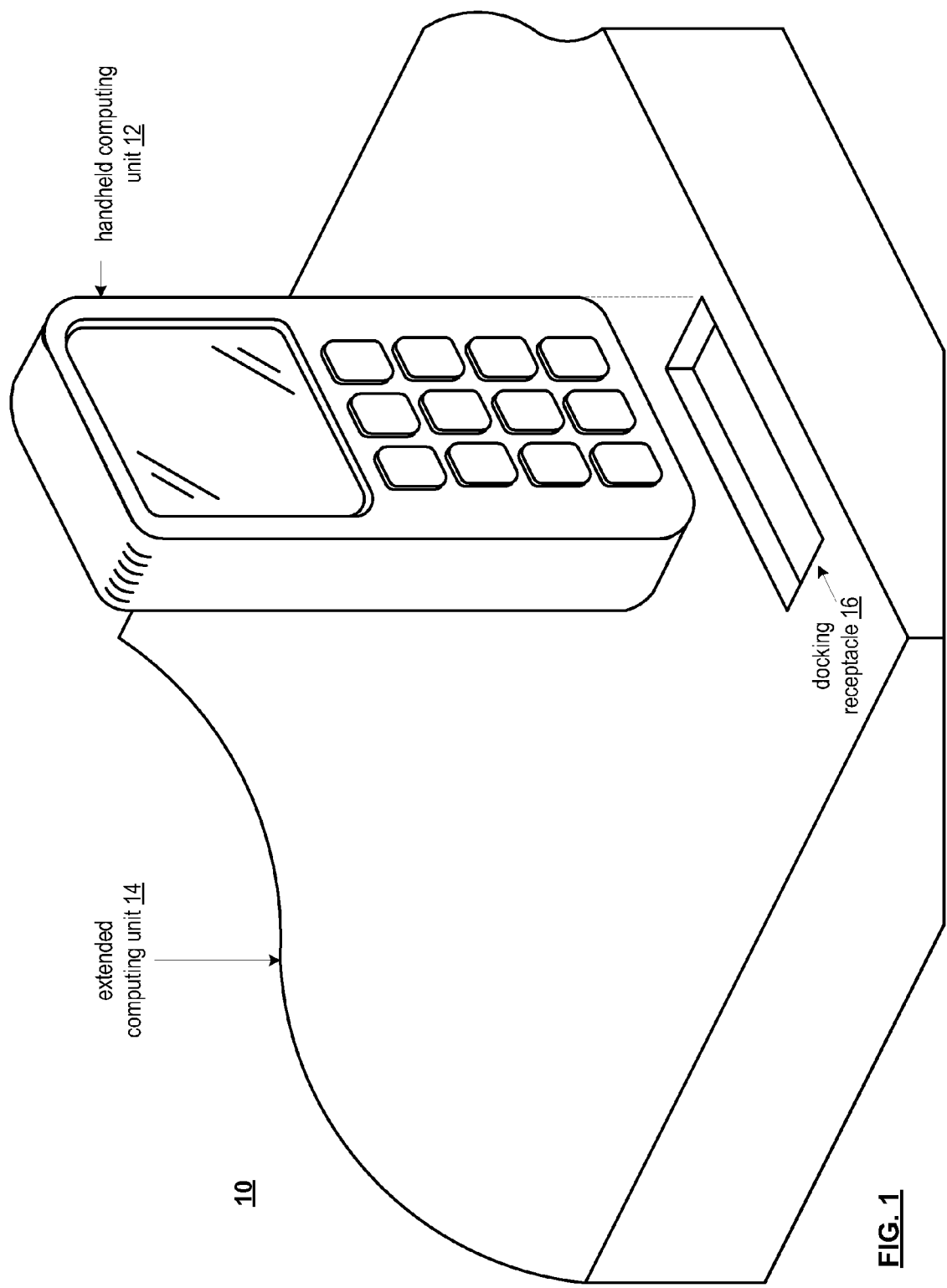
FIG. 1 is a diagram of an embodiment of a handheld computing unit and an extended computing unit in accordance with the present invention.

FIG. 1 is a diagram of an embodiment of a computing device 10 that includes a a handheld computing unit 12 and an extended computing unit 14. The handheld computing unit 12 may have a form factor similar to a cellular telephone, personal digital assistant, personal digital audio/video player, etc. and includes a connector structure that couples to a docketing receptacle 16 of the extended computing unit 14.

In general, the handheld computing unit 12 includes the primary processing module (e.g., central processing unit), the primary main memory, and the primary hard disk memory for the computing device 10. In this manner, the handheld computing unit 12 functions as the core of a personal computer (PC) or laptop computer when it is docked to the extended computing unit and functions as a cellular telephone, a GPS receiver, a personal digital audio player, a personal digital video player, a personal digital assistant, and/or other handheld electronic device when it is not docked to the extended computing unit.

In addition, when the handheld computing unit 12 is docked to the extended computing unit 14, files and/or applications can be swapped therebetween. For example, assume that the user of the computing device 10 has created a presentation using presentation software and both reside in memory of the extended computing unit 14. The user may elect to transfer the presentation file and the presentation software to memory of the handheld computing unit 12. If the handheld computing unit 12 has sufficient memory to store the presentation file and application, then it is copied from the extended computing unit memory to the handheld computing unit memory. If there is not sufficient memory in the handheld computing unit, the user may transfer an application and/or file from the handheld computing unit memory to the extended computing unit memory to make room for the presentation file and application.

With the handheld computing unit 12 including the primary components for the computing device 10, there is only one copy of an application and/or of a file to support PC functionality, laptop functionality, and a plurality of handheld device functionality (e.g., TV, digital audio/video player, cell phone, PDA, GPS receiver, etc.). In addition, since only one copy of an application and/or of a file exists (other than desired backups), special software to transfer the applications and/or files from a PC to a handheld device is no longer needed. As such, the processing module, main memory, and I/O interfaces of the handheld computing unit 12 provide a single core architecture for a PC and/or a laptop, a cellular telephone, a PDA, a GPS receiver, a personal digital audio player, a personal digital video player, etc.

Figure 2:
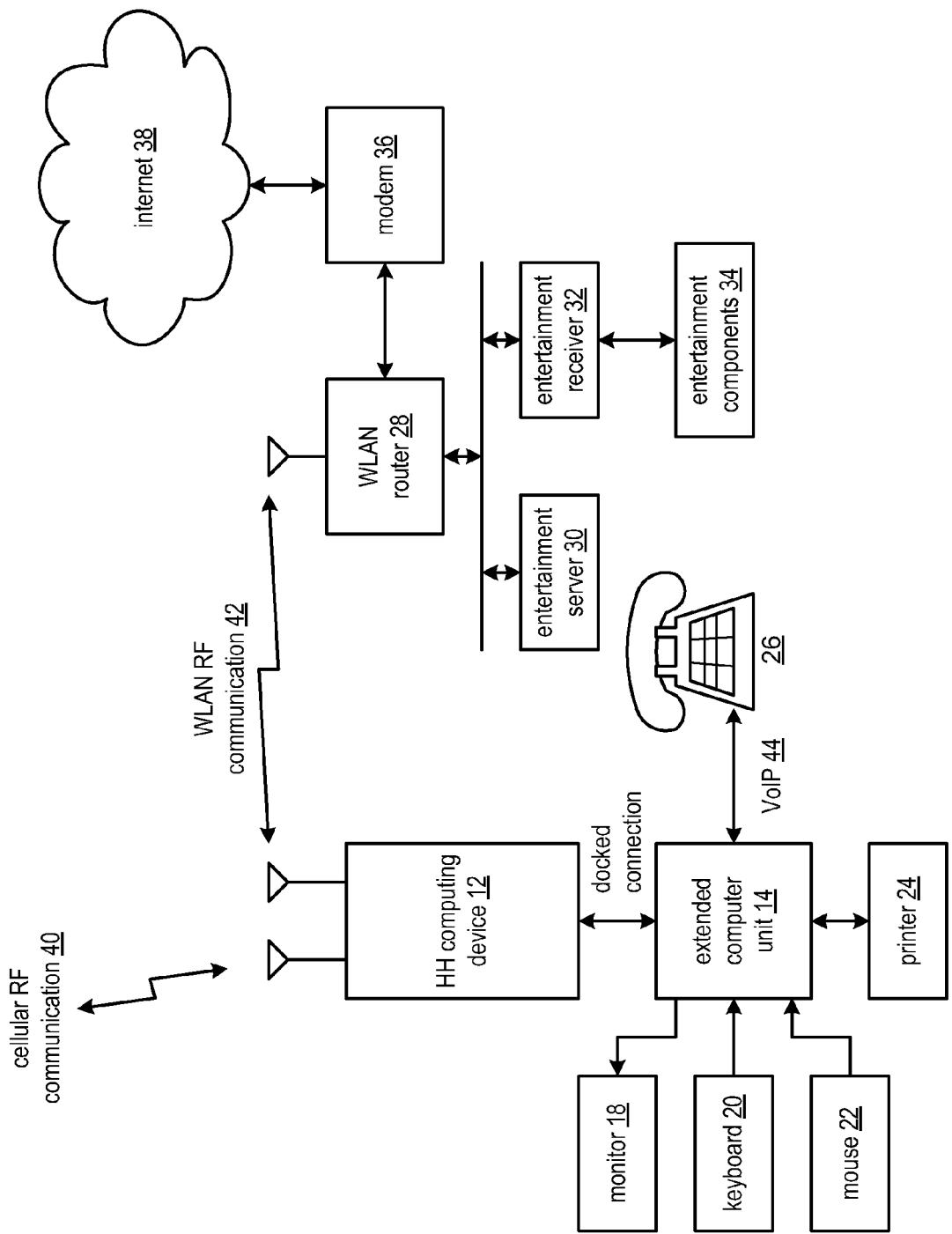
FIG. 2 is a schematic block diagram of an embodiment of a handheld computing unit docked to an extended computing unit within a communication system in accordance with the present invention.

FIG. 2 is a schematic block diagram of an embodiment of a handheld computing unit 12 docked to an extended computing unit 14 within a communication system. In this embodiment, the communication system may include one or more of a wireless local area network (WLAN) router 28, a modem 36 coupled to the internet 38, an entertainment server 30 (e.g., a server coupled to database of movies, music, video games, etc.), an entertainment receiver 32, entertainment components 34 (e.g., speaker system, television monitor and/or projector, DVD (digital video disc) player or newer versions thereof, VCR (video cassette recorder), satellite set top box, cable set top box, video game console, etc.), and a voice over internet protocol (VoIP) phone 26. As an alternative or in addition to the WLAN router 28, the system may include a local area network (LAN) router coupled to the extended computing unit 14.

As is also shown, the extended computing unit 14 is coupled to a monitor 18, a keyboard, a mouse 22, and a printer 24. The extended computing unit 14 may also be coupled to other devices (not shown) such as a trackball, touch screen, gaming devices (e.g., joystick, game pad, game controller, etc.), an image scanner, a webcam, a microphone, speakers, and/or a headset. In addition, the extended computing unit 14 may have a form factor similar to a personal computer and/or a laptop computer. For example, for in-home or in-office use, having the extended computing unit with a form factor similar to a PC may be desirable. As another example, for traveling users, it may be more desirable to have a laptop form factor.

In this example, the handheld computing unit 12 is docked to the extended computer unit 14 and function together to provide the computing device 10. The docking of the handheld computing unit 12 to the extended computing unit 14 encompasses one or more high speed connections between the units 12 and 14. Such a high speed connection may be provided by an electrical connector, by an RF connector (an example is discussed with reference to FIG. 45), by an electromagnetic connector (an example is discussed with reference to FIG. 46), and/or a combination thereof. In this mode, the handheld computing unit 12 and the extended computing 14 collectively function similarly to a personal computer and/or laptop computer with a WLAN card and a cellular telephone card.

In this mode, the handheld computing unit 12 may transceive cellular RF communications 40 (e.g., voice and/or data communications). Outgoing voice signals may originate at the VoIP phone 26 as part of a VoIP communication 44 or a microphone coupled to the extended computing unit 14. The outgoing voice signals are converted into digital signals that are subsequently converted to outbound RF signals. Inbound RF signals are converted into incoming digital audio signals and that may be provided to a sound card within the extended computing unit for presentation on speakers or provided to the VoIP phone via as part of a VoIP communication 44.

Outgoing data signals may originate at the mouse 22, keyboard 20, image scanner, etc. coupled to the extended computing unit 14. The outgoing data signals are converted into digital signals that are subsequently converted to outbound RF signals. Inbound RF signals are converted into incoming data signals and that may be provided to the monitor 18, the printer 24, and/or other character presentation device.

In addition, the handheld computing unit 12 may provide a WLAN transceiver for coupling to the WLAN router 28 to support WLAN RF communications 42 for the computing device 10. The WLAN communications 42 may be for accessing the internet 38 via modem 36, for accessing the entertainment server, and/or accessing the entertainment receiver 32. For example, the WLAN communications 42 may be used to support surfing the web, receiving emails, transmitting emails, accessing on-line accounts, accessing on-line games, accessing on-line user files (e.g., databases, backup files, etc.), downloading music files, downloading video files, downloading software, etc. As another example, the computing device 10 (i.e., the handheld computing unit 12 and the extended computing unit 14) may use the WLAN communications 42 to retrieve and/or store music and/or video files on the entertainment server; and/or to access one or more of the entertainment components 34 and/or the entertainment receiver 32.

Figure 3:
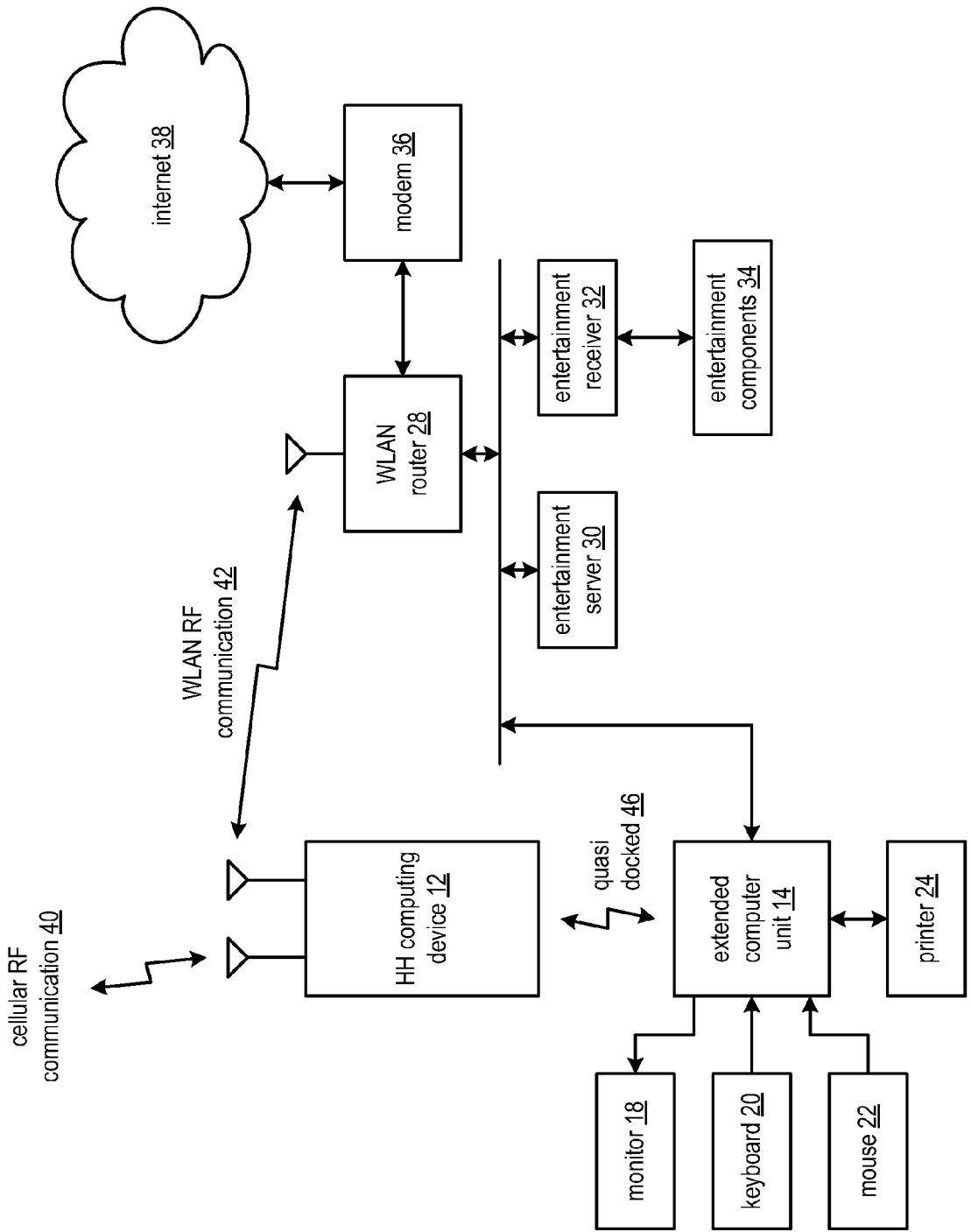
FIG. 3 is a schematic block diagram of an embodiment of a handheld computing unit quasi docked to an extended computing unit within a communication system in accordance with the present invention.

FIG. 3 is a schematic block diagram of an embodiment of a handheld computing unit 12 quasi docked to an extended computing unit 14 within a communication system. In this embodiment, the communication system may include one or more of a wireless local area network (WLAN) router 28, a modem 36 coupled to the internet 38, an entertainment server 30 (e.g., a server coupled to database of movies, music, video games, etc.), an entertainment receiver 32, entertainment components 34 (e.g., speaker system, television monitor and/or projector, DVD (digital video disc) player or newer versions thereof, VCR (video cassette recorder), satellite set top box, cable set top box, video game console, etc.), and a voice over internet protocol (VoIP) phone 26. As an alternative or in addition to the WLAN router 28, the system may include a local area network (LAN) router coupled to the extended computing unit 14.

As is also shown, the extended computing unit 14 is coupled to a monitor 18, a keyboard, a mouse 22, and a printer 24. The extended computing unit 14 may also be coupled to other devices (not shown) such as a trackball, touch screen, gaming devices (e.g., joystick, game pad, game controller, etc.), an image scanner, a webcam, a microphone, speakers, and/or a headset. In addition, the extended computing unit 14 may have a form factor similar to a personal computer and/or a laptop computer.

In this example, the handheld computing unit 12 is quasi docked 46 to the extended computer unit 14, where the handheld computing unit 12 functions as a stand-alone computer with limited resources (e.g., processing modules, user inputs/outputs, main memory, etc. of the handheld computing unit) and limited access to the memory of the extended computing unit 14. The quasi docking 46 of the handheld computing unit 12 to the extended computing unit 14 is provided by an RF communication, where an RF transceiver of the handheld computing unit 12 is communicating with an RF transceiver of the extended computing unit 14. Depending on the bit rate of the RF connection, the handheld computing unit can access files and/or applications stored in memory of the extended computing unit 14. In addition, the handheld computing unit 12 may direct the processing module of the extended computing unit 14 to perform a remote co-processing function, but the processing module of the handheld computing unit and the extended computing unit do not function as a multi-processing module as they do when in the docked mode.

As an alternative, the quasi docked mode may be achieved by the handheld computing unit 12 communicating with the extended computing unit via the WLAN communication 42 and the WLAN router 28. As yet another example, the quasi docked mode may be achieved via a data cellular RF communication 40 via the internet 38 to the extended computing unit 14.

In this mode, the handheld computing unit 12 may transceive cellular RF communications 40 (e.g., voice and/or data communications). Outgoing voice signals originate at a microphone of the handheld computing unit 12. The outgoing voice signals are converted into digital signals that are subsequently converted to outbound RF signals. Inbound RF signals are converted into incoming digital audio signals and that are provided to a speaker, or headphone jack, of the handheld computing unit 12.

Outgoing data signals originate at a keypad or touch screen of the handheld computing unit 12. The outgoing data signals are converted into digital signals that are subsequently converted to outbound RF signals. Inbound RF signals are converted into incoming data signals that are provided to the handheld display and/or other handheld character presentation device.

In addition, the handheld computing unit 12 may provide a WLAN transceiver for coupling to the WLAN router 28 to support WLAN RF communications 42 with the WLAN router 28. The WLAN communications 42 may be for accessing the internet 38 via modem 36, for accessing the entertainment server, and/or accessing the entertainment receiver 32. For example, the WLAN communications 42 may be used to support surfing the web, receiving emails, transmitting emails, accessing on-line accounts, accessing on-line games, accessing on-line user files (e.g., databases, backup files, etc.), downloading music files, downloading video files, downloading software, etc. As another example, the handheld computing unit 12 may use the WLAN communications 42 to retrieve and/or store music and/or video files on the entertainment server; and/or to access one or more of the entertainment components 34 and/or the entertainment receiver 32.

Figure 4:
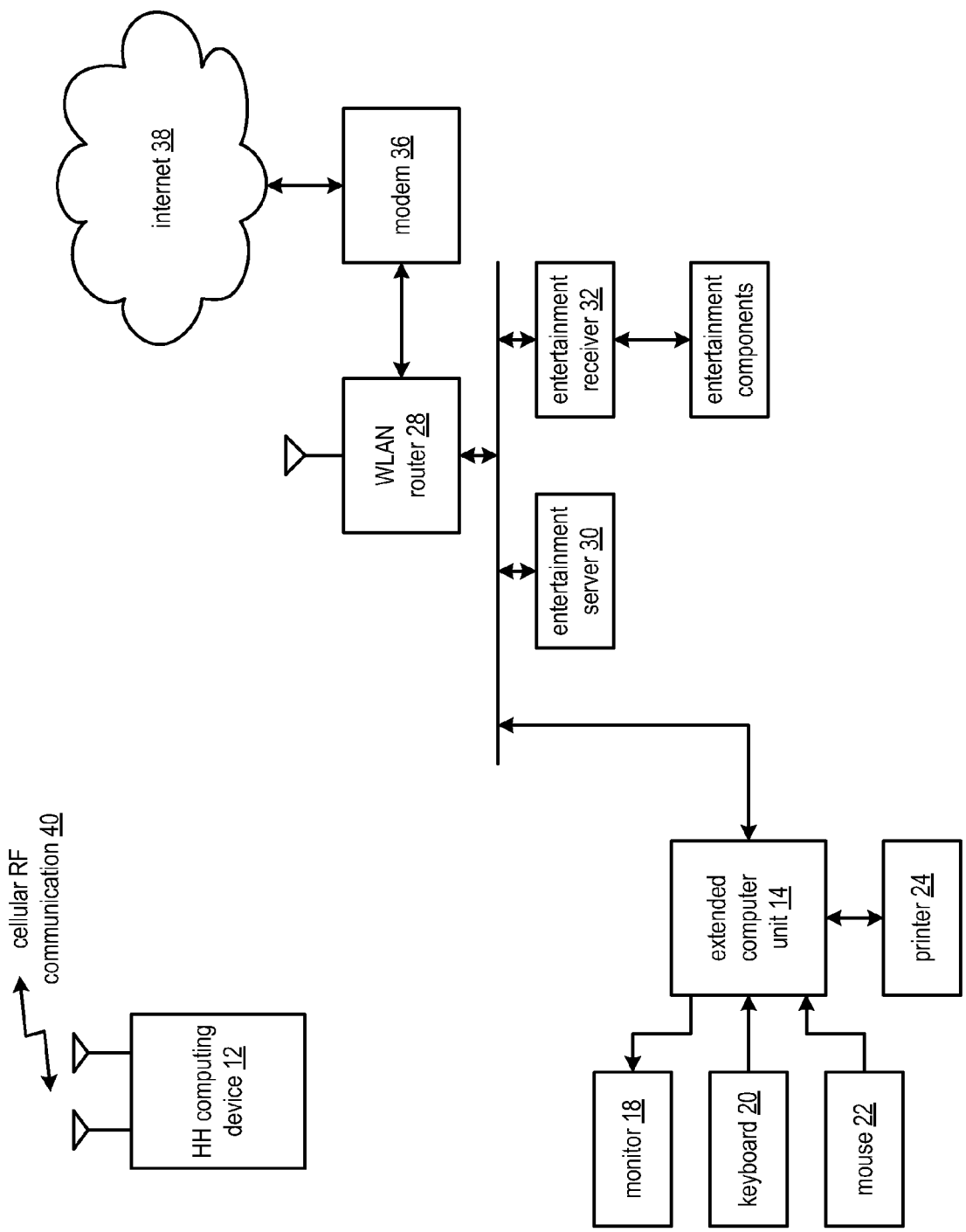
FIG. 4 is a schematic block diagram of an embodiment of a handheld computing unit in a remote mode with respect to an extended computing unit within a communication system in accordance with the present invention.

FIG. 4 is a schematic block diagram of an embodiment of a handheld computing unit 12 in a remote mode with respect to an extended computing unit 14. In this mode, the handheld computing unit 12 has no communications with the extended computing unit 14. As such, the extended computing unit 14 is disabled and the handheld computing unit 12 functions as a stand-alone computing device.

Figure 5:
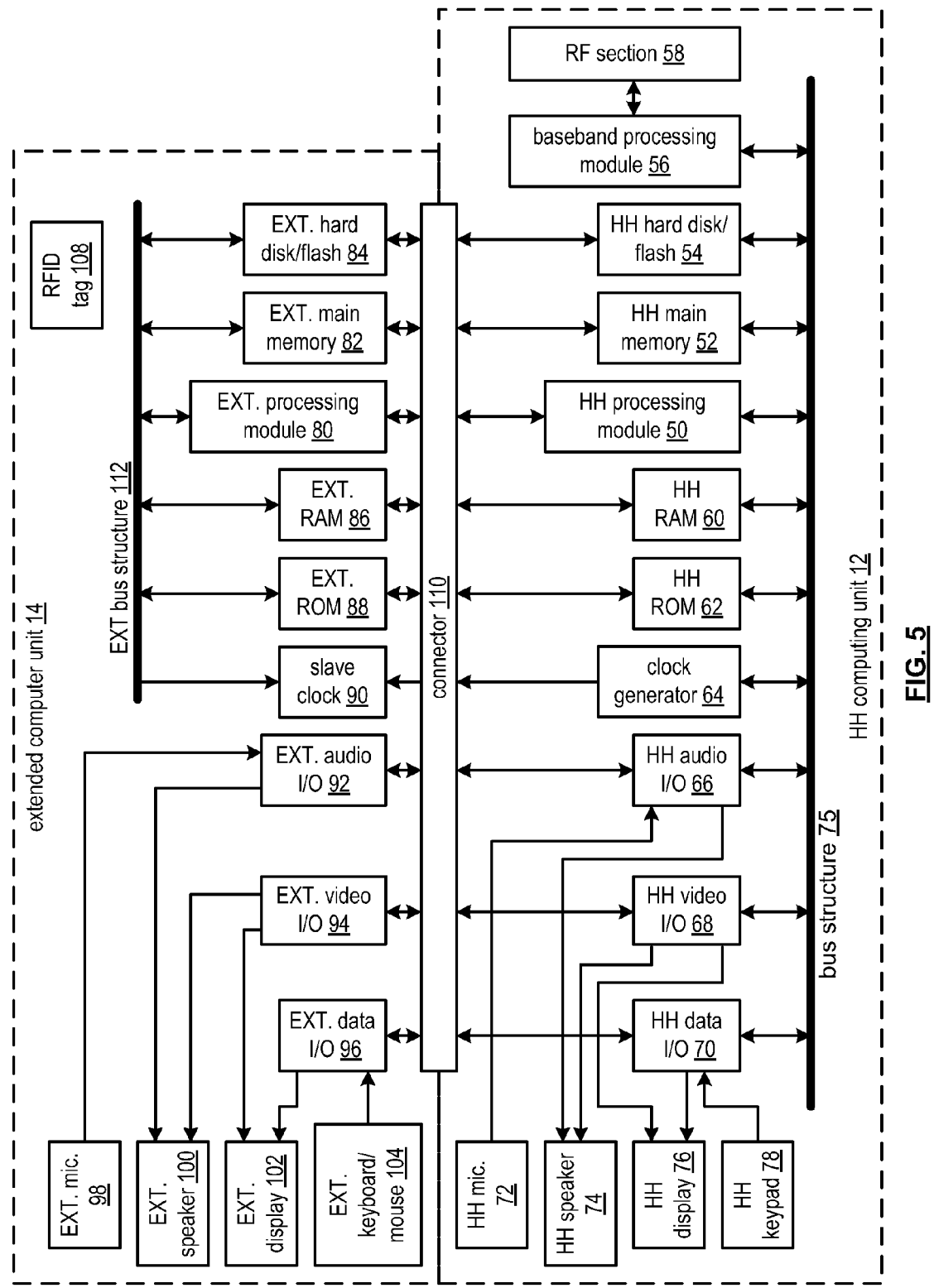
FIG. 5 is a schematic block diagram of an embodiment of a handheld computing unit docked to an extended computing unit in accordance with the present invention.

FIG. 5 is a schematic block diagram of an embodiment of a handheld computing unit 12 docked to an extended computing unit 14. The handheld computing unit 12 includes a handheld processing module 50, handheld main memory 52, handheld hard disk/flash memory 54, a baseband processing module 56, a radio frequency (RF) section 58, handheld random access memory (RAM) 60, handheld read only memory (ROM) 62, a clock generator circuit 64, handheld input/output (I/O) interfaces (e.g., handheld audio I/O interface 66, handheld video and/or graphics interface 68, and handheld data I/O interface 70), and handheld I/O components (e.g., handheld microphone 72, handheld speaker 74, handheld display 76, and a handheld keypad and/or touch screen 78), a handheld bus structure 75, and a handheld connection structure 110.

The extended computing unit 14 includes an extended processing module 80, extended main memory 82, extended hard disk/flash memory 84, extended random access memory (RAM) 86, extended read only memory (ROM) 88, a slave clock circuit 90, extended input/output (I/O) interfaces (e.g., extended audio I/O interface 92, extended video and/or graphics interface 94, and an extended data I/O interface 96), and extended I/O components (e.g., extended microphone 98, extended speaker 100, extended display 102—which may be monitor 18 and/or printer 24—, and an extended keyboard/mouse 104, which may be keyboard 20 and mouse 22), an extended connection structure 110, an extended bus structure 112, and a radio frequency identification (RFID) tag 108.

Within the handheld computing unit 12, the processing module 50 and the baseband processing module 56 may be separate processing modules or the same processing module. Such a processing module may be a single processing device or a plurality of processing devices, where a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/ or operational instructions corresponding to at least some of the steps and/or functions illustrated in FIGS. 1-47.

Also within the handheld computing unit 12, the handheld main memory 52 includes one or more RAM integrated circuits (IC) and/or boards. The RAM may be static RAM (SRAM) and/or dynamic RAM (DRAM). The handheld hard disk/flash memory 54 may be one or more of a hard disk, a floppy disk, an optical disk, NOR flash memory, NAND flash memory, and/or any other type of non-volatile memory. The clock generator circuit 64 may be one or more of: a phase locked loop, a crystal oscillator circuit, a fractional-N synthesizer, and/or a resonator circuit-amplifier circuit, where the resonator may be a quartz piezo-electric oscillator, a tank circuit, or a resistor-capacitor circuit. Regardless of the implementation of the clock generator circuit 64, it generates a master clock signal that is provided to the slave clock circuit 90 and generates the clock signals for the handheld computing unit 12. Such clock signals include, but are not limited to, a bus clock, a read/write clock, a processing module clock, a local oscillation, and an I/O clock.

The handheld ROM 62 stores the basic input/output system (BIOS) program for the computing device 10 (i.e., the handheld computing unit 12 and the extended computing unit 14). The ROM 62 may be one or more of an electronically erasable programmable ROM (EEPROM), a programmable ROM (PROM), and/or a flash ROM.

As used herein, an interface includes hardware and/or software for a device coupled thereto to access the bus of the handheld computing unit and/or of the extended computing unit. For example, the interface software may include a driver associated with the device and the hardware may include a signal conversion circuit, a level shifter, etc. Within the handheld computing unit, the handheld audio I/O interface 66 may include an audio codec, a volume control circuit, and/or a microphone bias and/or amplifier circuit to couple the handheld (HH) microphone 72 and/or the HH speaker 74 to the HH bus structure 75. The HH video I/O interface 68 may include a video codec, a graphics engine, a display driver, etc. to couple the HH display to the HH bus structure 75. The HH data I/O interface 70 may include the graphics engine, a display driver, a keypad driver, a touch screen driver, etc. to coupled the HH display 76 and/or the HH keypad 78 to the HH bus structure 75.

Within the extended computing unit 14, the extended (EXT) processing module 80 may be a single processing device or a plurality of processing devices, where a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-47.

Also within the extended computing unit 14, the EXT main memory 86 includes one or more RAM integrated circuits (IC) and/or boards. The RAM may be static RAM (SRAM) and/or dynamic RAM (DRAM). Note that the EXT main memory 86 and the EXT RAM 86 may be omitted if the handheld computing unit contains a sufficient amount of main memory. The EXT hard disk/flash memory 84 may be one or more of a hard disk, a floppy disk, at tape drive, an optical disk, NOR flash memory, NAND flash memory, and/or any other type of non-volatile memory. The slave clock circuit 90 may be a phase locked loop (PLL), clock divider, and/or clock multiplier that receives the master clock signal and produces therefrom the clock signals for the extended computing unit 14. Such clock signals include, but are not limited to, a bus clock, a read/write clock, a processing module clock, and an I/O clock.

The EXT ROM 88 may be one or more of an electronically erasable programmable ROM (EEPROM), a programmable ROM (PROM), and/or a flash ROM. Note that the EXT ROM 88 may be omitted if the HH ROM 62 is of sufficient size to accommodate the BIOS program and other system data that is stored in non-volatile memory.

The EXT audio I/O interface 92 may include a sound card and corresponding driver to couple the EXT microphone 98 and/or the EXT speaker 100 to the HH and/or EXT bus structure 75 and/or 112. The EXT video I/O interface 94 may include a video codec, a graphics card, a graphics control unit, a display driver, etc. to couple the EXT display 102 (e.g., monitor 18) to the HH and/or EXT bus structure 75 and/or 112. The EXT data I/O interface 98 may include the graphics card, the graphics control unit, a display driver, a keyboard and mouse driver(s), a touch screen driver, etc. to coupled the EXT display 104 and/or the EXT keyboard/mouse 104 to the HH and/or EXT bus structure 75 and/or 112.

The RFID tag 108 provides an RF communication link to the handheld computing unit 12 when the extended computing unit 14 is disabled. The WID tag 108 may be implemented as disclosed in co-pending patent application entitled POWER GENERATING CIRCUIT, having a Ser. No. 11/394,808, and a filing date of Mar. 31, 2006, issued as U.S. Pat. No. 7,595,732, on Sep. 29, 2009. Communication with the RFID tag 108 will be described in greater detail with reference to FIGS. 23-25.

When the computing device 10 is active in a wireless transmission, the baseband processing module 56 and the RF section 58 are active. For example, for cellular voice communications, the baseband processing module 56 converts an outbound voice signal into an outbound voice symbol stream in accordance with one or more existing wireless communication standards, new wireless communication standards, modifications thereof, and/or extensions thereof (e.g., GSM, AMPS, digital AMPS, CDMA, etc.). The baseband processing module 56 may perform one or more of scrambling, encoding, constellation mapping, modulation, frequency spreading, frequency hopping, beamforming, space-time-block encoding, space-frequency-block encoding, and/or digital baseband to IF conversion to convert the outbound voice signal into the outbound voice symbol stream. Depending on the desired formatting of the outbound voice symbol stream, the baseband processing module 56 may generate the outbound voice symbol stream as Cartesian coordinates (e.g., having an in-phase signal component and a quadrature signal component to represent a symbol), as Polar coordinates (e.g., having a phase component and an amplitude component to represent a symbol), or as hybrid coordinates as disclosed in co-pending patent application entitled HYBRID RADIO FREQUENCY TRANSMITTER, having a filing date of Mar. 24, 2006, and an application Ser. No. 11/388,822, issued as U.S. Pat. No. 7,787,547, on Aug. 31, 2010, and co-pending patent application entitled PROGRAMMABLE HYBRID TRANSMITTER, having a filing date of Jul. 26, 2006, and an application Ser. No. 11/494,682, now issued as U.S. Pat. No. 7,852,970, on Dec. 14, 2010.

The RF section 58 converts the outbound voice symbol stream into an outbound RF voice signal in accordance with the one or more existing wireless communication standards, new wireless communication standards, modifications thereof, and/or extensions thereof (e.g., GSM, AMPS, digital AMPS, CDMA, etc.). In one embodiment, the RF section 58 receives the outbound voice symbol stream as Cartesian coordinates. In this embodiment, the RF section 58 mixes the in-phase components of the outbound voice symbol stream with an in-phase local oscillation to produce a first mixed signal and mixes the quadrature components of the outbound voice symbol stream to produce a second mixed signal. The RF section 58 combines the first and second mixed signals to produce an up-converted voice signal. The RF section 58 then amplifies the up-converted voice signal to produce the outbound RF voice signal, which it provides to an antenna section. Note that further power amplification may occur between the output of the RF section 58 and the input of the antenna section.

In other embodiments, the RF section 58 receives the outbound voice symbol stream as Polar or hybrid coordinates. In these embodiments, the RF section 58 modulates a local oscillator based on phase information of the outbound voice symbol stream to produce a phase modulated RF signal. The RF section 58 then amplifies the phase modulated RF signal in accordance with amplitude information of the outbound voice symbol stream to produce the outbound RF voice signal. Alternatively, the RF section 58 may amplify the phase modulated RF signal in accordance with a power level setting to produce the outbound RF voice signal.

For incoming voice signals, the RF section 58 receives an inbound RF voice signal via the antenna section. The RF section 58 converts the inbound RF voice signal into an inbound voice symbol stream. In an embodiment, the RF section 58 extracts Cartesian coordinates from the inbound RF voice signal to produce the inbound voice symbol stream. In another embodiment, the RF section 58 extracts Polar coordinates from the inbound RF voice signal to produce the inbound voice symbol stream. In yet another embodiment, the RF section 58 extracts hybrid coordinates from the inbound RF voice signal to produce the inbound voice symbol stream.

The baseband processing module 56 converts the inbound voice symbol stream into an inbound voice signal. The baseband processing module 56 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound voice symbol stream into the inbound voice signal, which is placed on the bus structure 75.

The baseband processing module 56 and the RF section function similarly for processing data communications and for processing WLAN communications. For data communications, the baseband processing module 56 and the RF section function in accordance with one or more cellular data protocols such as, but not limited to, Enhanced Data rates for GSM Evolution (EDGE), General Packet Radio Service (GPRS), high-speed downlink packet access (HSDPA), high-speed uplink packet access (HSUPA), newer version thereof, and/or replacements thereof. For WLAN communications, the baseband processing module 56 and the RF section 58 function in accordance with one or more wireless communication protocols such as, but not limited to, IEEE 802.11(a), (b), (g), (n), etc., Bluetooth, ZigBee, RFID, etc.

When the computing device 10 is executing one or more user applications (e.g., word processing, spreadsheet processing, presentation processing, email, web browsing, database, calendar, video games, digital audio playback, digital video playback, digital audio record, digital video record, video games, contact management program, notes, web favorites, money management program, etc.), the HH processing module 50 and the EXT processing module 80 function as a multiprocessing module and the HH and EXT main memories 52 and 82 function as combined main memory. In addition, the HH hard disk/flash memory 54 and the EXT hard disk/flash memory 84 function as a combined hard disk/flash memory.

For instance, the multiprocessing module provides multiprocessing via the HH and EXT processing modules 50 and 80. In this configuration, the processing modules 50 and 80 may share tasks and/or execute multiple concurrent software processes. Further, the processing modules 50 and 80 may be equal; one may be reserved for one or more special purposes; may be tightly coupled; may be loosely coupled; etc. For example, at the operating system level, the HH processing module 50 may be designated to respond to all interrupts, traps, and/or services calls and the invoke the EXT processing module 80 as needed. As another example, at the user level, the processing modules may function in a symmetrical multiprocessing mode, in an asymmetrical multiprocessing mode, in a non-uniform memory access multiprocessing mode, and/or in a clustered multiprocessing mode.

With respect to instruction and data streams, the processing modules 50 and 80 may execute a single sequence of instructions in multiple contexts (single-instruction, multiple-data or SIMD), multiple sequences of instructions in a single context (multiple-instruction, single-data or MISD), or multiple sequences of instructions in multiple contexts (multiple-instruction, multiple-data or MIMD).

The computing device 10 incorporates a virtual memory technique, overlays, and/or swapping to utilize the combined main memories and hard disk/flash memories for one or more user applications. In an embodiment, the virtual memory is divided the virtual address space into pages (e.g., a 4K-Byte block), where one or more page tables (e.g., one for the computing device, one for each running user application, etc.) translates the virtual address into a physical address. Note that the memory controller manages accesses to the one or more page tables to facilitate the fetching of data and/or instructions from physical memory. If a page table indicates that a page is not currently in memory, the memory controller and/or one of the processing modules 50 and/or 80 raise a page fault interrupt.

A paging supervisor of the operating system receives the page fault interrupt and, in response, searches for the desired page containing the required virtual address. Once found, the paging supervisor reads the page into main memory and updates the appropriate page table. If there is insufficient room the main memory, the paging supervisor saves an area of the main memory to the HH or EXT hard disk/flash memory and update the corresponding page table. The cleared area of main memory is then used for the new page.

With respect to user I/O devices, the HH microphone 72, the HH speaker 74, the HH display 76 and the HH keypad 78 may be disabled while the handheld computing unit is docked. In this mode, the EXT microphone 98, the EXT speaker 100, the EXT display 102, and the EXT keyboard/mouse 104 are active to provide the user interfaces to the computing device 10. Note that for a cellular voice telephone call, the inbound and outbound voice signals may be provided to/from the EXT microphone 98 and the speaker 100, an EXT headset (not shown), or the VoIP phone 46.

Figure 6:
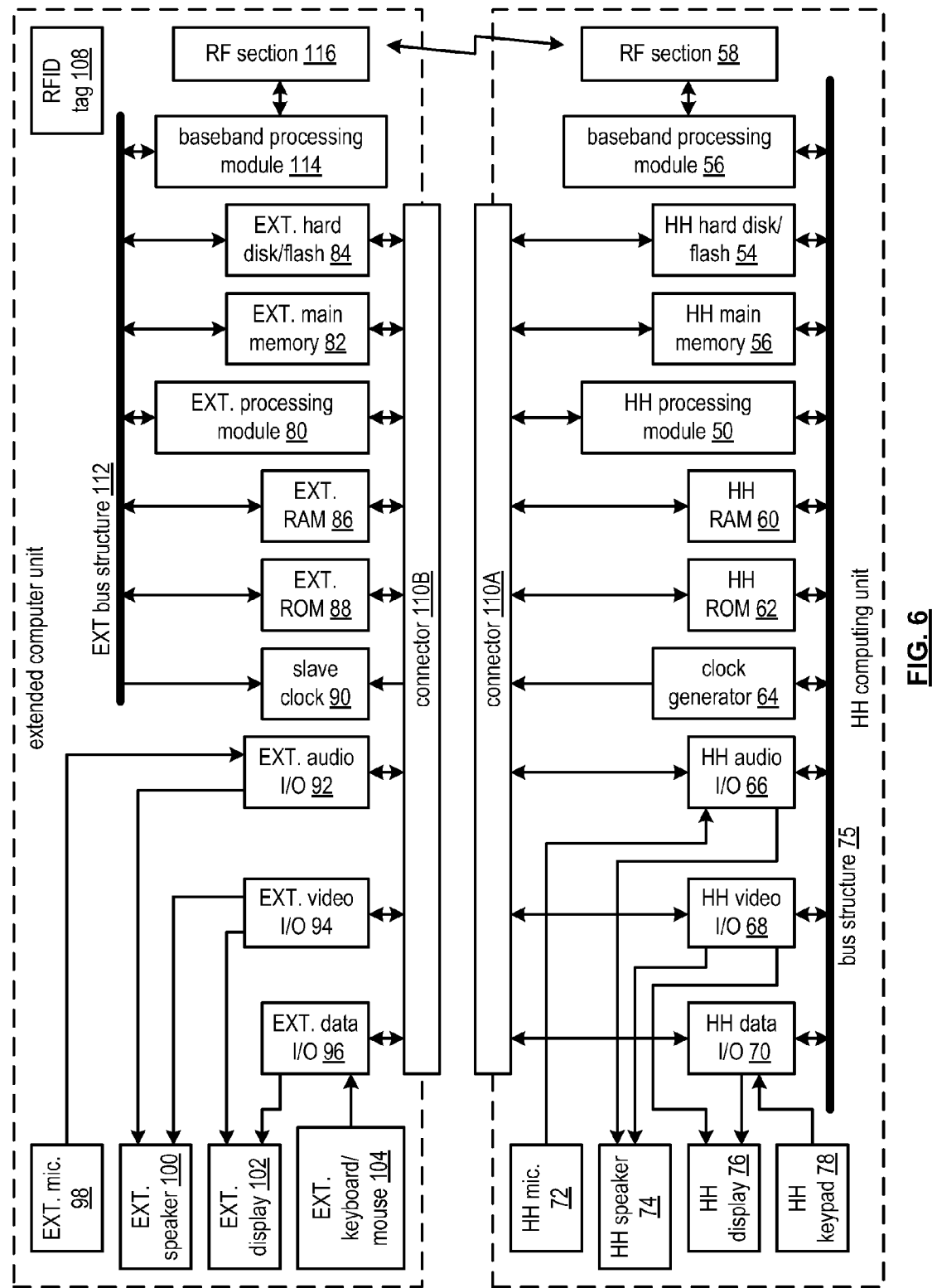
FIG. 6 is a schematic block diagram of an embodiment of a handheld computing unit quasi docked to an extended computing unit in accordance with the present invention.

FIG. 6 is a schematic block diagram of an embodiment of a handheld computing unit 12 quasi docked to an extended computing unit 14. The handheld computing unit 12 includes a handheld processing module 50, handheld main memory 52, handheld hard disk/flash memory 54, a baseband processing module 56, a radio frequency (RF) section 58, handheld random access memory (RAM) 60, handheld read only memory (ROM) 62, a clock generator circuit 64, handheld input/output (I/O) interfaces (e.g., handheld audio I/O interface 66, handheld video and/or graphics interface 68, and handheld data I/O interface 70), and handheld I/O components (e.g., handheld microphone 72, handheld speaker 74, handheld display 76, and a handheld keypad and/or touch screen 78), a handheld bus structure 75, and a handheld connection structure 110A.

The extended computing unit 14 includes an extended processing module 80, extended main memory 82, extended hard disk/flash memory 84, extended random access memory (RAM) 86, extended read only memory (ROM) 88, a slave clock circuit 90, extended input/output (I/O) interfaces (e.g., extended audio I/O interface 92, extended video and/or graphics interface 94, and an extended data I/O interface 96), and extended I/O components (e.g., extended microphone 98, extended speaker 100, extended display 102—which may be monitor 18 and/or printer 24—, and an extended keyboard/mouse 104, which may be keyboard 20 and mouse 22), an extended connection structure 110B, an extended bus structure 112, an RFID tag 108, a baseband processing module 114, and an RF section 116. Note that the EXT processing module 80 and the baseband processing module 114 may be separate processing modules or the same processing module.

In the quasi docked mode, the baseband processing module 114 and the RF section 58 for the extended computing unit 14 establish an RF communication path 46 with the RF section 58 and the baseband processing module 56 of the handheld computing unit 12. In this mode, the RF communication path 46 is essentially functioning as a wireless bus coupling the HH bus structure 75 to the EXT bus structure 112 such that the handheld computing unit 12 may access the EXT main memory 82 and/or the EXT hard disk/flash memory of the extended computing unit 14. The baseband processing modules 56 and 114 and the RF sections 58 and 116 may utilize a wireless communication protocol such as, but not limited to, IEEE 802.11(a), (b), (g), (n), etc., Bluetooth, ZigBee, RFID, etc.

With the computing device 10 in a quasi docked mode, the HH processing module 50 executes one or more user applications (e.g., word processing, spreadsheet processing, presentation processing, email, web browsing, database, calendar, video games, digital audio playback, digital video playback, digital audio record, digital video record, video games, contact management program, notes, web favorites, money management program, etc.) using the HH main memory 52. In this mode, the EXT processing module 80 and the EXT main memory are inactive except to facilitate read/write functions to the EXT hard disk/flash memory 84, which is treated as a lower level memory than the HH hard disk/flash memory 54.

In this mode, the virtual memory technique utilizes the HH main memory 52 and the HH hard disk/flash memory 54 for one or more user applications. Further memory management includes copying user applications and/or files from the EXT hard disk/flash memory 84 to the HH hard disk/flash memory 54 before it can be included in virtual memory and hence accessed by the HH processing module 50. Note that if the HH hard disk/flash memory 54 does not have sufficient space to store the user applications and/or files, the one or more user applications and/or files are transferred from the HH hard disk/flash memory 54 to the EXT hard disk/flash memory 84 to free up memory space.

Figure 7:
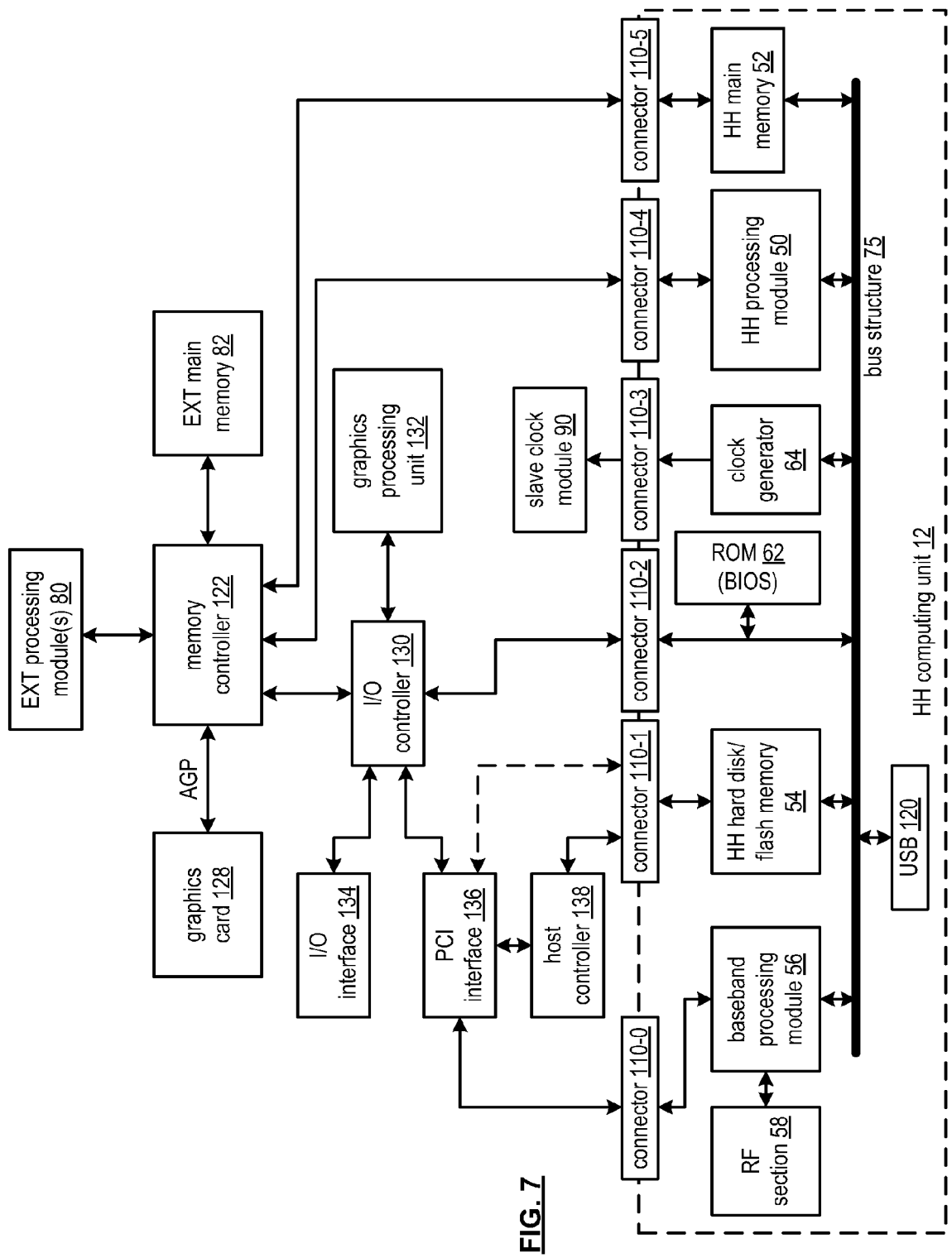
FIG. 7 is a schematic block diagram of an embodiment of core components of a handheld computing unit docked to an extended computing unit in accordance with the present invention.

FIG. 7 is a schematic block diagram of an embodiment of core components of a handheld computing unit 12 docked to an extended computing unit 14. The core components of the handheld computing unit 12 include the HH processing module 50, the HH main memory 52, the HH hard disk/flash memory 54, the baseband processing module 56, the RF section 58, the ROM 62, a universal serial bus (USB) interface 120, and the handheld connection structure 110A, which may be a combined connector or a plurality of connectors 110-1 through 110-5. The core components of the extended computing unit 14 include the corresponding connection structure 110B, one or more EXT processing modules 80, the EXT main memory 82, the slave clock module 90, a memory controller 122, a graphics card 128 and/or a graphics processing unit 132, an I/O controller 130, an I/O interface 134, a peripheral component interconnect (PCI) interface 136, and a host controller 138.

With handheld computing unit 12 docked to the extended computing unit 14, the core components of units 12 and 14 function as a single computing device 10. As such, when the computing device 10 is enabled, the BIOS stored on the HH ROM 62 is executed to boot up the computing device. The BIOS will be discussed in greater detail with reference to FIGS. 19-26. After initializing the operating system, which will described in greater detail with reference to FIGS. 19-22 and 27-36, the computing device 10 is ready to execute a user application.

In an embodiment, the memory controller 122 coordinates the reading data from and writing data to the HH main memory 52 and the EXT main memory 82, by the processing modules 50 and 80, by the user I/O devices coupled directly or indirectly to the I/O controller, by the graphics card 128, and/or for data transfers with the HH and/or EXT hard disk/flash memory 54 and/or 84. Note that if the HH main memory 52 and/or the EXT main memory include DRAM, the memory controller 122 includes logic circuitry to refresh the DRAM.

The I/O controller 130 provides access to the memory controller 122 for typically slower devices. For example, the I/O controller 130 provides functionality for the PCI bus via the PCI interface 136; for the I/O interface 134, which may provide the interface for the keyboard, mouse, printer, and/or a removable CD/DVD disk drive; and BIOS interface; a direct memory access (DMA) controller, interrupt controllers, a host controller, which allows direct attached of the EXT hard disk memory; a real time clock, an audio interface. The I/O controller 130 may also include support for an Ethernet network card, a Redundant Arrays of Inexpensive Disks (RAID), a USB interface, and/or FireWire.

The graphics processing unit (GPU) 132 is a dedicated graphics rendering device for manipulating and displaying computer graphics. In general, the GPU implements a number of graphics primitive operations and computations for rendering two-dimensional and/or three-dimensional computer graphics. Such computations may include texture mapping, rendering polygons, translating vertices, programmable shaders, aliasing, and very high-precision color spaces. The GPU 132 may a separate module on a video card or it maybe incorporated into the graphics card 128 that couples to the memory controller 122 via the accelerated graphics port (AGP). Note that a video card, or graphics accelerator, functions to generate the output images for the EXT display. In addition, the video card may further include functionality to support video capture, TV tuner adapter, MPEG-2 and MPEG-4 decoding or FireWire, mouse, light pen, joystick connectors, and/or connection to two monitors.

The EXT processing module 80, the memory controller 122, the EXT main memory 82, the I/O controller 130, the I/O interface 134, the PCI interface 136, and the host controller 138 may be implemented on a single integrated circuit, each on separate integrated circuits, or some elements may be implemented on the same integrated circuits. For example, the EXT processing module 80 and the memory controller 122 may be implemented on the same integrated circuit.

Figure 8:
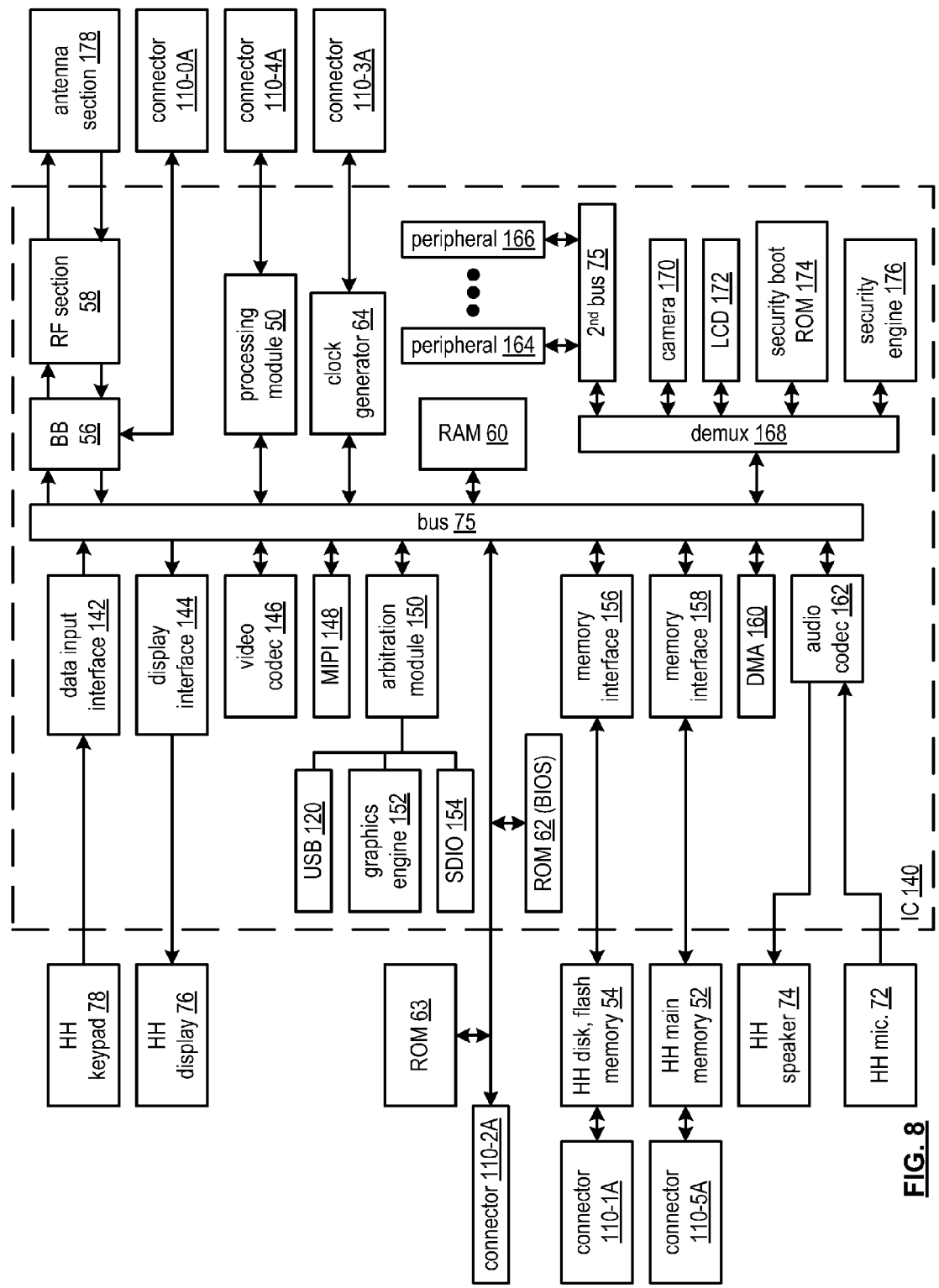
FIG. 8 is a schematic block diagram of an embodiment of a handheld computing unit in accordance with the present invention.

FIG. 8 is a schematic block diagram of an embodiment of a handheld computing unit 12 that be may be used in the computing device 10 of FIG. 7. The handheld computing unit 12 includes an integrated circuit (IC) 140, the HH keypad, the HH display, the HH hard disk/flash memory 54, the HH main memory 52, the HH speaker 74, the HH microphone 72, the connection structure 110-1A through 110-5A, an antenna section 178, and may further include an off-chip ROM 63. The IC 140 includes the bus structure 75, the HH processing module 50, the baseband processing module 56, the RF section 58, the ROM 62, the clock generator circuit 64, a data input interface 142, a display interface 144, a video codec 146 (optional), a mobile industry processor interface (MIPI) interface 148 (optional), an arbitration module 150, a USB interface 120, a graphics engine 152, a secure digital input/output (SDIO) interface 154, a hard disk/flash memory interface 156, a main memory interface 158, a direct memory access (DMA) module 160, an audio codec 162, a demultiplexer 168, a plurality of peripheral interfaces 162-164, a digital camera interface 170, an LCD interface 172, a security boot ROM 174 (which may be included in ROM 62 or a separate ROM), and a security engine 176.

The plurality of peripheral interfaces 162-164 include two or more of: a SIM (Security Identification Module) card interface, a power management (PM) interface, a SD (Secure Digital) card or MMC (Multi Media Card) interface, a coprocessor interface, a Bluetooth (BT) transceiver interface, an FM tuner interface, a GPS receiver interface, a video sensor interface (e.g., a camcorder), a TV tuner interface, a universal subscriber identity module (USIM) interface, a second display interface, a Universal Asynchronous Receiver-Transmitter (UART) interface, a real time clock, and a general purpose I/O interface.

When the handheld computing unit 12 is docked with the extended computing unit 14, the HH processing module 50, the HH main memory 52, the HH hard disk/flash memory 54, the ROM 62, the clock generator circuit 64, and the HH bus structure 75 are coupled directly or indirectly to the memory controller 122 and/or the I/O controller 130 of the extended computing unit 14. In this mode, a docked mode operating system may activate as many or as few of the interfaces of the IC 140. For example, since the EXT display, mouse, keyboard, microphone, speakers and VoIP phone are enabled, the docked mode operating system may deactivate the data input interface 142, the display interface 144, the video codec 146, if included, the audio codec 162, the graphics engine 152, and the MIPI interface 148, if included.

As another example, the docked mode operating system may evoke the security functions provided by the security engine 176 and/or the security boot ROM 174. The security may be to allow/disallow access to certain resources (e.g., processing modules 50 and/or 80, files, privileged services calls, certain memory locations, etc.) based on the identity of the requester. This may be done via an internal security process. In general, internal security protects the computer's resources from the programs that are concurrently running. In an embodiment, less privileged programs are blocked from certain instructions (e.g., read from or write to memory) and have to ask a higher privileged program to perform the instruction for it (e.g., an operating system kernel).

As yet another example, the docked mode operating system may active or deactivate one or more of the memory interfaces 156-158 depending on whether access to the HH main memory 52 and/or the HH hard disk/flash memory 54 is to be accessed via the HH bus structure 75 and/or via the memory controller 122 and/or the host controller 138. For instance, memory interface 158 may be activated such that the HH processing module 50 may access the HH main memory 52 via the bus 75 and memory interface 156 may be deactivated such that the HH hard disk/flash memory 54 is accessed via the host controller 138.

When the handheld computing unit 12 is in the remote mode, a remote mode operating system is active, which activates one or more of the interfaces. For example, the remote mode operating system will active the data input interface 142, the display interface 144, the audio codec 162, the graphics engine 152, the video codec 146, if included, and the MIPI interface 148, if included, to provide the user with character (e.g., voice, audio, video, image, text, graphics, etc.) input and output functionality via the handheld computing unit 12. In an embodiment, the graphic engine 152 render two-dimensional and/or three-dimensional graphics for display on the HH display 76 and/or storage in memory 52 and/or 54. The HH display 76 may include one or more display devices such as a liquid crystal (LCD) display, a plasma display, a digital light project (DLP) display, and/or any other type of portable video display. Accordingly, the display interface 144 would include software to facilitate the transfer of output video, graphics, and/or text to the HH display 76. Note that the MIPI interface may be used as an interface for a second HH display or instead of the display interface 144.

As another example, the remote mode operating system may activate the DMA module 160 such that one or more of the other interfaces may provide direct access to the HH main memory 52 without, or with minimal, involvement of the HH processing module 50. For instance, the camera interface 170 may be provided direct memory access to store a captured image and/or a captured video in the HH main memory 52 or in the HH hard disk/flash memory 54.

In an embodiment, the HH bus structure 75 may include one or more data lines, one or more instruction lines, and/or one or more control lines. For example, the HH bus structure 75 may include 16-128 lines for data and another 16-128 lines for instructions. In addition, the HH bus structure 75 may further include address lines for addressing the main memory 52.

In an embodiment, connections from the IC 140 to the connector 110 and/or to other components of the handheld computing unit 12 may be done via IC pins, via an RF interconnection, and/or a magnetic interconnection. Such an RF interconnection may be implemented as disclosed in co-pending patent applications (1) RF BUS CONTROLLER, having a Ser. No. 11/700,285, and a filing date of Jan. 31, 2007; (2) INTRA-DEVICE RF BUS AND CONTROL THEREOF, having a Ser. No. 11/700,421, and a filing date of Jan. 31, 2007; (3) SHARED RF BUS STRUCTURE, having a Ser. No. 11/700,517, and a filing date of Jan. 31, 2007, issued as U.S. Pat. No. 7,809,329, on Oct. 5, 2010; (4) RF TRANSCEIVER DEVICE WITH RF BUS, having a Ser. No. 11/700,592, and a filing date of Jan. 31, 2007; and (5) RF BUS ACCESS PROTOCOL AND TRANSCEIVER, having a Ser. No. 11/700,591, and a filing date of Jan. 31, 2007.

Figure 9:
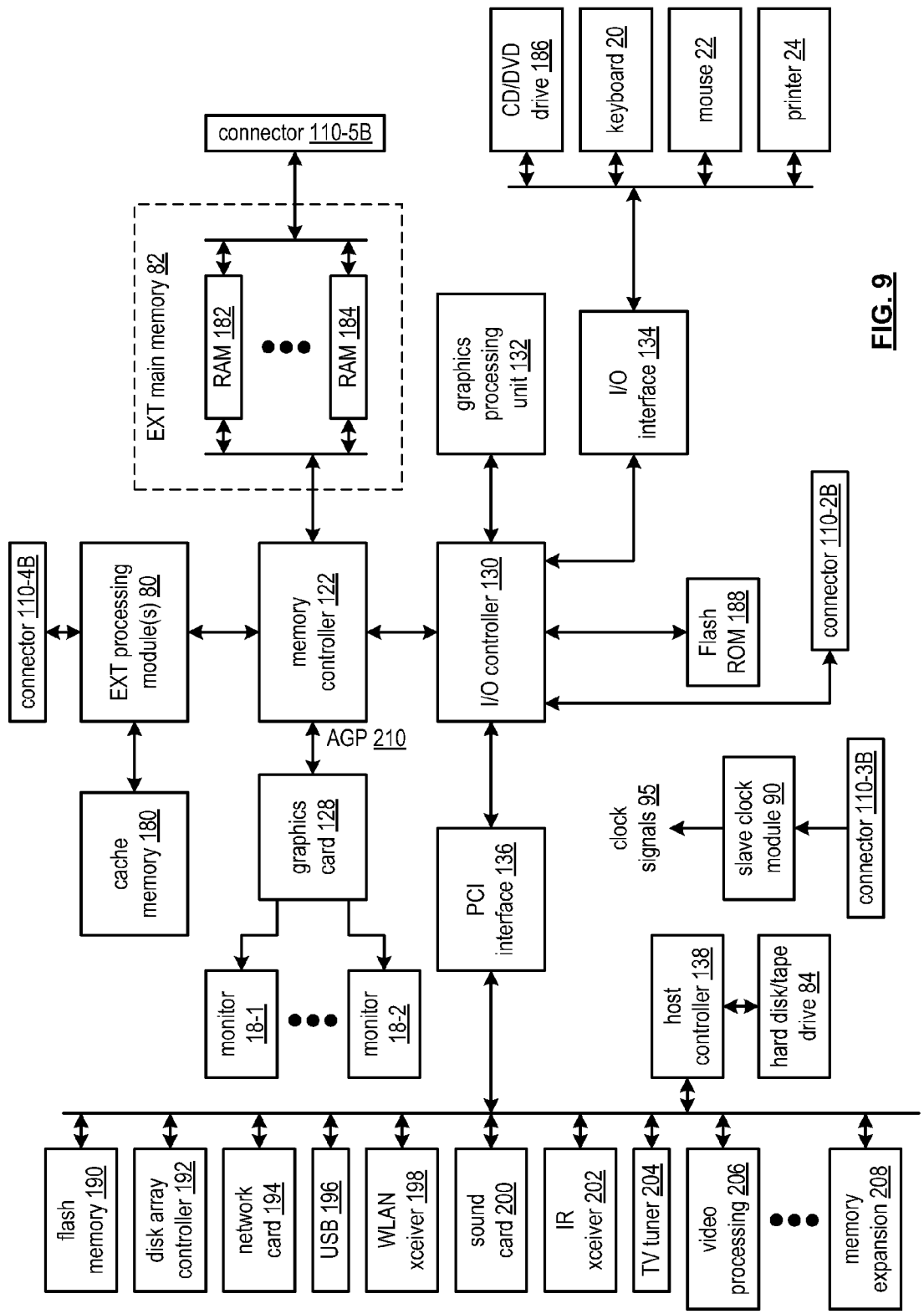
FIG. 9 is a schematic block diagram of an embodiment of an extended computing unit in accordance with the present invention.

FIG. 9 is a schematic block diagram of an embodiment of an extended computing unit 14 that may be used in the computing device 10 of FIG. 7. The extended computing unit 14 includes one or more monitors 18-1 through 18-2, the keyboard 20, the mouse 22, the printer 24, the EXT processing module 80, the EXT main memory 82, the EXT hard disk/flash/tape memory 84, the memory controller 122, the graphics card 128 and/or the graphics processing unit 132, the I/O controller 130, the I/O interface 134, the PCI interface 136, and the connector structure 110-1B through 110-5B. The extended computing unit 14 may further include one or more of a CD/DVD removable drive 186, a flash ROM 188, flash memory 190, a disk array controller 192, a network card 194, a USB connector 196, a WLAN transceiver 198 (e.g., baseband processing module 114 and RF section 116), a sound card 200, an infrared (IR) transceiver 202, a television (TV) tuner 204, a video processing module 206, and one or more memory expansion cards 208. The EXT main memory 82 may include a plurality of RAM ICs and/or RAM expansion cards 162-164.

In an embodiment, the EXT bus structure 112 includes an AGP bus 210 that couples the graphics card 128 to the memory controller 122, a memory bus that couples the memory controller 122 to the EXT main memory 82, a processor bus that couples the memory controller 122 to the EXT processing module 80, a PCI bus that couples a plurality of devices (e.g., devices 190-208) to the I/O controller 130 via the PCI interface 136, and an I/O bus that couples traditional I/O devices (e.g., keyboard 20, mouse 22, printer 24, and/or removable drive 186) to the I/O controller 130 via the I/O interface 134. In an embodiment, the I/O interface 134 may be omitted and the traditional I/O devices may be coupled to the PCI bus or via a USB connection.

Figure 10:
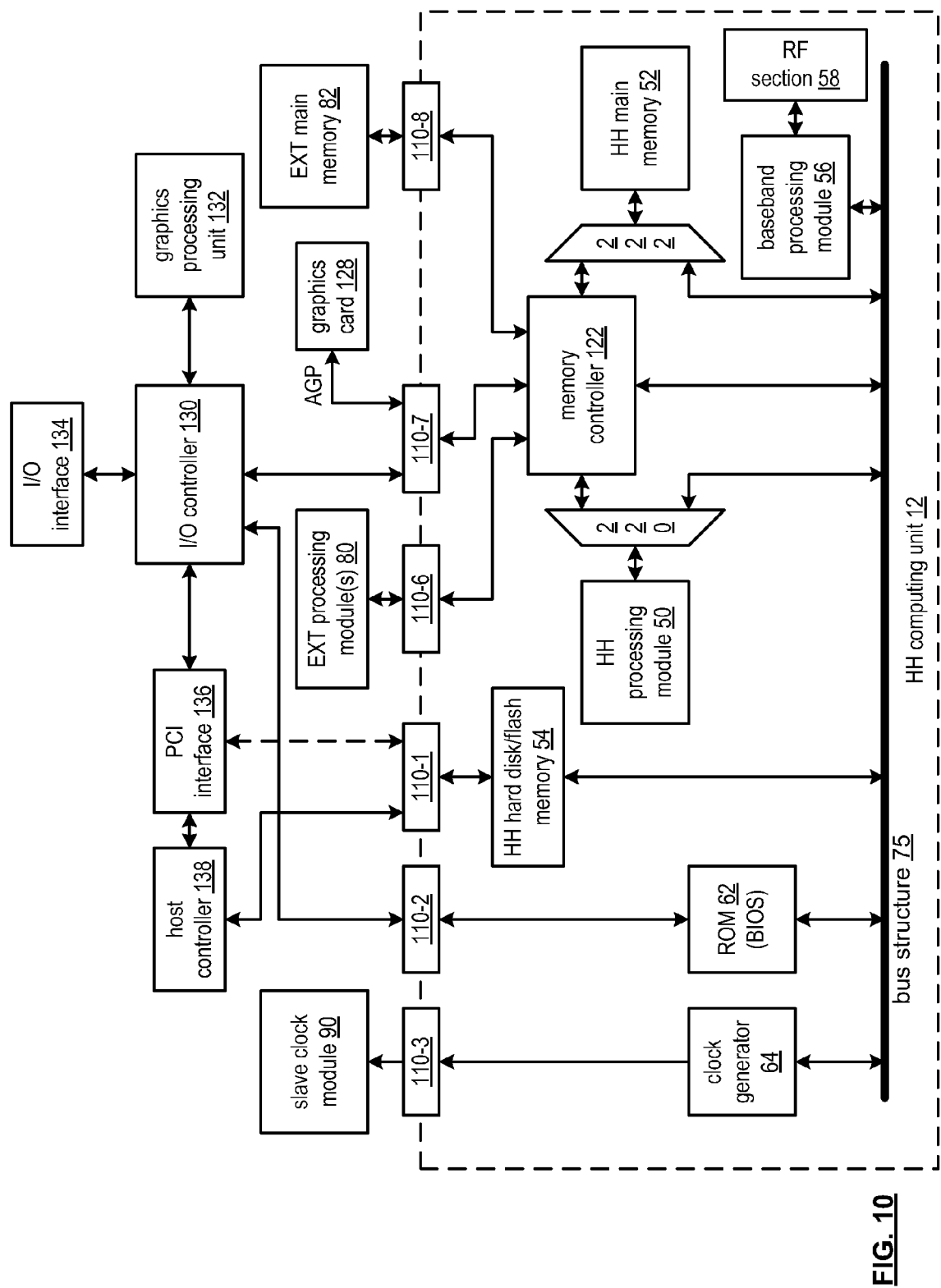
FIG. 10 is a schematic block diagram of another embodiment of core components of a handheld computing unit docked to an extended computing unit in accordance with the present invention.

FIG. 10 is a schematic block diagram of another embodiment of core components of core components of a handheld computing unit 12 docked to an extended computing unit 14. The core components of the handheld computing unit 12 include the HH processing module 50, the HH main memory 52, the HH hard disk/flash memory 54, the baseband processing module 56, the RF section 58, the ROM 62, the handheld connection structure 110A, which may be individual connections 110-1 through 110-8, the memory controller 122, and optional demultiplexers 220 and 222. The core components of the extended computing unit 14 include the corresponding connection structure 110B, one or more EXT processing modules 80, the EXT main memory 82, the slave clock module 90, the graphics card 128 and/or the graphics processing unit 132, the I/O controller 130, the I/O interface 134, the PCI interface 136, and the host controller 138.

With handheld computing unit 12 docked to the extended computing unit 14, the core components of units 12 and 14 function as a single computing device 10. As such, when the computing device 10 is enabled, the BIOS stored on the HH ROM 62 is executed to boot up the computing device. After initializing the operating system, which will described in greater detail with reference to FIGS. 19-22 and 27-36, the computing device 10 is ready to execute a user application.

In an embodiment, the memory controller 122 is within the handheld computing unit 12 and is coupled to the I/O controller 130, the graphics card 128, the EXT processing module 80, and the EXT main memory via the connector structure 110-6 through 110-8. When connected, the memory controller 122 coordinates the reading data from and writing data to the HH main memory 52 and the EXT main memory 82, by the processing modules 50 and 80, by the user I/O devices coupled directly or indirectly to the I/O controller 130, by the graphics card 128, and/or for data transfers with the HH and/or the EXT hard disk/flash memory 54 and/or 84.

If the demultiplexers 220 and 222 are included, the memory controller 122 is coupled to the HH processing module 50 via demultiplexer 220 and is coupled to the HH main memory 52 via demultiplexer 222 when the handheld computing unit 12 is in the docked mode. When the handheld computing unit 12 is in the remote mode, the memory controller 122 may be deactivated such that the demultiplexers 220 and 222 couple the HH processing module 50 and the HH main memory 52 to the HH bus structure 75. If the demultiplexers 220 and 222 are not included, the memory controller 122 is on in both the docked and remote modes to coordinate reading from and writing to the HH main memory 52.

Within the extended computing unit, the EXT processing module 80, the EXT main memory 82, the I/O controller 130, the I/O interface 134, the PCI interface 136, and the host controller 138 may be implemented on a single integrated circuit, each on separate integrated circuits, or some elements may be implemented on the same integrated circuits. For example, the I/O controller 130, the I/O interface 134, the PCI interface 136, and the host controller 138 may be implemented on the same integrated circuit.

Figure 11:
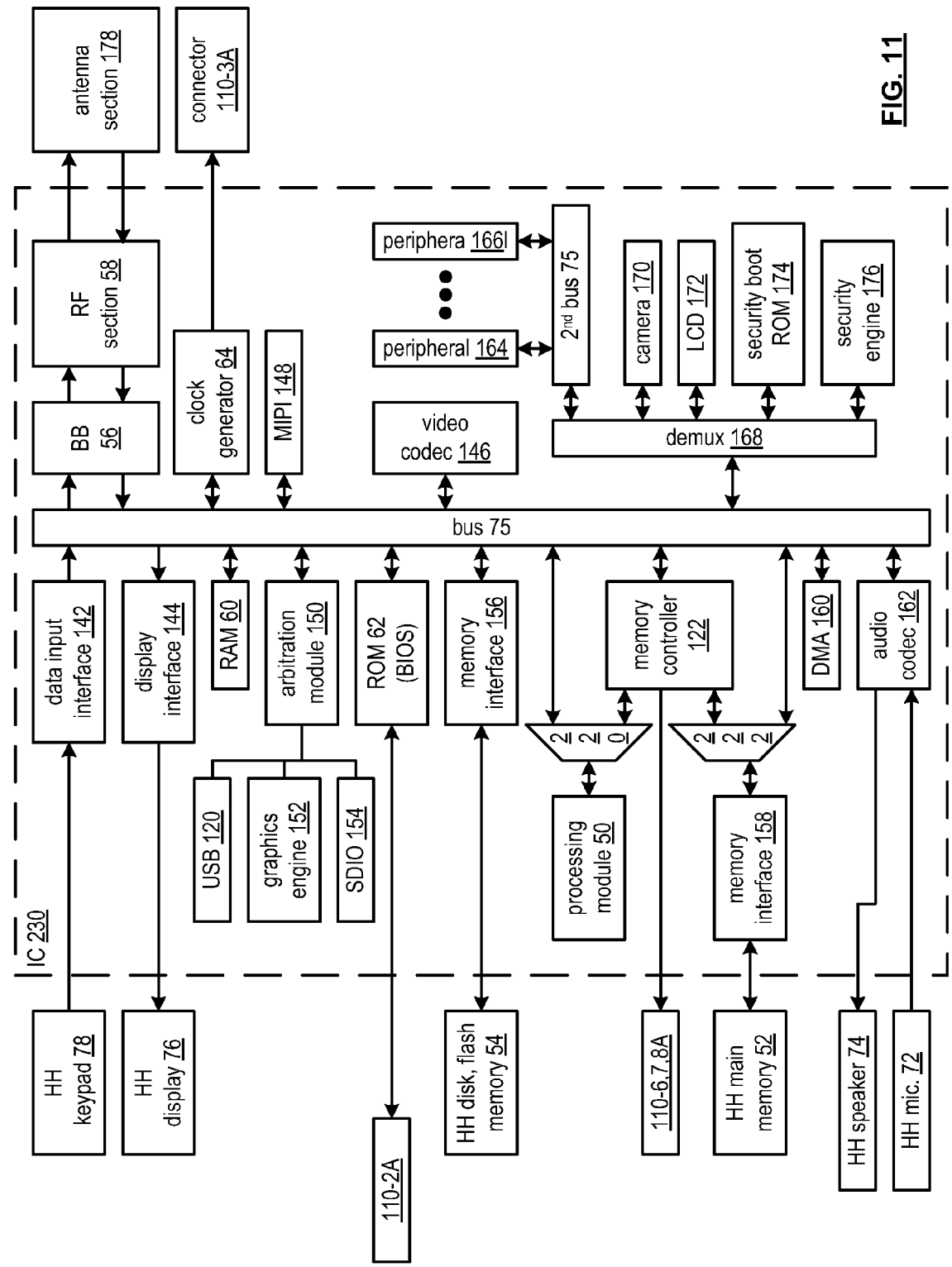
FIG. 11 is a schematic block diagram of another embodiment of a handheld computing unit in accordance with the present invention.

FIG. 11 is a schematic block diagram of another embodiment of a handheld computing unit 12 that may be used in the computing device 10 of FIG. 10. The handheld computing unit 12 includes an integrated circuit (IC) 230, the HH keypad, the HH display, the HH hard disk/flash memory 54, the HH main memory 52, the HH speaker 74, the HH microphone 72, the connection structure 110-1A through 110-5A, an antenna section 178, and may further include an off-chip ROM 63. The IC 140 includes the bus structure 75, the HH processing module 50, the baseband processing module 56, the RF section 58, the ROM 62, the clock generator circuit 64, the memory controller 122, demultiplexers 220 and 222 (optional), the data input interface 142, the display interface 144, the video codec 146 (optional), the mobile industry processor interface (MIPI) interface 148 (optional), the arbitration module 150, the USB interface 120, the graphics engine 152, the secure digital input/output (SDIO) interface 154, the hard disk/flash memory interface 156, the main memory interface 158, a direct memory access (DMA) module 160, an audio codec 162, the demultiplexer 168, the plurality of peripheral interfaces 162-164, the digital camera interface 170, the LCD interface 172, the security boot ROM 174 (which may be included in ROM 62 or a separate ROM), and the security engine 176.

When the handheld computing unit 12 is docked with the extended computing unit 14, the HH processing module 50, the HH main memory 52, the HH hard disk/flash memory 54, the ROM 62, the clock generator circuit 64, and the HH bus structure 75 are coupled to the memory controller 122 and/or to the I/O controller 130 of the extended computing unit 14. In this mode, a docked mode operating system may activate as many or as few of the interfaces of the IC 140. For example, since the EXT display, mouse, keyboard, microphone, speakers and VoIP phone are enabled, the docked mode operating system may deactivate the data input interface 142, the display interface 144, the video codec 146, if included, the audio codec 162, the graphics engine 152, and the MIPI interface 148, if included.

When the handheld computing unit 12 is in the remote mode, a remote mode operating system is active, which activates one or more of the interfaces. For example, the remote mode operating system will active the data input interface 142, the display interface 144, the audio codec 162, the graphics engine 152, the video codec 146, if included, and the MIPI interface 148, if included, to provide the user with character (e.g., voice, audio, video, image, text, graphics, etc.) input and output functionality via the handheld computing unit 12.

As another example, the remote mode operating system may activate the DMA module 160 such that one or more of the other interfaces may provide direct access to the HH main memory 52 without, or with minimal, involvement of the HH processing module 50. In addition, the remote operating system may activate or deactivate the memory controller 122 depending on how HH main memory 52 is to be accessed and/or how involvement of the HH processing module 50 is to be controlled.

Figure 12:
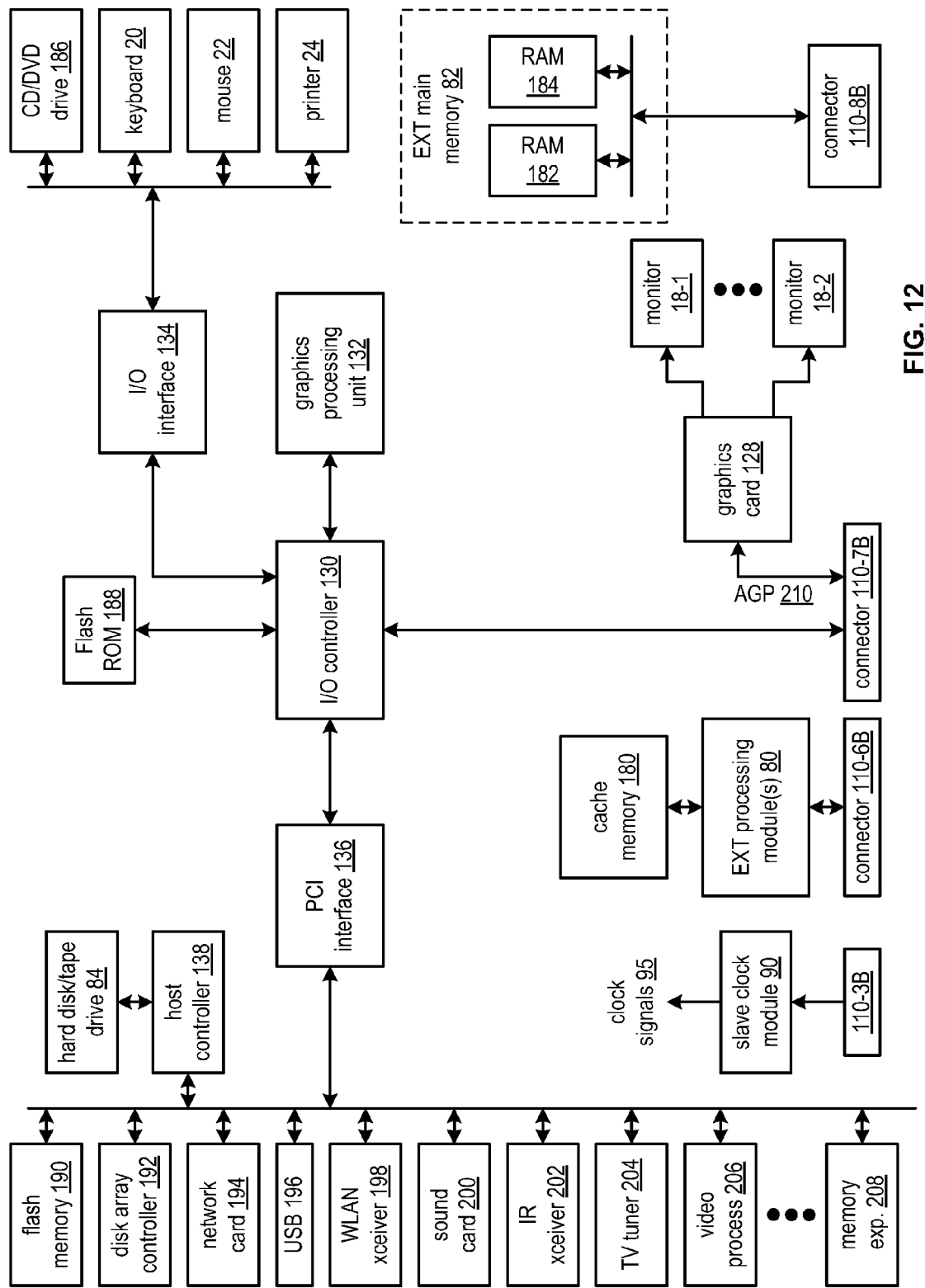
FIG. 12 is a schematic block diagram of another embodiment of an extended computing unit in accordance with the present invention.

FIG. 12 is a schematic block diagram of another embodiment of an extended computing unit 14 that may be used in the computing device 10 of FIG. 10. The extended computing unit 14 includes one or more monitors 18-1 through 18-2, the keyboard 20, the mouse 22, the printer 24, the EXT processing module 80, the EXT main memory 82, the EXT hard disk/flash/tape memory 84, the graphics card 128 and/or the graphics processing unit 132, the I/O controller 130, the I/O interface 134, the PCI interface 136, and the connector structure 110-1B through 110-8B. The extended computing unit 14 may further include one or more of a CD/DVD removable drive 186, a flash ROM 188, flash memory 190, a disk array controller 192, a network card 194, a USB connector 196, a WLAN transceiver 198 (e.g., baseband processing module 114 and RF section 116), a sound card 200, an infrared (IR) transceiver 202, a television (TV) tuner 204, a video processing module 206, and one or more memory expansion cards 208. The EXT main memory 82 may include a plurality of RAM ICs and/or RAM expansion cards 162-164.

In an embodiment, the EXT bus structure 112 includes an AGP bus 210 that couples the graphics card 128 to connector 110 for coupled to the memory controller 122, a memory bus that couples the memory controller 122 via the connector 110 to the EXT main memory 82, a processor bus that couples the memory controller 122 via the connector 110 to the EXT processing module 80, a PCI bus that couples a plurality of devices (e.g., devices 190-208) to the I/O controller 130 via the PCI interface 136, and an I/O bus that couples traditional I/O devices (e.g., keyboard 20, mouse 22, printer 24, and/or removable drive 186) to the I/O controller 130 via the I/O interface 134. In an embodiment, the I/O interface 134 may be omitted and the traditional I/O devices may be coupled to the PCI bus or via a USB connection.

Figure 13:
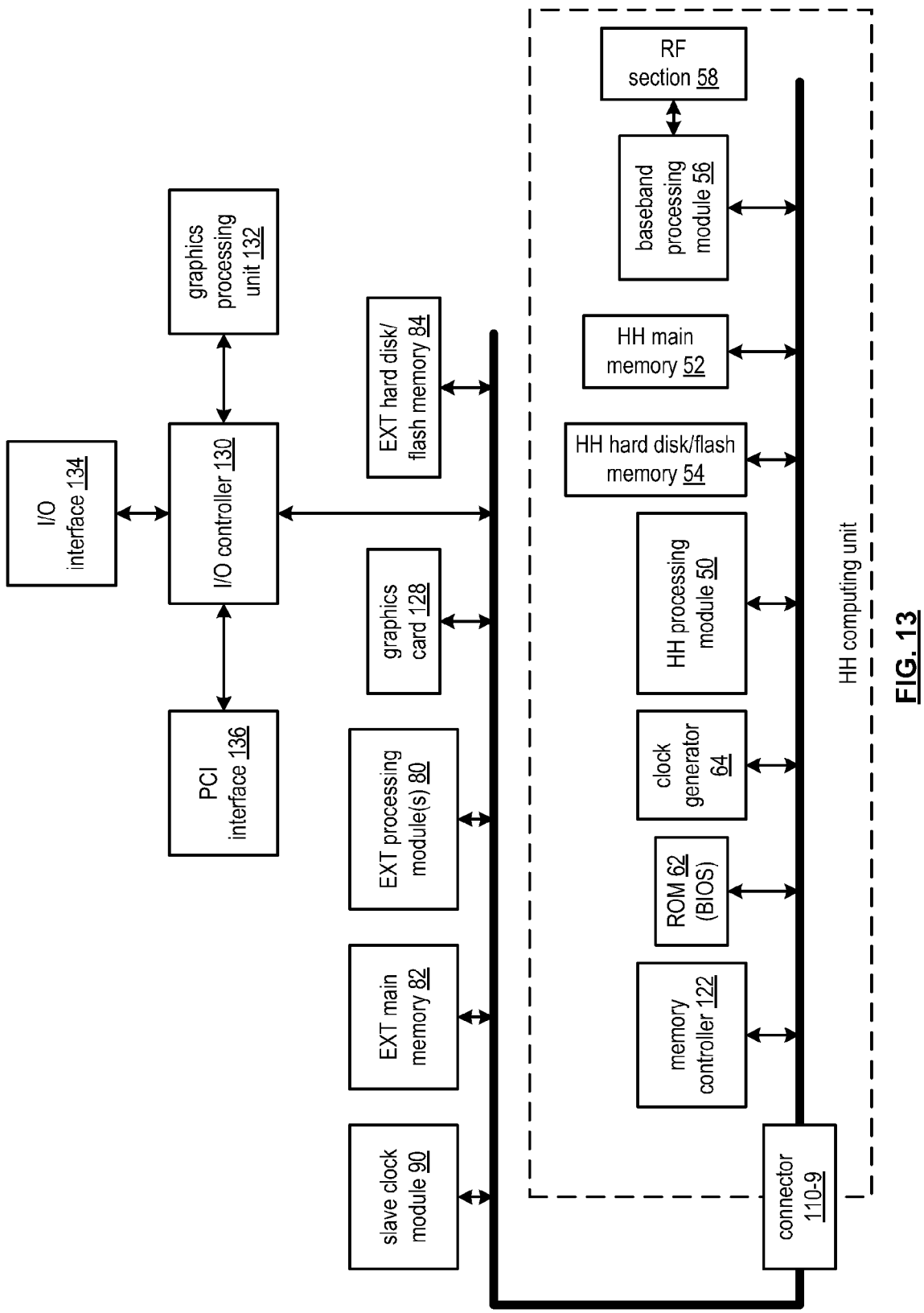
FIG. 13 is a schematic block diagram of another embodiment of core components of a handheld computing unit docked to an extended computing unit in accordance with the present invention.

FIG. 13 is a schematic block diagram of another embodiment of core components of a handheld computing unit 12 docked to an extended computing unit 14. The core components of the handheld computing unit 12 include the HH processing module 50, the HH main memory 52, the HH hard disk/flash memory 54, the baseband processing module 56, the RF section 58, the ROM 62, the handheld connection structure 110-9A, and the memory controller 122. The core components of the extended computing unit 14 include the corresponding connection structure 110-9B, one or more EXT processing modules 80, the EXT main memory 82, the slave clock module 90, the graphics card 128 and/or the graphics processing unit 132, the I/O controller 130, the I/O interface 134, the PCI interface 136, and the host controller 138.

With handheld computing unit 12 docked to the extended computing unit 14, the core components of units 12 and 14 function as a single computing device 10. As such, when the computing device 10 is enabled, the BIOS stored on the HH ROM 62 is executed to boot up the computing device. After initializing the operating system, which will described in greater detail with reference to FIGS. 19-22 and 27-36, the computing device 10 is ready to execute a user application.

In an embodiment, the memory controller 122 is within the handheld computing unit 12 and is coupled to the I/O controller 130, the graphics card 128, the EXT processing module 80, and the EXT main memory via the connector structure 110-9. When connected, the memory controller 122 coordinates the reading data from and writing data to the HH main memory 52 and the EXT main memory 82, by the processing modules 50 and 80, by the user I/O devices coupled directly or indirectly to the I/O controller 130, by the graphics card 128, and/or for data transfers with the HH and/or the EXT hard disk/flash memory 54 and/or 84.

Within the extended computing unit, the EXT processing module 80, the EXT main memory 82, the I/O controller 130, the I/O interface 134, the PCI interface 136, and the host controller 138 may be implemented on a single integrated circuit, each on separate integrated circuits, or some elements may be implemented on the same integrated circuits. For example, the I/O controller 130, the I/O interface 134, the PCI interface 136, and the host controller 138 may be implemented on the same integrated circuit.

Figure 14:
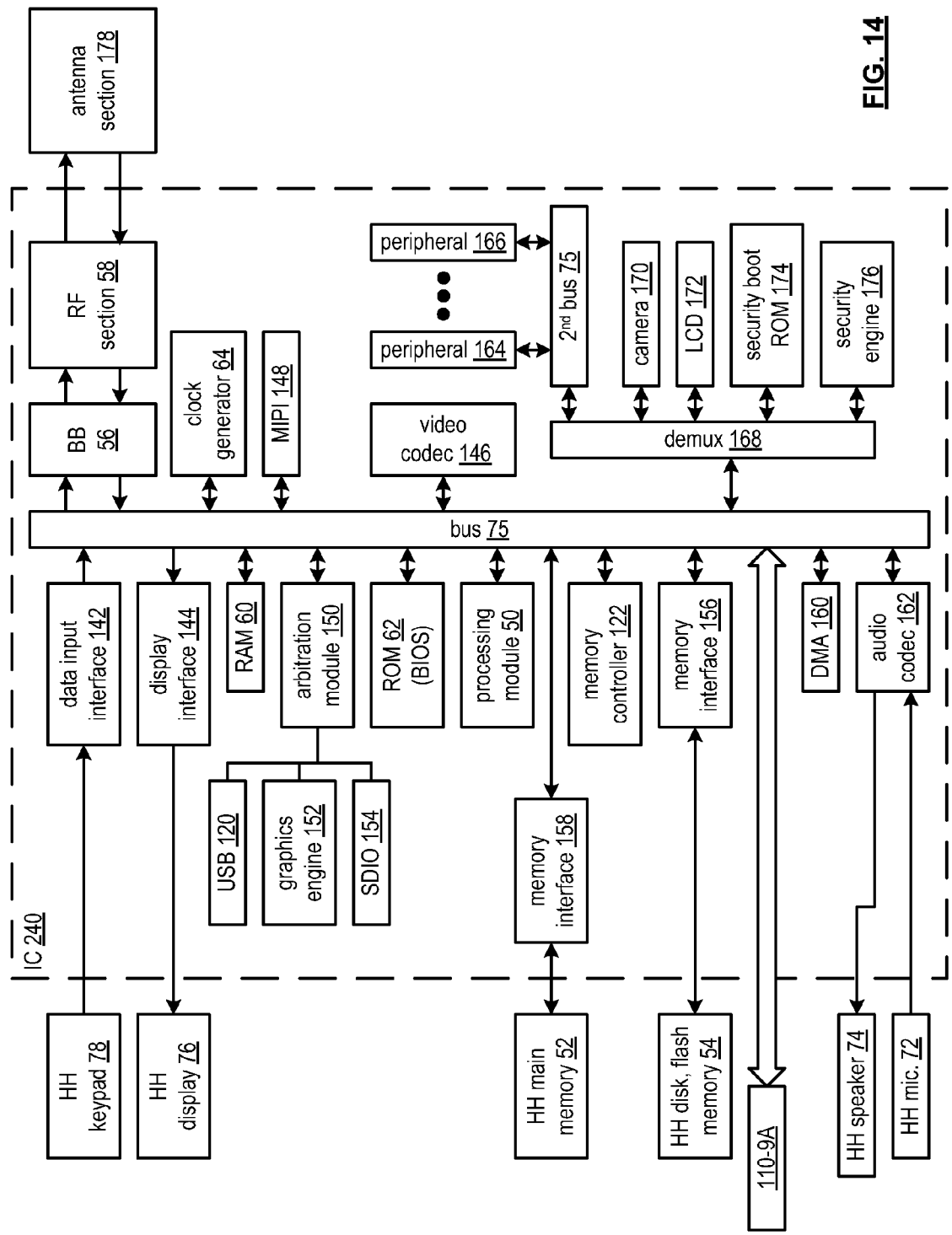
FIG. 14 is a schematic block diagram of another embodiment of a handheld computing unit in accordance with the present invention.

FIG. 14 is a schematic block diagram of another embodiment of a handheld computing unit 12 that may be used in the computing device 10 of FIG. 13. The handheld computing unit 12 includes an integrated circuit (IC) 230, the HH keypad, the HH display, the HH hard disk/flash memory 54, the HH main memory 52, the HH speaker 74, the HH microphone 72, the connection structure 110-9A, an antenna section 178, and may further include an off-chip ROM 63. The IC 140 includes the bus structure 75, the HH processing module 50, the baseband processing module 56, the RF section 58, the ROM 62, the clock generator circuit 64, the memory controller 122, demultiplexers 220 and 222 (optional), the data input interface 142, the display interface 144, the video codec 146 (optional), the mobile industry processor interface (MIPI) interface 148 (optional), the arbitration module 150, the USB interface 120, the graphics engine 152, the secure digital input/output (SDIO) interface 154, the hard disk/flash memory interface 156, the main memory interface 158, a direct memory access (DMA) module 160, an audio codec 162, the demultiplexer 168, the plurality of peripheral interfaces 162-164, the digital camera interface 170, the LCD interface 172, the security boot ROM 174 (which may be included in ROM 62 or a separate ROM), and the security engine 176.

When the handheld computing unit 12 is docked with the extended computing unit 14, the HH processing module 50, the HH main memory 52, the HH hard disk/flash memory 54, the ROM 62, the clock generator circuit 64, and the HH bus structure 75 are coupled to the memory controller 122 and/or to the I/O controller 130 of the extended computing unit 14. In this mode, a docked mode operating system may activate as many or as few of the interfaces of the IC 140. For example, since the EXT display, mouse, keyboard, microphone, speakers and VoIP phone are enabled, the docked mode operating system may deactivate the data input interface 142, the display interface 144, the video codec 146, if included, the audio codec 162, the graphics engine 152, and the MIPI interface 148, if included.

When the handheld computing unit 12 is in the remote mode, a remote mode operating system is active, which activates one or more of the interfaces. For example, the remote mode operating system will active the data input interface 142, the display interface 144, the audio codec 162, the graphics engine 152, the video codec 146, if included, and the MIPI interface 148, if included, to provide the user with character (e.g., voice, audio, video, image, text, graphics, etc.) input and output functionality via the handheld computing unit 12.

As another example, the remote mode operating system may activate the DMA module 160 such that one or more of the other interfaces may provide direct access to the HH main memory 52 without, or with minimal, involvement of the HH processing module 50. In addition, the remote operating system may activate or deactivate the memory controller 122 depending on how HH main memory 52 is to be accessed and/or how involvement of the HH processing module 50 is to be controlled.

In this embodiment, the connector structure 110-9 functions to couple the HH bus structure 75 to the EXT bus structure 112. As such, when coupled, the handheld computing unit 12 and the extended computing unit 14 share a common bus structure, which may be controlled by a bus controller of the memory controller 122 and/or of the HH processing module 50. In general, the bus controller controls access to the shared bus using one or more scheduling functions of first come first serve, shorted job first, shortest remaining time first, a round robin scheme, a priority scheme, etc.

Figure 15:
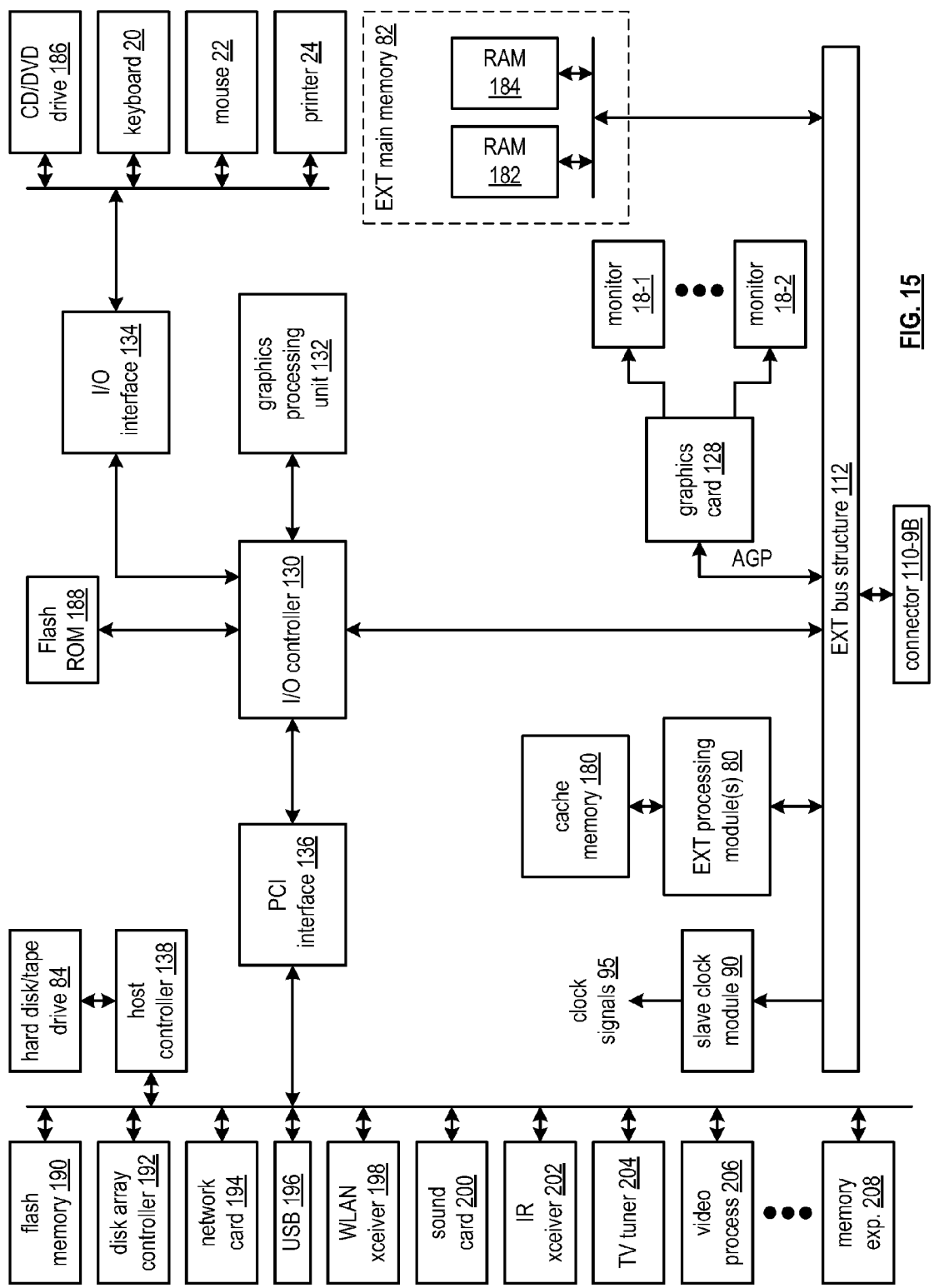
FIG. 15 is a schematic block diagram of another embodiment of an extended computing unit in accordance with the present invention.

FIG. 15 is a schematic block diagram of another embodiment of an extended computing unit 14 that may be used in the computing device 10 of FIG. 10. The extended computing unit 14 includes one or more monitors 18-1 through 18-2, the keyboard 20, the mouse 22, the printer 24, the EXT processing module 80, the EXT main memory 82, the EXT hard disk/flash/tape memory 84, the graphics card 128 and/or the graphics processing unit 132, the I/O controller 130, the I/O interface 134, the PCI interface 136, the EXT bus structure 112, and the connector structure 110-9B. The extended computing unit 14 may further include one or more of a CD/DVD removable drive 186, a flash ROM 188, flash memory 190, a disk array controller 192, a network card 194, a USB connector 196, a WLAN transceiver 198 (e.g., baseband processing module 114 and RF section 116), a sound card 200, an infrared (IR) transceiver 202, a television (TV) tuner 204, a video processing module 206, and one or more memory expansion cards 208. The EXT main memory 82 may include a plurality of RAM ICs and/or RAM expansion cards 162-164.

In an embodiment, the EXT bus structure 112 is coupled to the connection 110-9B such that the EXT bus structure 112 and the HH bus structure 75 become a shared bus structure. In an embodiment, the I/O interface 134 may be omitted and the traditional I/O devices may be coupled to the PCI bus or via a USB connection.

Figure 16:
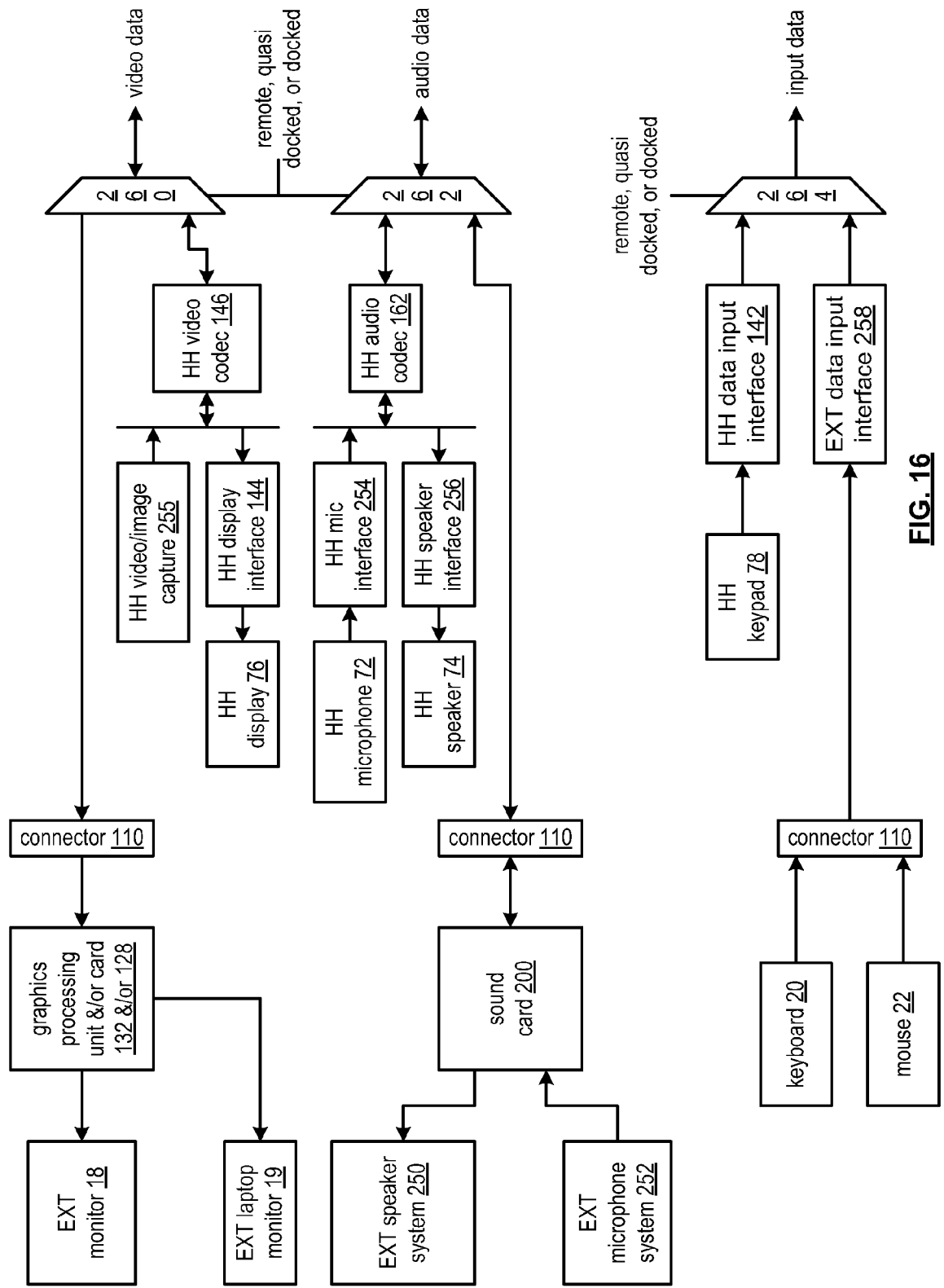
FIG. 16 is a schematic block diagram of an embodiment of core I/O components of a handheld computing unit docked to an extended computing unit in accordance with the present invention.

FIG. 16 is a schematic block diagram of an embodiment of core I/O character components of a handheld computing unit 12 and an extended computing unit 14. The core I/O components of the handheld computing unit 12 include on-chip and off-chip I/O components. The off-chip components include the HH display 76, the HH microphone 72, the HH speaker 74, the HH keypad and/or touch screen 78. The on-chip components include a handheld microphone interface 254, a handheld speaker interface 256, the HH processing module 50, and a digital audio switching module (e.g., multiplexer 262). The handheld computing unit 12 also includes an on-chip to off-chip connector structure that couples the on-chip components to the corresponding off-chip components and/ or to the connector structure 110 that couples the handheld computing unit 12 to the extended computing unit 14.

The on-chip to off-chip connector structure may be implemented using IC pins, RF transceivers, and/or electromagnetic transceivers. RF interconnection transceivers may be implemented as disclosed in co-pending patent applications (1) RF BUS CONTROLLER, having a Ser. No. 11/700,285, and a filing date of Jan. 31, 2007; (2) INTRA-DEVICE RF BUS AND CONTROL THEREOF, having a Ser. No. 11/700, 421, and a filing date of Jan. 31, 2007; (3) SHARED RF BUS STRUCTURE, having a Ser. No. 11/700,517, and a filing date of Jan. 31, 2007, issued as U.S. Pat. No. 7,809,329, on Oct. 5, 2010; (4) RF TRANSCEIVER DEVICE WITH RF BUS, having a Ser. No. 11/700,592, and a filing date of Jan. 31, 2007; and (5) RF BUS ACCESS PROTOCOL AND TRANSCEIVER, having a Ser. No. 11/700,591, and a filing date of Jan. 31, 2007.

When the handheld computing unit 12 is in a remote mode, the baseband processing module 56 may convert outbound data into an outbound symbol stream and convert an inbound symbol stream into inbound data. The RF section may convert the outbound symbol stream into an outbound RF signal and convert an inbound RF signal into the inbound symbol stream. The HH processing module 50 may convert an outbound voice signal into the outbound data and convert the inbound data into an inbound voice signal. In addition, the processing module 50 provides one or more control signals to the digital audio switching module (e.g., multiplexer 262) that causes it to provide the inbound voice signal, as audio data, from the HH processing module 50 to the handheld speaker interface 256 via the HH audio codec 162. The interface 256 provides an analog version of the inbound voice signal to the HH speaker 74, which renders it audible.

The processing module 50 may also provide one or more control signals to the digital audio switching module (e.g., multiplexer 262) that causes it to provide the outbound voice signal from the handheld microphone interface 254 to the HH processing module 50 via the HH audio codec 162. In this configuration, the HH microphone interface 254 receives an analog voice signal from the HH microphone 72. The HH microphone interface 254 may adjust the level of the analog voice signal and/or amplify it prior to providing it to the audio coded 162. The audio codec converts the analog voice signal into the digital outbound voice signal.

The processing module 50 may also provide one or more control signals to the digital audio switching module (e.g., multiplexer 262) that causes it to provide the inbound voice signal from the processing module 50 to the on-chip to off-chip connector structure 110 when the handheld computing unit 12 is coupled to the extended computing unit 14. In this configuration, the sound card 200 receives the digital inbound voice signal and converts it into an analog signal. The sound card 200 then provides the analog audio signal to the EXT speaker system 250, which may be a single speaker, a stereo speaker set, a multiple channel speaker system, or speakers of a headset.

The processing module 50 may also provide one or more control signals to the digital audio switching module (e.g., multiplexer 262) that causes it to provide the outbound voice signal from the on-chip to off-chip connector structure 110 to the processing module 50 when the handheld computing unit 12 is in the docked mode. In this configuration, the sound card 200 receives an analog voice signal from the EXT microphone system 252, which one or more microphones or a microphone of a headset. The sound card 200 converts the voice signal into a digital signal that is provided to the processing module 50 via the connector 110.

In an embodiment, the HH processing module 50 generates output user data and input user data (e.g., non-voice data) relating to processing a handheld user application (i.e., an application that is currently being executed and/or has at least part of its code stored in the HH main memory 52). In addition, the non-voice data may include data transceived during a data cellular telephone call and are routed in a similar manner as the input and output user data. In this instance, the HH processing module 50 provides one or more control signals to a data switch module (e.g., multiplexer 260) that causes it to provide the output user data from the HH processing module 50 to the handheld display interface 144 via the HH video codec 146 and/or the graphics engine 152 (not shown) when the handheld computing unit 12 is in the remote mode. In this configuration, the output user data (e.g., a video, an image, text, graphics, etc.) is provided, as video data, to the HH video codec 146, which converts the data into an analog signal. The HH display interface 144 provides the analog signal to the HH display 76. In an alternate embodiment, the HH video codec may be bypassed if the HH display 76 is capable of receiving digital video and/or graphics signals.

The processing module 50 may also provide one or more control signals to the data switch module (e.g., multiplexer 260) that causes it to provide the output user data from the processing module 50 to the on-chip to off-chip connector structure 110 when the handheld computing unit 12 is in the docked mode. In this configuration, the output user data is provided to the graphics processing unit 132 and/or to the graphics card 128, which converts the output user data into a composite video signal, an S-video signal, or a component video signal. The EXT monitor 18 or 19 receives the resulting video signal and renders it visible.

The processing module 50 may also provide one or more control signals to the data switch module (e.g., multiplexer 264) that causes it to provide the input user data from the handheld data input interface 142 to the processing module 50 when the handheld computing unit 12 is in the remote mode. In this configuration, the HH keypad, touch screen, speed wheel, etc. 78 provides a user input to the HH data input interface 142. The data switch module provides the user input to the HH processing module 50.

The processing module 50 may also provide one or more control signals to the data switch module (e.g., multiplexer 264) that causes it to provide the input user data from the on-chip to off-chip connector structure 110 to the processing module 50 when the handheld computing unit 12 is in the docked mode. In this configuration, user data entered into the keyboard and/or mouse is provided to an EXT data input interface 258 via the connector 110. The EXT data input interface 258 provides the user input data to the processing module 50 via the data switch module.

In this embodiment and in others, an interface module includes hardware, software, and/or memory to facilitate the transfer of signals from a corresponding device to a bus structure 75 and/or 112. For example, an interface may include driver software, an amplifier, a level adjusting circuit, a signal format adjusting circuit (e.g., serial to parallel, parallel to serial, low voltage differential signaling, etc.), an input buffer, and/or an output buffer. As a specific example, the HH data input interface 142 may include a driver for a particular type of HH keypad 78, may include a level shifting circuit to adjust the voltage level of the signal and/or a signal format adjusting circuit, and a buffer to store the data until it is ready to be forwarded.

Figure 17:
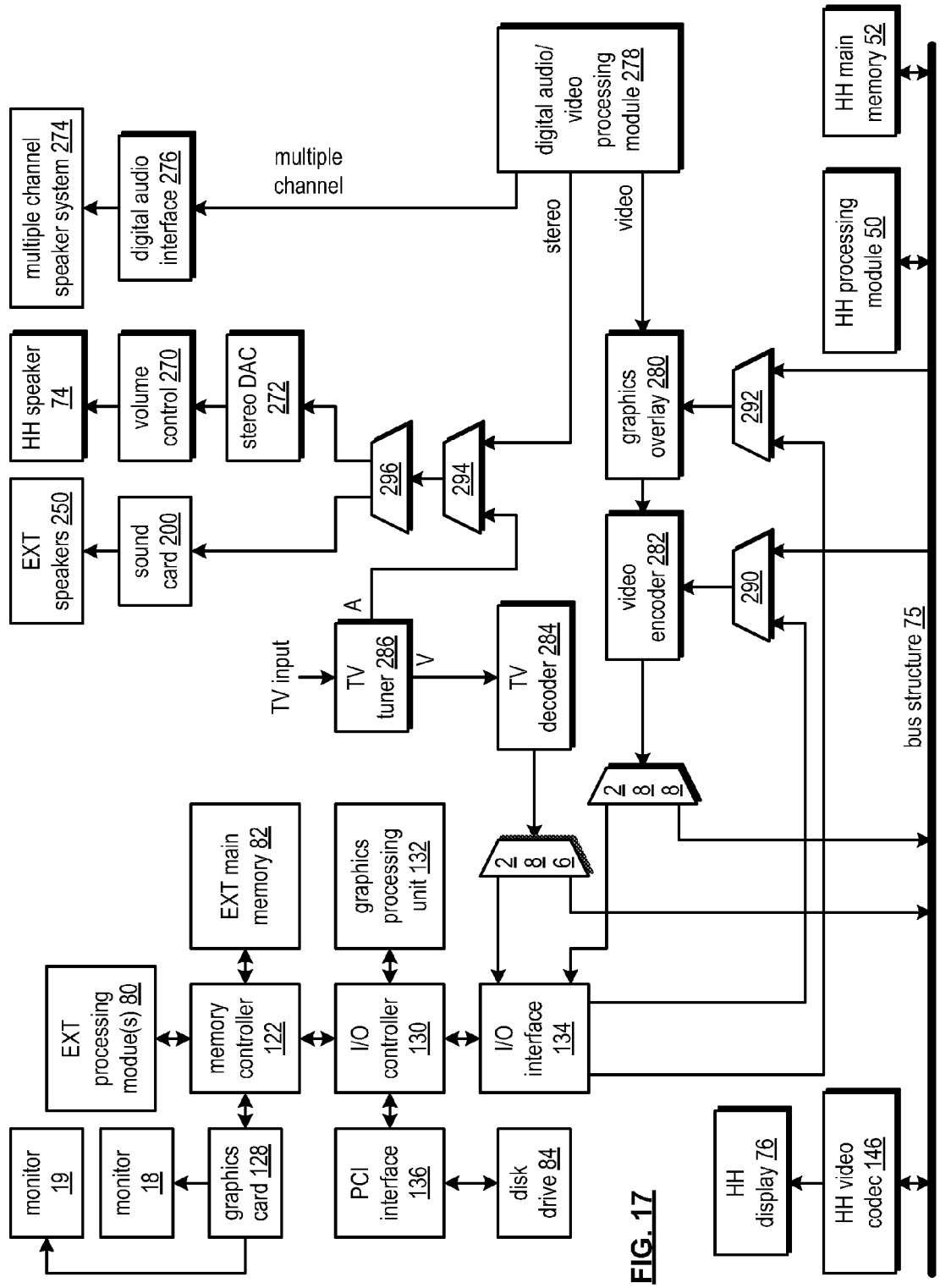
FIG. 17 is a schematic block diagram of another embodiment of core I/O components of a handheld computing unit docked to an extended computing unit in accordance with the present invention.

FIG. 17 is a schematic block diagram of another embodiment of core I/O components of a handheld computing unit 12 and an extended computing unit 14. The core I/O components of the handheld computing unit 12 are in shadowed boxes and include the HH processing module 50, the HH main memory 52, the HH video codec 146, the HH display 76, a plurality of multiplexers 290-296, a plurality of demultiplexers 286-288, a digital audio/video processing module 278, a graphics overlay module 280, a video encoder 282, a TV tuner 286, a TV decoder 284, a stereo DAC (digital to analog converter) 272, a volume control module 270, the HH speaker 74, and a digital audio interface 276. The core I/O components of the extended computing unit 14 are in the non-shadowed boxes and include a multiple channel speaker system 274, the sound card 200, the EXT speakers 250, the monitors 18 and/or 19, the EXT processing module 80, the memory controller 122, the graphics card 128, the EXT main memory 82, the I/O controller 130, the PCI interface 136, the graphics processing unit 132, the I/O interface 134, and the disk drive 84, via the host controller (not shown). Note that, alternatively, the memory controller 122 may be within the handheld computing unit 12 as previously discussed.

In this embodiment, audio/video signals may be generated by the TV tuner 286 or by the digital audio/video processing module 278. The HH processing module 50 and/or the EXT processing module 80 may generate graphics that overlay the video signals to produce graphic overlay video signals. In addition, the digital audio/video processing module 278 may produce digital audio signals. Further, the HH processing module 50 and/or the EXT processing module 80 may generate more traditional computer input data and/or output data and/or inbound and outbound voice signals as discussed with reference to FIG. 16.

In a video playback mode, the digital audio/video processing module converts a stored video file into a first formatted outbound digital video stream and a corresponding outbound stereo digital audio stream. Such a conversion may include descrambling, scaling, decompressing, adjusting brightness, adjusting contrast, adjusting hue, and/or adjusting sharpness. The video stream is provided to the graphics overlay module 280, which, when activated, adds a graphics overlay generated by the HH processing module 50 and/or the EXT processing module 80. The graphics overlay module 280 provides its output to the video encoder 282, which generates a composite video signal, an S-video signal, or a component video signal. In addition, the corresponding outbound stereo digital audio stream is provided to an audio multiplexing module 294-296.

When the handheld computing unit 12 is in the remote mode, the audio multiplexing module 294-296 provides the corresponding outbound stereo digital audio stream to the stereo DAC 272, which converts it into an analog signal. The volume adjust signal adjust the level of the analog signal and provides it to the HH speaker 74. Note that if the HH speaker 74 includes a single speaker, the analog stereo signal is combined to produce a monotone signal. In addition, the video encoder 282 provides the composite video signal to the video codec 146, which converts the signal to an analog video signal. The HH display 76 receives the analog video signal via the display interface 144 and presents it. Note that if the HH display is a digital display, the video codec may be bypassed.

When the handheld computing unit 12 is in the docked mode, the audio multiplexing module 294-296 provides the corresponding outbound stereo digital audio stream to the sound card 200, which converts it into an analog signal and provides to the EXT speaker 250. In addition, the video encoder 282 provides the composite video signal to the I/O interface 134, which provides it to the graphics processing unit 132 and/or to the graphics card 128. The EXT monitor 18 and/or 19 receives the resulting video signal via the graphics card 128 and presents it.

In an alternate embodiment, the digital audio/video processing module 278 converts video file into a second formatted outbound digital video stream and a corresponding outbound multi-channel digital audio stream when the handheld computing unit is in a second docked mode. In this mode, the digital audio/video processing module 278 provides the corresponding outbound multi-channel digital audio stream to the digital audio interface 276, which provides the signal to the multiple channel speaker system 274. In addition, the video encoder 282 provides an S-video signal or component video signal to the I/O interface 134, which provides it to the graphics processing unit 132 and/or to the graphics card 128. The EXT monitor 18 and/or 19 receives the resulting video signal via the graphics card 128 and presents it.

In another embodiment, the digital audio/video processing module 278 converts an audio file into a stereo outbound digital audio stream. Such a conversion may include descrambling, equalization, and/or decompressing. When the handheld computing unit 12 is in the remote mode, the stereo outbound digital audio stream is provided to the stereo DAC 272 and, when the handheld computing unit 12, the stereo outbound digital audio stream is provided to the sound card 200.

In another embodiment, the digital audio/video processing module 278 converts the audio file into a multi-channel outbound audio stream. Such a conversion may include descrambling, equalization, and/or decompressing. When the handheld computing unit 12 is in the docked mode, the multi-channel outbound digital audio stream is provided to the digital audio interface 276.

When the television (TV) tuner is active, it generates a TV digital audio signal and a TV digital video signal. The TV tuner 286 provides the digital video signal to the TV decoder and provides the TV digital audio signal to the multiplexing module 294-296. When the handheld computing unit 12 is in the remote mode, the multiplexing module 294-296 provides the TV digital audio signal to the stereo DAC 272 and demultiplexer 286 provides the TV digital video signal to the HH video codec 146 or directly to the HH display interface 144. When the handheld computing unit 12 is in the docked mode, the multiplexing module 294-296 provides the TV digital audio signal to the sound card 200 and the demultiplexer 286 provides the TV digital video signal to the I/O interface 134.

Figure 18:
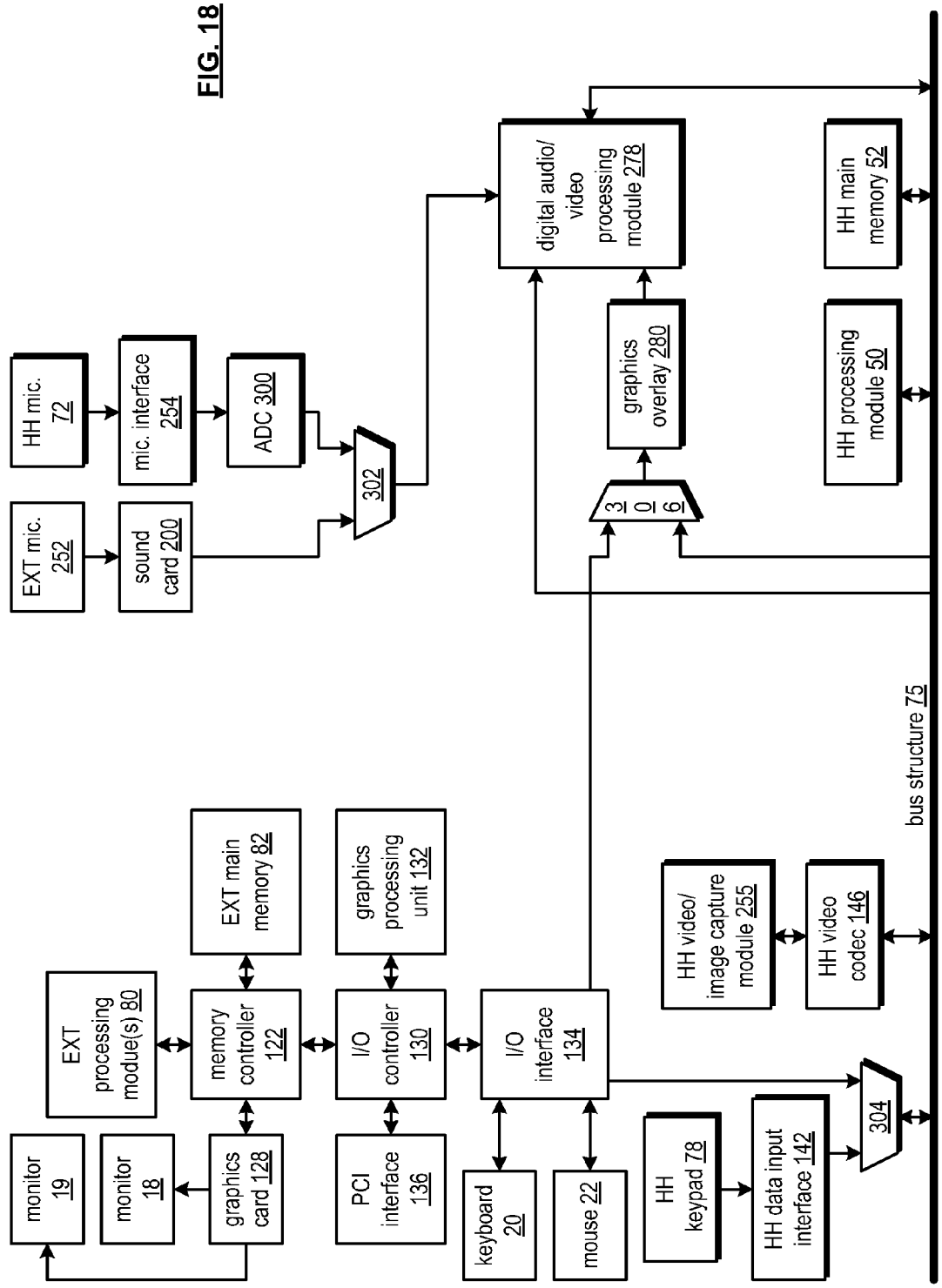
FIG. 18 is a schematic block diagram of another embodiment of core I/O components of a handheld computing unit docked to an extended computing unit in accordance with the present invention.

FIG. 18 is a schematic block diagram of another embodiment of core I/O components of a handheld computing unit 12 and to an extended computing unit 14. The core I/O components of the handheld computing unit 12 are in shadowed boxes and include the HH processing module 50, the HH main memory 52, the HH graphics engine 152, the HH display 76, a plurality of multiplexers 302-306, a digital audio/video processing module 278, a graphics overlay module 280, a video/image capture module 255, an ADC (analog to digital converter) 300, a microphone interface 254, the HH microphone 72, the HH keypad 78, and the HH data input interface 142. The core I/O components of the extended computing unit 14 are in the non-shadowed boxes and include an EXT microphone 252, the sound card 200, the monitors 18 and/or 19, the EXT processing module 80, the memory controller 122, the graphics card 128, the EXT main memory 82, the I/O controller 130, the PCI interface 136, the graphics processing unit 132, the I/O interface 134, the keyboard 20, and the mouse 22. Note that, alternatively, the memory controller 122 may be within the handheld computing unit 12 as previously discussed.

In this embodiment, character inputs (e.g., text, graphics, video, images, and/or a combination thereof) may be received via the keyboard 20, the mouse 22, the HH video/image capture module 255, the EXT microphone 252, or the HH microphone 72 depending on the mode of the handheld computing unit 12. The processing of inputs from the keyboard 20, the mouse 22, and the HH keypad 78 has been previously discussed.

When the HH video/image capture module 255 is active, it generates an analog video stream or an analog video image, which are provided to the video codec 146. The video codec converts the analog video or digital image into a digital signal that is provided to the digital audio/video processing module 278 via the graphics overlay module 280. The video codec 146 may be by-passed if the capture module 255 provides a digital output. If the processing module 50 provides graphics (e.g., a text message such as "recorded on Jan. 30, 2008 in Denver", two-dimensional graphics, or a three-dimensional graphics) to be overlaid with the digital video or the digital image, the graphics overlay module 280 performs the overlay function. The resulting digital video and/or digital image with or without an overlay is provided to the digital audio/video processing module 278, which generates a video file or image file therefrom. The processing may include one or more of scrambling, compression, encoding, scaling, etc. The resulting file is stored in the HH hard disk/flash memory 54.

The digital audio/video processing module 278 may also store digital audio files of received audio inputs from the sound card 200 or the HH microphone 72. In this instance, the received audio signals are converted to a digital format, if not received that way. The digital audio/video processing module 278 compresses, equalizes, etc. the digital audio signals to produce a digital audio file.

FIG. 19 is a table of an example of devices within a handheld computing unit 12 and an extended computing unit 14 that may be active in various modes of the handheld computing device 12. In this example, the computing device 10 may include one or more of the following in the handheld computing unit 12 and/or in the extended computing unit 14, where the status of the device is dependent on the mode of the handheld computing unit. The list of devices includes, but is not limited to, a power supply, a removable drive, a CD-ROM/DVD-ROM drive, a tape drive, a hard drive, a floppy drive, a host controller, AGP expansion slots, PCI expansion slots, a video card and/or a graphics card, RAM, a real time clock (RTC), CMOS memory for storing configuration information, a BIOS, a microprocessor, a USB connection, a mouse port, a keyboard port, a network connection, a parallel port, serial ports, flash memory slots, and a cellular telephone functionality.

When the handheld computing unit 12 is in the remote mode, the power supply for the extended computing unit 14 is off, as such, all of the devices of the extended computing unit are off. In this mode, power for the handheld computing unit is provided by a battery and the listed components are enabled (e.g., on). When the handheld computing unit 12 is in the quasi docked mode, the power supply of the extended computing unit is on and the extended computing unit devices are activated and/or deactivated as indicated. Similarly, the handheld computing unit devices are activated and/or deactivated as indicated. When the handheld computing unit 12 is in the docked mode, the battery is disabled and the handheld computing unit 12 is powered by the power supply of the extended computing unit 14. In addition, the extended computing unit 14 may include a battery charger to charge the battery of the handheld computing unit. The devices of the units 12 and 14 are activated and/or deactivated as indicated. Accordingly, when the handheld device is in different modes, different operating systems are used as will be subsequently described.

Figure 20:
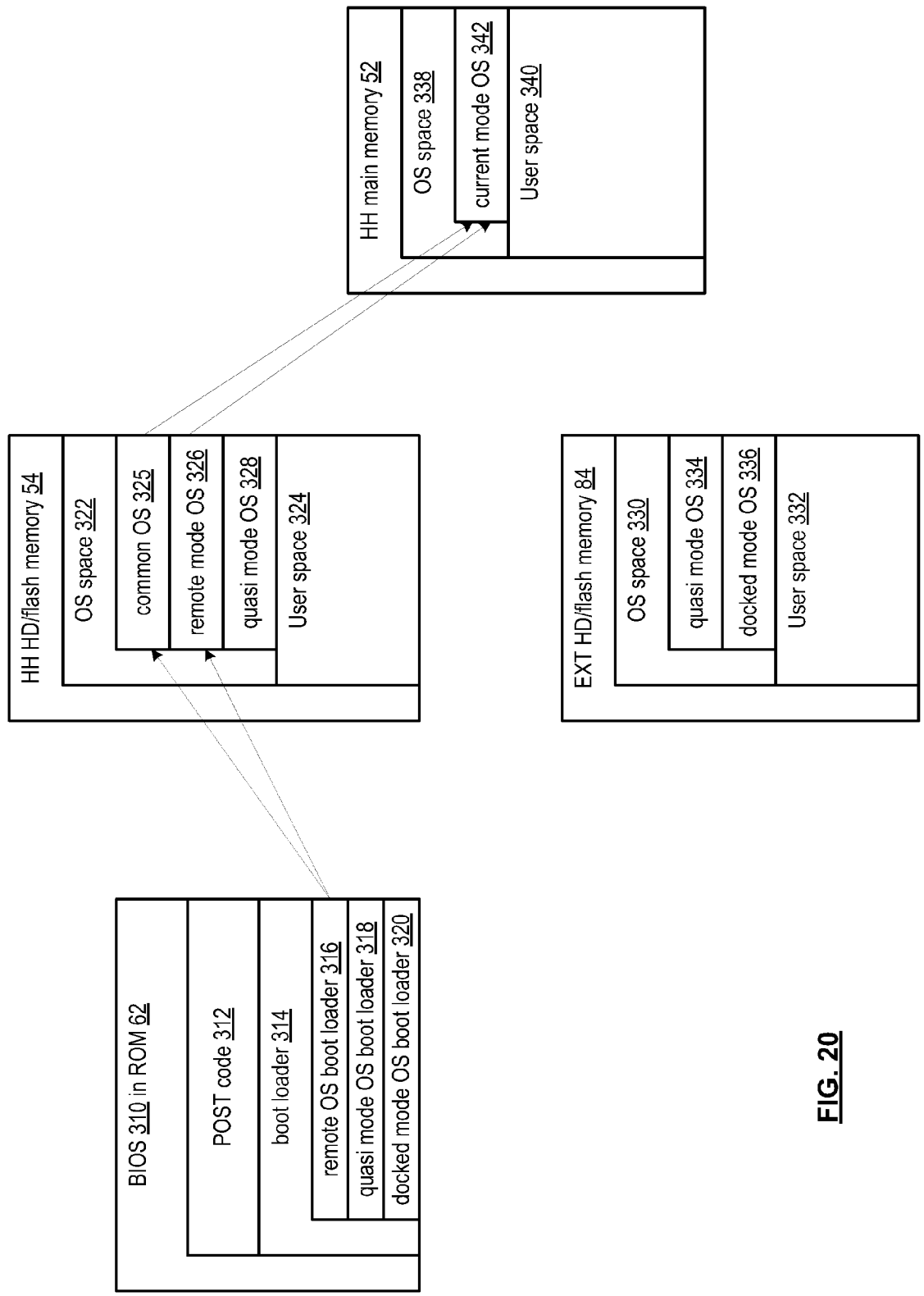
FIG. 20 is a diagram of an example of accessing BIOS and an operating system from memory of a handheld computing unit and an extended computing unit in accordance with the present invention.

FIG. 20 is a diagram of an example of accessing the BIOS 310 and an operating system from memory of a handheld computing unit 12 and an extended computing unit In this example, the BIOS 310 is stored in ROM 62 of the handheld computing unit 12. The BIOS 310 includes a power on self test (POST) code section 312 and a boot loader section 312, which includes a remote mode operating system boot loader section 316, a quasi docked mode operating system boot loader section 318, and a docked mode boot loader section 320. An example of the POST code 312 will be provided with reference to FIGS. 23-26.

In this example, the HH hard disk/flash memory 54 includes an operating system space 322 and a user space 324. The OS space 322 includes the common OS section 325, an remote mode OS section 326, and a quasi docked mode OS section 328. The EXT hard disk/flash memory 84 includes an OS space 330 and a user space 332. The OS space 330 includes a quasi mode OS section 334 and a docked mode OS section 336. Since each mode of operation of the handheld computing device 12 utilizes different devices, each mode has a correspondingly different operating system that includes common OS components and exclusive OS components. Examples of the various operating systems will be discussed with reference to FIGS. 27-36.

When the handheld computing unit is in the remote mode, which is determined during execution of the POST code 312, the remote mode operating system (OS) boot loader 316 is accessed. The remote mode OS boot loader 316, which may be a multiple stage boot loader, points to the common OS section 325 and to the remote mode OS section 326 of the HH hard disk/flash memory 54. The common OS section 325 includes operating system functions that are common for certain devices, processes, files, and/or applications of the handheld computing unit 12 regardless of the mode and the remote mode OS section includes operating system functions are unique to certain other devices, processes, files, and/or applications of the handheld computing unit when it is in the remote mode. Note that the common OS functions may be considered a subset of the remote operating system functions, of quasi-docked operating system functions, and/or of docked operating system functions.

The remote mode OS boot loader 316 instructs the HH processing module 50 and/or memory controller 122, if included within the handheld computing unit 12, to facilitate the transfer of the common OS functions, or at least a portion thereof, and the remote OS functions, or at least a portion thereof, to the HH main memory 52. The HH main memory 52 has an OS space 338 and a user space 340. The OS space 338 is used to store the current mode OS 342, which, in this example, is the remote mode operating system. Note that the OS space 338 may vary in size depending on which operating system is being loaded and further note that the OS space 338 is a privileged memory section that is accessible only to the processing module 50 when in an operating system kernel mode. Once the current OS is loaded in the HH main memory 52, the OS may initiate a graphical user interface and a log in procedure.

Figure 21:
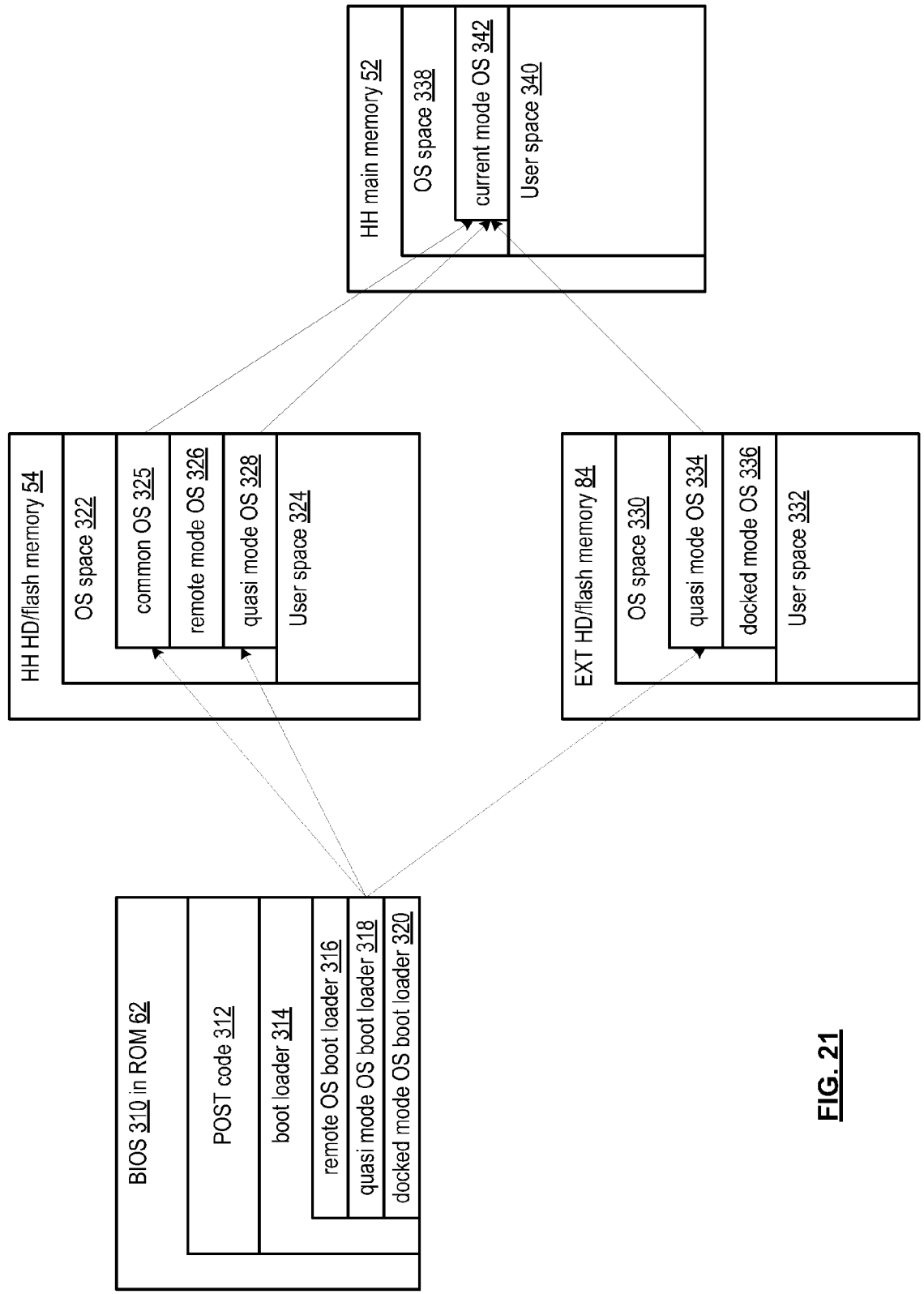
FIG. 21 is a diagram of another example of accessing BIOS and operating system from memory of a handheld computing unit and an extended computing unit in accordance with the present invention.

FIG. 21 is a diagram of another example of accessing the BIOS 310 and an operating system from memory of a handheld computing unit 12 and an extended computing unit 14. In this example, the handheld computing unit is in the quasi docked mode, which is determined during execution of the POST code 312. As such, the quasi docked mode operating system (OS) boot loader 318 is accessed. The quasi docked mode OS boot loader 318, which may be a multiple stage boot loader, points to the common OS section 325, to the quasi docked mode OS section 328 of the HH hard disk/flash memory 54, and may further point to the quasi docked mode OS section 334 of the EXT hard disk/flash memory 84. The quasi docked OS section 328 includes operating system functions that are unique to certain devices, processes, files, and/or applications of the handheld computing unit 12 and the quasi docked OS section 334 includes operating system functions that are unique to certain devices, processes, files, and/or applications of the extended computing unit when the handheld computing unit is in the quasi docked mode.

In this example, the quasi docked mode OS boot loader 318 instructs the HH processing module 50 and/or memory controller 122, if included within the handheld computing unit 12, to facilitate the transfer of the common OS functions, or at least a portion thereof, and the quasi docked OS functions, or at least a portion thereof, from the HH hard disk/flash memory 54 to the HH main memory 52. In addition, the quasi docked mode OS boot loader 318 instructs the HH processing module 50 and/or memory controller 122 to facilitate a transfer of the quasi docked OS functions, or at least a portion thereof, from the EXT hard disk/flash memory 84 to the OS space 338 of the HH main memory 52. The OS space 338 is used to store the current mode OS 342, which, in this example, is the quasi docked mode operating system. Note that the OS space 338 may vary in size depending on which operating system is being loaded and further note that the OS space 338 is a privileged memory section that is accessible only to the processing module 50 when in an operating system kernel mode. Once the current OS is loaded in the HH main memory 52, the OS may initiate a graphical user interface and a log in procedure.

Figure 22:
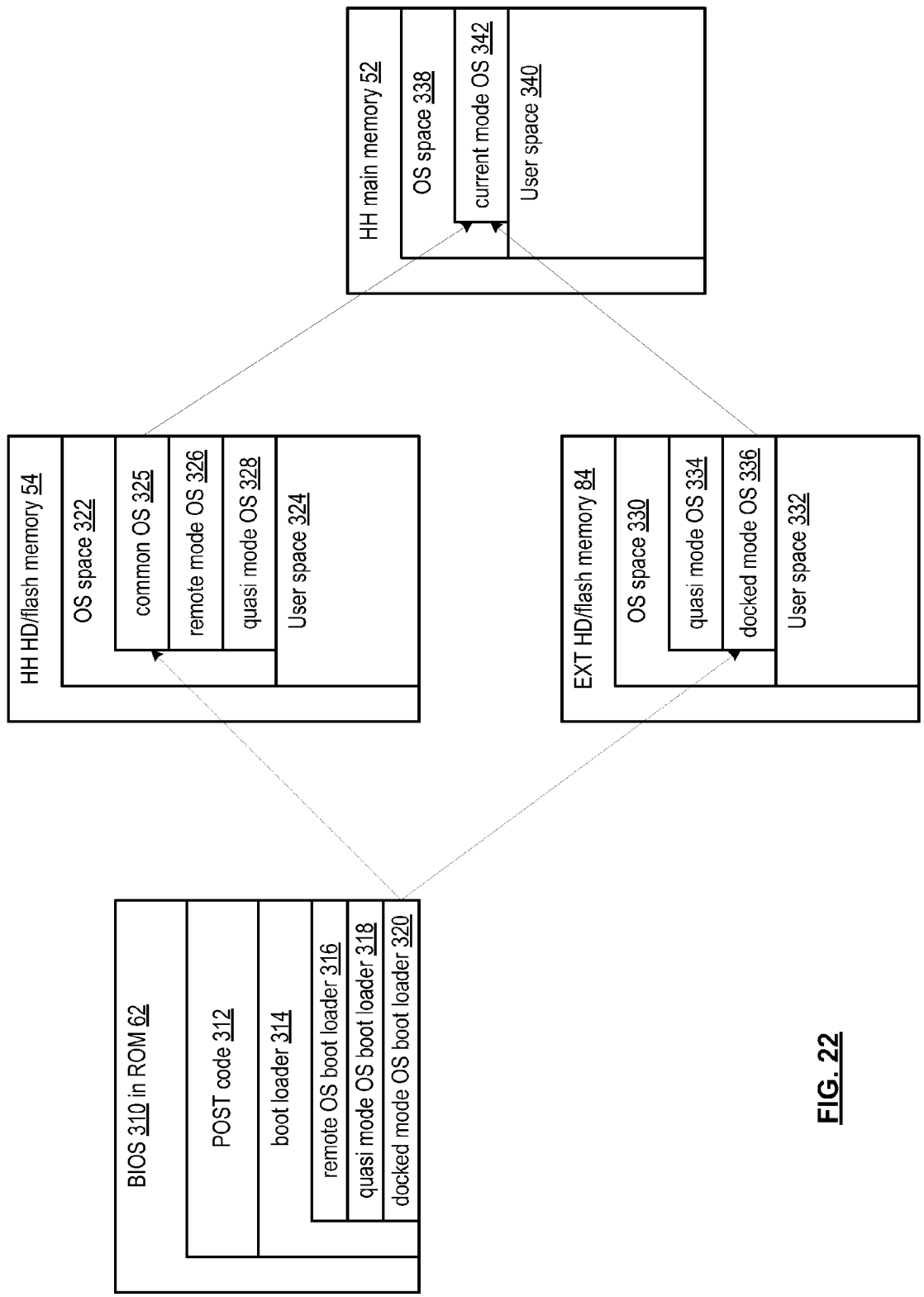
FIG. 22 is a diagram of another example of accessing BIOS and operating system from memory of a handheld computing unit and an extended computing unit in accordance with the present invention.

FIG. 22 is a diagram of another example of accessing the BIOS 310 and an operating system from memory of a handheld computing unit 12 and an extended computing unit 14. In this example, the handheld computing unit is in the docked mode, which is determined during execution of the POST code 312. As such, the docked mode operating system (OS) boot loader 320 is accessed. The docked mode OS boot loader 320, which may be a multiple stage boot loader, points to the common OS section 325 and to the docked mode OS section 336 of the EXT hard disk/flash memory 84. The docked OS section 336 includes operating system functions that are unique to certain devices, processes, files, and/or applications of the extended computing unit when the handheld computing unit is in the docked mode.

In this example, the docked mode OS boot loader 320 instructs the HH processing module 50 and/or memory controller 122, if included within the handheld computing unit 12, to facilitate the transfer of the common OS functions, or at least a portion thereof, and the docked OS functions, or at least a portion thereof, from the EXT hard disk/flash memory 84 to the HH main memory 52. The OS space 338 is used to store the current mode OS 342, which, in this example, is the docked mode operating system. Note that the OS space 338 may vary in size depending on which operating system is being loaded and further note that the OS space 338 is a privileged memory section that is accessible only to the processing module 50 when in an operating system kernel mode. Once the current OS is loaded in the HH main memory 52, the OS may initiate a graphical user interface and a log in procedure.

Figure 23:
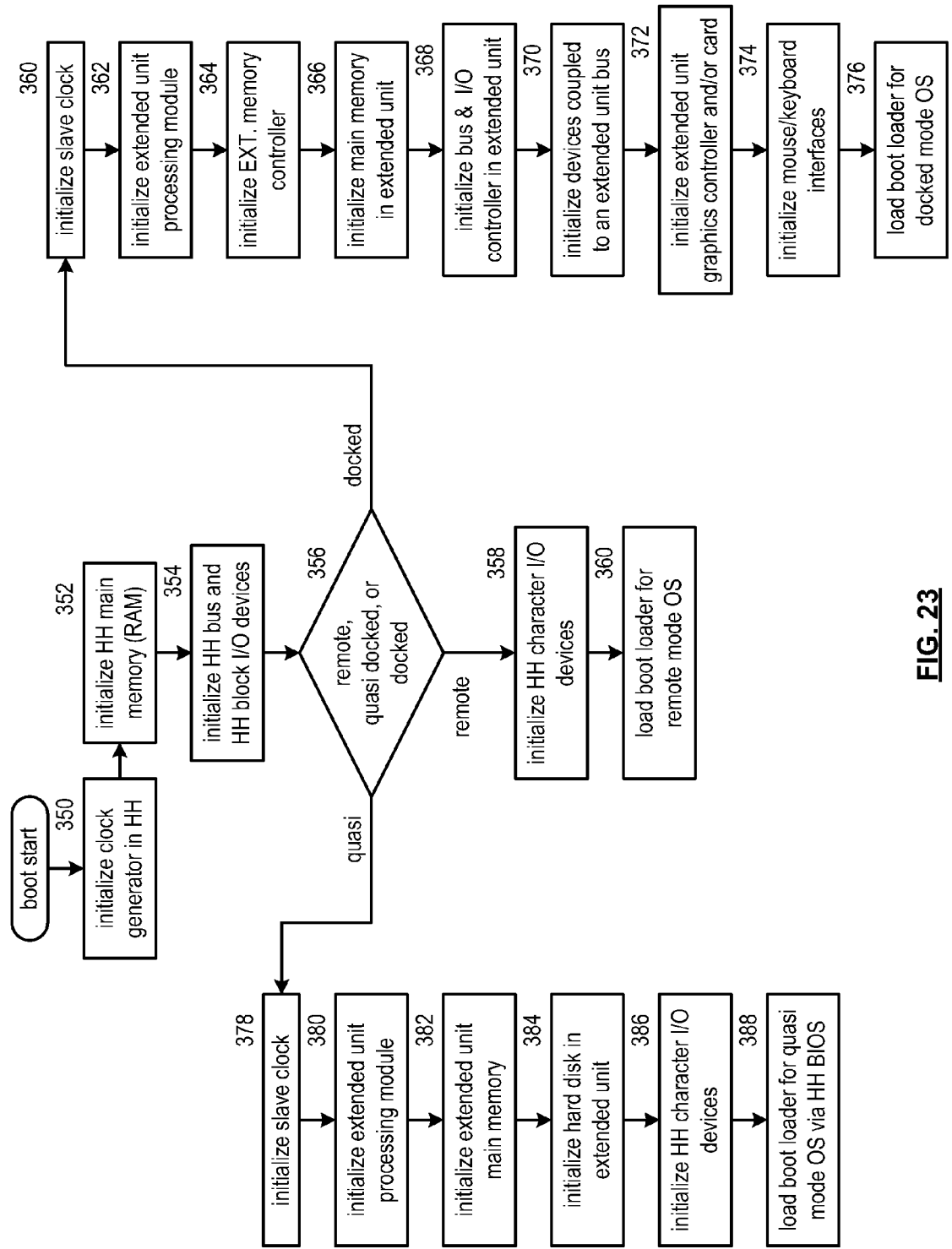
FIG. 23 is a logic diagram of an embodiment of a BIOS method in accordance with the present invention.

FIG. 23 is a logic diagram of an embodiment of a BIOS method. In general, the BIOS is firmware run primary by the HH processing module 50 when the handheld computing unit is first powered on to identify and initiate component hardware (e.g., hard disks, I/O character devices, I/O block devices, etc.) based on the configuration of the computing device 10 (e.g., handheld computing unit is in a remote mode, a quasi docked mode, or a docked mode). This boot function prepares the computing unit 10 (e.g., handheld computing unit 12 and none, some, or all of the extended computing unit 14) such that the operating system and then user applications can be loaded, execute, and assume control of the computing device 10. Note that the handheld computing device 12 may include a back-up BIOS that is stored on a different ROM, EEPROM, and/or flash ROM from ROM 62 for use in case the BIOS on ROM 62 gets corrupted.

Prior to executing the steps of FIG. 23, a boot block algorithm may be executed to verify that the BIOS is not corrupted. If the BIOS is corrupted, the back-up BIOS will be accessed. The back-up BIOS includes the same operational instructions as the main BIOS in ROM 62. Once the BIOS is verified (main or back-up), the POST code 312 is executed after the HH processing module 50 is reset. Upon reset, the HH processing module 50 attempts to access a memory location commonly referred to as a reset vector. For a hard reboot (e.g., at power on, mode change, or user initiated), the memory controller directs the code fetch to the BIOS located on the ROM 62.

The method begins at step 350 where the HH clock generator is initialized, which includes powering on the HH clock generator and monitoring for a steady state of its clock signals. Once the clock signals are in a steady state, the clock generator circuit is deemed to have been initialized. The method then proceeds to step 352 where the handheld main memory is initialize. Initialization of the handheld main memory includes finding it, determining its size, and verifying that it is operating properly. Note that once the HH main memory is initialized, the BIOS may be copied and decompressed from ROM 62 and stored in the HH main memory and executed from there.

The method continues at step 354 where the handheld bus structure and the handheld I/O devices are initialized. The handheld I/O devices initialized at this step will be primarily block I/O devices, ports, and/or general operation related. For example, the I/O devices that may be initialized include one or more of the HH hard disk/flash memory 54, the USB connection 120, the SDIO interface 154, the LCD interface 172, a block I/O device coupled a peripheral interface 164-166, etc. The method continues at step 356 where the HH processing module determines the mode of the handheld computing unit 12.

When the handheld computing unit is in the remote mode, the method continues at step 358 where character I/O devices of the handheld computing unit are initialized. Such character I/O devices includes the handheld graphics engine, the HH keypad 78, the HH display 76, the HH microphone 72, the HH speaker 74, the camera interface 170, a character I/O device coupled to a peripheral interface 164-166, etc. The method then proceeds to step 360 where the remote mode operating system boot loader is loaded.

When, at step 356, it is determined that the handheld computing unit is in a docked mode, the method continues at step 360 where the slave clock module is initialized. This generally includes receiving a master clock from the clock generator circuit 64 of the handheld computing unit, generating one or more EXT clock signals, and verifying steady state of the EXT clock signals. The method continues at step 362 where the extended (EXT) processing module is initialized. This may be done by resetting the EXT processing module.

The method continues at step 364 where the memory controller is initialized (e.g., reset). Note that step 364 may be done in parallel with step 362. The method continues at step 366 where the extended main memory is initialized. This may include finding it, determining its size, and verifying that it is operating properly. The method continues at step 368 where the extended bus structure and the I/O controller are initialized. The bus may be initialized by finding it, determining its size (e.g., 16 bit, 32 bit, etc.), and verifying that it is operating properly. Once the bus is initialized, the I/O controller is initialized.

The method continues at step 370 where the extended I/O devices coupled to the extended bus structure or to the I/O controller are initialized. Such I/O devices includes one or more of the flash memory, the disk array controller, the network card, the USB connection, the WLAN transceiver, the sound card, the IR transceiver, the TV tuner, a memory expansion card, etc. The method continues at step 372 where at least one of an extended graphics controller and an extended graphics card are initialized. The method continues at step 374 where the mouse and keyboard are initialized. The method continues at step 376 where the docked mode operating system boot loader is loaded.

When, at step 356, it is determined that the handheld computing unit is in a quasi docked mode, the method continues at step 378 where the slave clock module is initialized. The method continues at step 380 where the extended processing module is initialized. The method continues at step 382 where the extended main memory is initialized. The method continues at step 384 where the EXT hard disk/flash memory is initialized. The method continues at step 386 where the HH character I/O devices are initialized. The method continues at step 388 where the quasi docked mode operating system boot loader is loaded.

Figure 24:
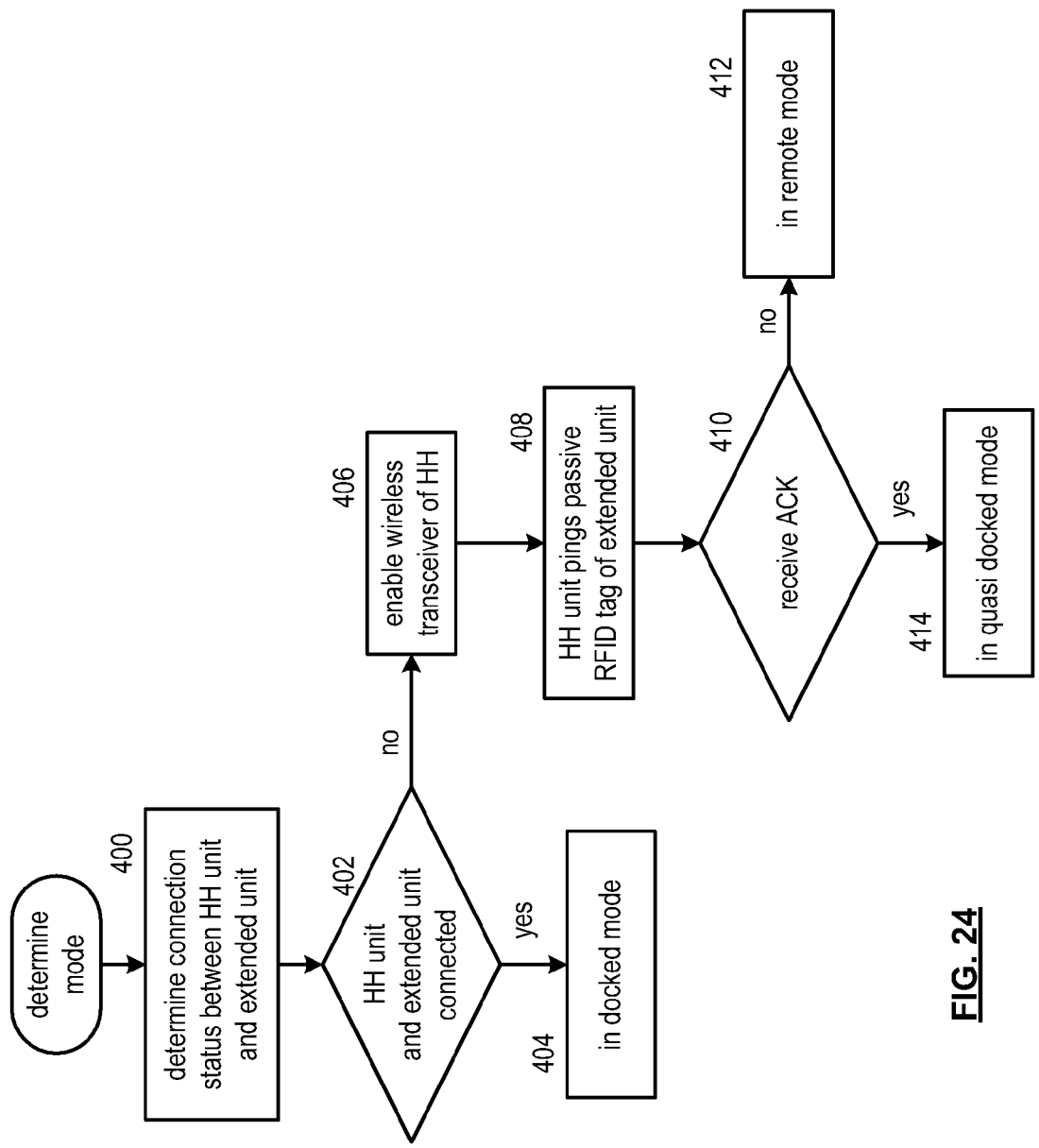
FIG. 24 is a logic diagram of an embodiment of a method for determining a mode of the computing device in accordance with the present invention.

FIG. 24 is a logic diagram of an embodiment of a method for determining the mode of the computing device that begins at step 400 where the HH processing module determines whether the handheld computing unit is connected to the extended computing unit. This may be done via a connection sensor circuit that provides a first signal when the handheld computing unit is connected and second signal when it is not connected. The method continues at step 402 where the method branches to step 404 when the handheld computing unit is connected and to step 406 when it is not. At step 404, the HH processing module indicates that the handheld computing unit is in the docked mode.

At step 406, the HH processing module enables the baseband processing module and RF section in a radio frequency identification (RFID) mode. The method continues at step 408 where the HH processing module enables transmitting of an RFID message to an RFID tag within the extended computing unit. The method continues at step 410 where the HH processing module determines whether an acknowledgement of the RFID message has been received. If yes, the method continues at step 414 where the HH processing module indicates that the handheld computing unit is in the quasi docked mode. When an acknowledgement of the RFID message is not received, the method continues at step 412 where the HH processing module indicates that the handheld computing unit is in the remote mode.

Figure 25:
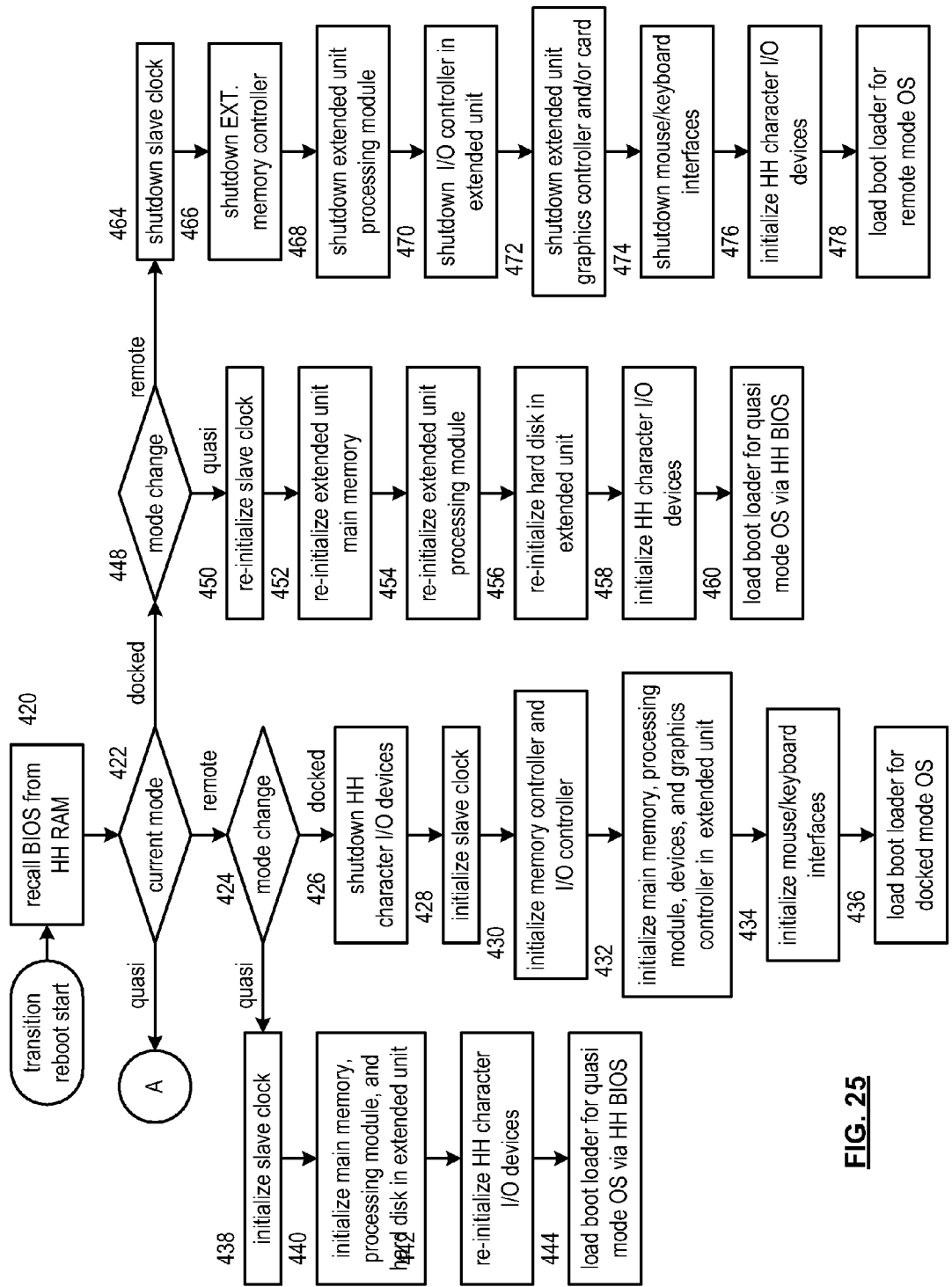
FIGS. 25 and 26 are a logic diagram of an embodiment of a reboot method in accordance with the present invention.
Figure 26:
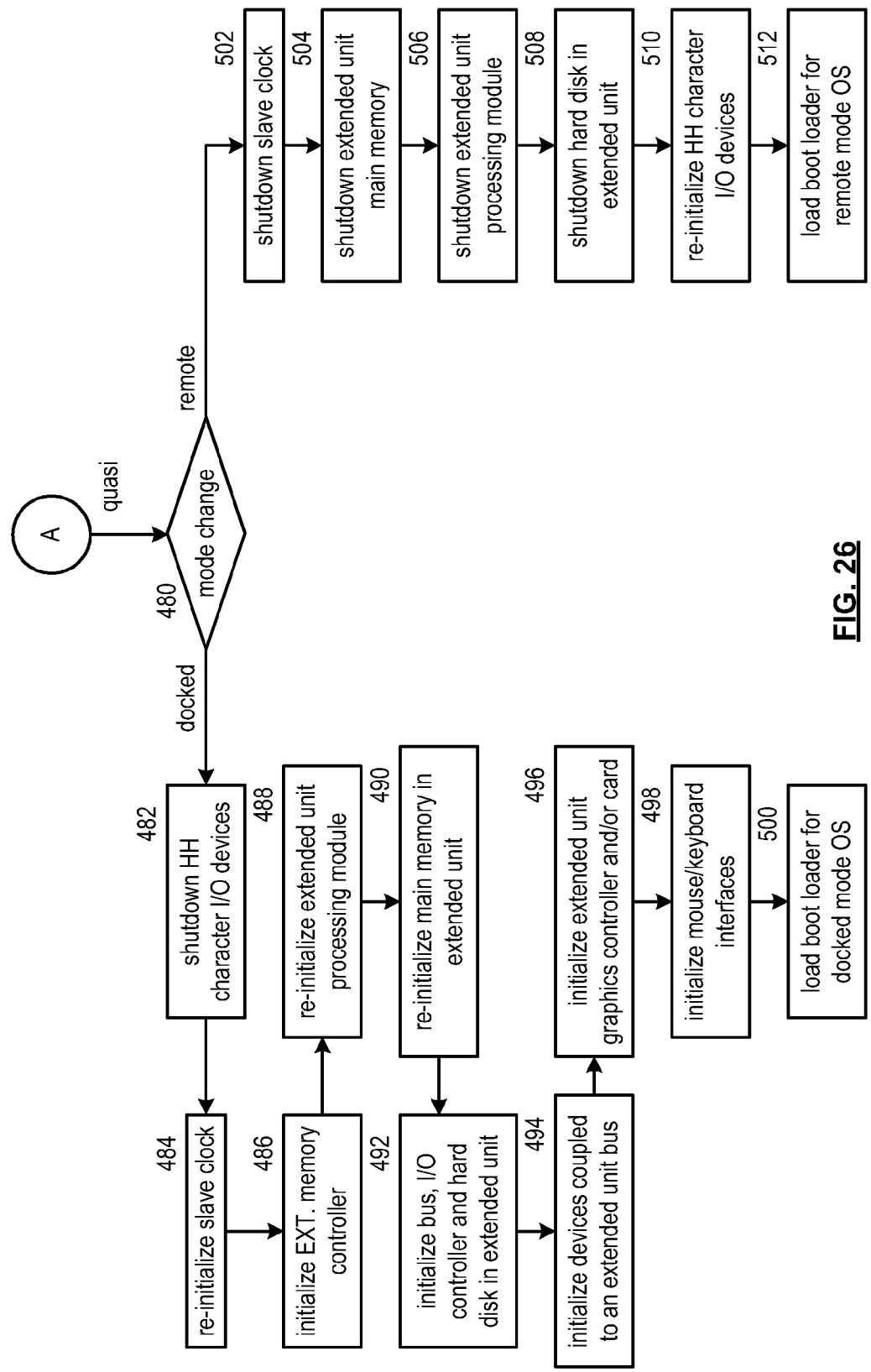

FIGS. 25 and 26 are a logic diagram of an embodiment of a reboot, or soft boot, method. Such a reboot may result when the mode of the handheld computing unit changes (e.g., from a remote mode to a docked mode, from a docked mode to a quasi docked mode, etc.). The method begins at step 420 of FIG. 25 where the BIOS is recalled from the HH main memory. The method then proceeds to step 422 where the HH processing module determines the current mode of the handheld computing unit. If the handheld computing unit is in the remote mode, the method continues at step 424.

At step 424 the HH processing module determines whether the mode change is from the remote mode to the docked mode or from the remote mode to the quasi docked mode. When the mode change is to the docked mode, the method continues at step 426 where the HH processing module shutdowns the HH character I/O devices. Shutting down may include disabling the corresponding interface for an HH character I/O device. For example, the HH display interface, which includes a display driver, a buffer, and may further included other circuitry, is deactivated, which shuts down the HH display coupled thereto.

The method then proceeds to step 428 where a slave clock within the extended computing unit is initialized. The method then proceeds to step 430 where a memory controller and an I/O controller are initialized. The method then proceeds to step 432 where an extended processing module is initialized (e.g., reset). Step 432 may further include initializes extended main memory within the extended computing unit, initializes an extended bus structure within the extended computing unit; initialize an extended I/O devices coupled to the extended bus structure or to the I/O controller; and/or initializes at least one of an extended graphics controller and an extended graphics card within the extended computing unit. Note that prior to step 428, the clock generator circuit may re-initialized. Further note that prior to or contemporaneous with step 432, the HH processing module, the HH main memory, HH bus structure, and the HH hard disk/flash memory may be re-initialized.

The method then proceeds to step 434 where a mouse and a keyboard of the extended computing unit are initialized. The method then proceeds to step 436 where the docked mode operating system boot loader is loaded.

When, at step 424, the mode change is to the docked mode, the method continues at step 438 where the slave clock module within the extended computing unit is initialized, which may occur after the clock generating circuit is re-initialized. The method then proceeds to step 440 where the extended processing module within the extended computing unit is initialized (e.g., reset). Step 440 may also include initializing the extended main memory within the extended computing unit and initializing a hard disk within the extended computing unit. Note that prior to or contemporaneous with step 440, the HH processing module, the HH main memory, HH bus structure, and the HH hard disk/flash memory may be re-initialized.

The method then proceeds to step 442 where the HH character I/O devices are re-initialized. The method then proceeds to step 444 where the quasi docked mode operating system boot loader is loaded.

If, at step 422, the handheld computing unit is currently in a docked mode, the method continues at step 448 where the HH processing module determines whether the mode change is from the docked mode to the remote mode process or from the docked mode to the quasi docked mode. When the mode change is from the docked mode to the remote mode, the method continues at step 464 where the slave clock within the extended computing unit is shutdown. The method continues at step 466 where the memory controller of the external main memory is shutdown. The method continues at step 468 where the extended processing module within the extended computing unit is shutdown.

The method continues at step 470 where the I/O controller within the extended computing unit is shutdown. The method continues at step 472 where at least one of an extended graphics controller and an extended graphics card within the extended computing unit is shutdown. The method continues at step 474 where the mouse and keyboard of the extended computing unit are shutdown. The method continues at step 476 where HH character I/O devices are initialized. The method continues at step 478 where the remote mode operating system boot loader is loaded. Note that prior to step 476, the clock generating circuit, the HH processing module, the HH main memory, HH bus structure, and the HH hard disk/flash memory are initialized.

When, at step 448, it is determined that the mode change is from the docked mode to the quasi docked mode, the method continues at step 450 where the slave clock within the extended computing unit is re-initialized. In addition, the I/O controller within the extended computing unit, the at least one of an extended graphics controller and an extended graphics card within the extended computing unit, and the mouse and keyboard of the extended computing unit are shutdown. Note that prior to step 450, the clock generating circuit, the HH processing module, the HH main memory, the HH bus structure, and the HH hard disk/flash memory are initialized.

The method continues at step 452 where the extended main memory within the extended computing unit is re-initialized. The method continues at step 454 where the extended processing module within the extended computing unit is re-initialized. The method continues at step 456 where the hard disk within the extended computing unit is re-initialized. The method continues at step 458 where the HH character I/O devices are initialized. The method continues at step 460 where the quasi docked mode operating system boot loader is loaded.

When, at step 422, the current mode is the quasi docked mode, the method continues at step 480 of FIG. 26. At step 480, the HH processing module determines whether the handheld computing unit is changing from the quasi docked mode to the remote mode or to the docked mode. When the change is to the remote mode, the method continues at step 502 where the slave clock within the extended computing unit is shutdown. The method continues at step 504 where the extended main memory within the extended computing unit is shutdown. The method continues at step 506 where the extended processing module within the extended computing unit is shutdown. The method continues at step 508 where the hard disk within the extended computing unit is shutdown. The method continues at step 510 where the character I/O devices are re-initialized. The method continues at step 512 where the remote mode operating system boot loader is loaded. Note that prior to step 510, the clock generating circuit, the HH processing module, the HH main memory, the HH bus structure, and the HH hard disk/flash memory are re-initialized.

When, at step 480, the reboot is from quasi docked mode to docked mode the method continues at step 482 where the HH character I/O devices are shutdown. The method continues at step 484 where the slave clock within the extended computing unit is re-initialized. Note that prior to step 484, the clock generating circuit, the HH processing module, the HH main memory, the HH bus structure, and the HH hard disk/flash memory are re-initialized.

The method continues at step 486 where the memory controller is re-initialized. The method continues at step 488 where the extended processing module within the extended computing unit is re-initialized. The method continues at step 490 where the extended main memory within the extended computing unit is re-initialized. The method continues at step 492 where the EXT bus structure, the I/O controller and the hard disk within the extended computing unit are initialized. The method continues at step 494 where the extended I/O devices coupled to the extended bus structure or to the I/O controller are initialized. The method continues at step 496 where the at least one of an extended graphics controller and an extended graphics card within the extended computing unit is initialized. The method continues at step 498 where the mouse and a keyboard of the extended computing unit are initialized. The method continues at step 500 where the docked mode operating system boot loader is loaded.

Figure 27:
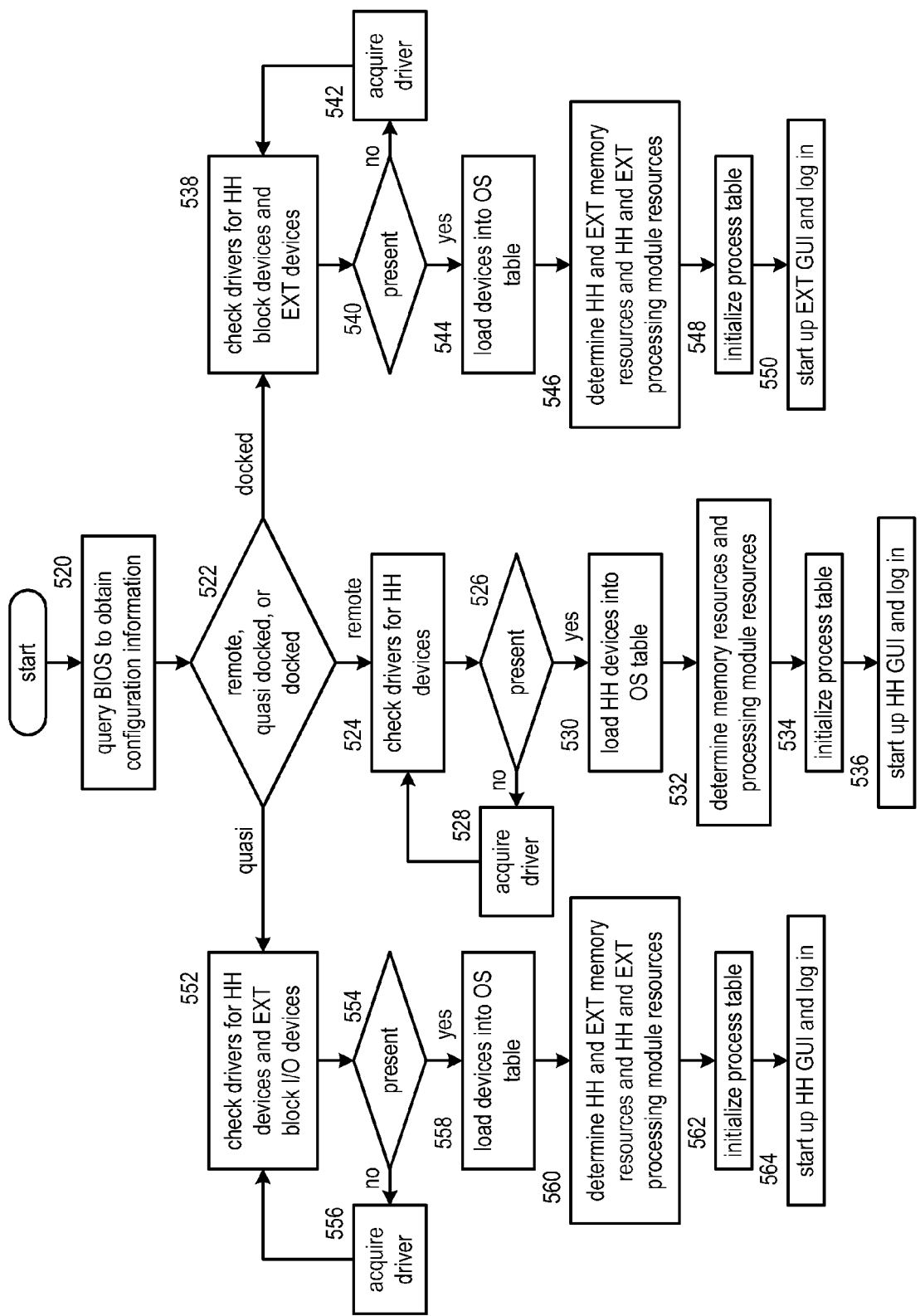
FIG. 27 is a logic diagram of an embodiment of a method for initializing one of a plurality of operating system in accordance with the present invention.

FIG. 27 is a logic diagram of an embodiment of a method for initializing one of a plurality of operating system that begins at step 520 where the BIOS is queried to obtain configuration information. The configuration information includes one or more of: identity of handheld block I/O devices coupled to the handheld I/O interfaces; identity of handheld character I/O devices coupled to the handheld I/O interfaces; identify of extended block I/O devices coupled to an I/O controller of the extended computing unit; identify of extended character I/O devices coupled to an I/O controller of the extended computing unit; identity of the HH main memory; identity of the HH processing module, identity of the EXT main memory; and/or identity of the EXT processing module.

The method continues at step 522 where it is determined whether the remote mode operating system, the quasi docked mode operating system, or the docked mode operating system is to be loaded based on which boot loader is loaded. If the docked mode operating system is to be loaded, the method continues at step 538 where the HH processing module verifies the drivers for the handheld block I/O devices and for the extended block and character I/O devices. Note that a device driver is a specific type of software that allows communication with a device via a specific computer bus (e.g., PCI bus, AGP bus, etc.). Such communication includes providing and/or receiving commands, data, and/or requesting access to the operating system and/or user applications via interrupts.

The method continues at step 540 where the HH processing module determines whether the drivers are present for all of the active HH and EXT devices. If not, the method continues at step 542 where the HH processing module acquires the drivers. This may involve requested the user to install a disk that accompanied the device, to download the driver from a web page, and/or to retrieve a stored driver. Once the drivers are verified, the method continues at step 544 where the HH processing module loads the identification information of the handheld block I/O devices and the extended block and character I/O devices in a docked mode operating system device table.

The method continues at step 546 where the HH processing module determines handheld memory resources, handheld processing resources, extended memory resources, and extended processing resources. The resources may further include available user memory space, multi-processing configuration information, bus structure, user applications, file structures, etc. The method continues at step 548 where the HH processing module initializes a docked mode process table. An example of a process table will be discussed with reference to FIG. 33. The method continues at step 550 where the HH processing module start-ups an extended graphical user interface and may further initiate a user log in process.

When, at step 522, it is determined that the remote mode operating system is to be loaded, the method continues at step 524 where the HH processing module verifies the drivers for the block and character I/O devices coupled to the handheld I/O interfaces. The method continues at step 526 where the HH processing module determines whether the drivers are present for all of the active HH I/O devices. If not, the method continues at step 528 where the HH processing module acquires the drivers. Once the drivers are verified, the method continues at step 530 where the HH processing module loads the identification information of the handheld I/O devices in a remote mode operating system device table.

The method continues at step 532 where the HH processing module determines handheld memory resources and handheld processing resources. The resources may further include available user memory space, multi-processing configuration information, bus structure, user applications, file structures, etc. The method continues at step 534 where the HH processing module initializes a remote mode process table. An example of a process table will be discussed with reference to FIG. 33. The method continues at step 536 where the HH processing module start-ups an HH graphical user interface and may further initiate a user log in process.

When, at step 522, it is determined that the quasi docked mode operating system is to be loaded, the method continues at step 552 where the HH processing module verifies the drivers for the block and character I/O devices coupled to the handheld I/O interfaces and for the EXT block I/O devices coupled to the I/O controller, the host controller, and/or the EXT bus structure. The method continues at step 554 where the HH processing module determines whether the drivers are present for all of the active HH and EXT I/O devices. If not, the method continues at step 556 where the HH processing module acquires the drivers. Once the drivers are verified, the method continues at step 558 where the HH processing module loads the identification information of the handheld I/O devices and the extended block I/O devices in a quasi docked mode operating system device table. Note that the docked, quasi docked, and remote operating system tables may be the same table with differing entries.

The method continues at step 560 where the HH processing module determines handheld memory resources, handheld processing resources, EXT processing resources, and/or EXT memory resources. The resources may further include available user memory space, multi-processing configuration information, bus structure, user applications, file structures, etc. The method continues at step 562 where the HH processing module initializes a quasi docked mode process table. An example of a process table will be discussed with reference to FIG. 33. The method continues at step 564 where the HH processing module start-ups an HH graphical user interface and may further initiate a user log in process.

Figure 28:
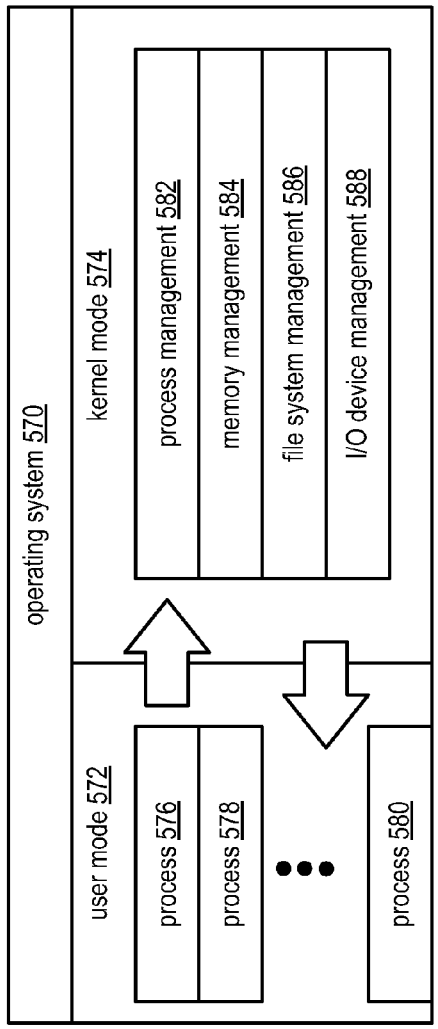
FIG. 28 is a diagram of an embodiment of an operating system in accordance with the present invention.

FIG. 28 is a diagram of an embodiment of an operating system 570 that includes a user mode section 572 and a kernel mode section 574. The user mode section 772 includes a plurality of processes 576-580, which correspond to one or more running user applications. The operating system 570 includes the common operating system 325, the remote operating system 326, the quasi mode operating system 328 and 334, and the docked operating system 336. Each of the remote, quasi mode, and the docked mode operating systems include the common operating system 325. In addition, each of the operating systems includes one or more processing management kernels 582, one or more memory management kernels 584, one or more file system management kernels 586, and one or more I/O device management kernels 588. While not shown, the operating system 570 may further include one or more graphical user interface kernels, one or more security kernels, and/or one or more networking kernels.

In general, the kernel section 574 functions to connect an application to the hardware resources of a computing device. In this regard, the kernel section 574 manages the computing device's resources (e.g., multi-processing capabilities, processing module run time, main memory, hard disk memory, network throughput, I/O devices, communication between hardware and software components, etc.) and provides the lowest-level software abstraction layer. Note that the kernel section 574 may include monolithic kernels and/or microkernels.

The process management kernel section 582 provides one or more kernels to allow and support execution of one or more processes. A process is the execution of an application's operating instructions and several processes may be associated with the same application. When the handheld computing unit is in a remote mode, the HH processing module may function as a single central processing unit that executes one instruction at a time. In this embodiment, the HH processing module may use a time-sharing process to allow seemingly concurrent execution of multiple processes. In another embodiment, the HH processing module includes a multi-processor core that supports actual concurrent execution of multiple processes, where each processing core may use the time-sharing process to allow more processes to run at once. When the handheld computing unit 12 is in the docked mode, the HH processing module and the EXT processing module function collectively to provide the multi-processor core. Note that each of the HH and EXT processing modules may include its own multi-processor core such that, when functioning collectively, the number of processors is further increase.

To run an application, a kernel of the process management kernel section 582 sets up an address space for the application, loads the file containing the application's code into memory, sets up a stack for the application and branches to a given location inside the application to start its execution. Several applications may be supported by using multi-tasking kernels, pre-emptive multi-tasking kernels, cooperative multi-tasking kernels, and/or multiprocessing. A multi-tasking kernel schedules access to the HH processing module and/or EXT processing module among a plurality of processes in an orderly manner. The scheduling may be done in a variety of ways including multiprogramming, time-sharing, and real-time.

A pre-emptive multi-tasking kernel allocates each process a slice of time and switches from process to process in accordance with the time slices to provide the illusion of concurrent execution. The size of the time slices may vary from process to process and may be adjusted and/or reallocated based on priority of other processes. The kernel also provides a mechanism for the processes sharing the processing resources to communication with one another, which is generally referred to as inter-process communication (IPC), which may be done by sharing memory, message passing, and/or a remote procedure calls.

A cooperative multi-tasking kernel allows a process to run uninterrupted until it makes a special request that tells the kernel it may switch to another process. The special request may be the result of a response to an inter-process communication or the process is waiting for an event to occur.

A multiprocessing kernel allows different processes and/or threads to run on different processors (e.g., the HH processing module and the EXT processing module). The kernel provides a synchronization mechanism to ensure that no two processors attempt to modify the same data at the same time.

The memory management kernel section 684 provides one or more kernels to control access to the HH main memory, the HH hard disk/flash memory, the EXT main memory, and/or the EXT hard disk/flash memory. In general a memory management kernel has full access to the computing device's memory and controls a process' access to the memory. This includes establishing virtual addressing using paging and/or segmentation. The virtual address spaces may be different for different processes (e.g., the memory that one process accesses at a particular (virtual) address may be different memory from what another process accesses at the same virtual address). The operating system maintains a page table to track the virtual addresses association to physical addresses and the allocation of the virtual memory to particular processes. The virtual memory allocations are tracked so that when a process terminates, the memory used by that process can be made available for other processes. In this manner, the memory management kernel allows each process to function as if it the only process running.

The file system management kernel section 586 includes one or more kernels to control a file system for file storage and/or file transfers. The file system uses the EXT hard disk/flash memory, the EXT CD-ROM drive, the HH hard disk/flash memory, etc. to store and organizes files and/or applications for ease of finding and accessing. In an embodiment, the file system includes directories that associate file names with files. This may be done by connecting the file name to an index into a file allocation table. The directory structure may be flat (no subdirectories) or hierarchical (includes subdirectories). The directory may further include meta data regarding a file. The meta data may include file length, a byte count, time the file was last modified, file creation time and/or date, time and/or date the file was last accessed, any changes to the meta data, owner's identity, creator's identity, access permission settings, etc.

The file system may be a disk file system, a flash file system, a database file system, a transactional file system, and/or a special purpose file system. In an embodiment, each of the various modes of the operating system has its own file system. For example, the remote mode operating system has a file system that utilizes the HH hard disk/flash memory 54; the quasi docked mode operating system has a file system that has a hierarchical preference for the HH hard disk/flash memory 54 over the EXT hard disk/flash memory 84; and the docked mode operating system has a file system that has a hierarchical preference for the EXT hard disk/flash memory 84 or the HH hard disk/flash memory 54.

The I/O device management kernel section 588 includes one or more kernels that manage I/O device processing resource and/or memory resource allocation requests. As an example, a process may need to access an I/O device (e.g., the HH display), which is controlled by the kernel through a device driver. As a more specific example, to show the user something on the HH display, an application would make a request to the kernel, which would forward the request to its display driver, which plots the character/pixel for display.

The operating system 570 may security features. The security may include levels: internal security and external security. The internal security is the protection of the computing device's resources from concurrently running applications performing the same process at the same time. In this instance, applications and/or processes thereof are assigned a privilege level, which blocks less privileged applications and/or processes from using certain hardware instructions, certain processing resources, accessing certain memory spaces, etc. When an application or process is blocked, it must ask a higher privileged application or process to perform the task for it.

For external security, the computing device may include a software firewall or an intrusion detection/prevention system. The software firewall is configured to allow or deny network traffic to or from a service or application running on the operating system.

The operating system 570 further includes graphical user interfaces (GUI) for the handheld computing unit and the extended computing unit. The GUI may be for a touch screen, a keypad, an LCD display, a monitor, and vary depending on the applications being used. For example, when the handheld computing unit is in a cellular telephone mode, the GUI may be adapted for the cell phone. As another example, when the handheld computing unit is a GPS receiver mode, the GUI may be adapted to for GPS operations. When the handheld computing unit is docked to the extended computing unit, the GUI may resemble a personal computer and/or laptop GUI.

Figure 29:
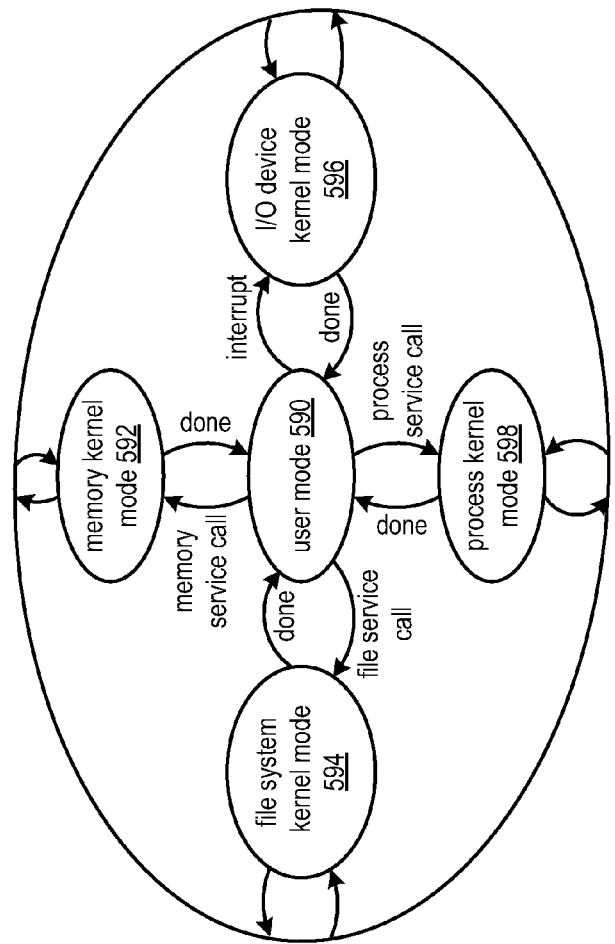
FIG. 29 is a state diagram of an embodiment of an operating system in accordance with the present invention.

FIG. 29 is a state diagram of an embodiment of the operating system 570. The operating system 570 may be in the remote mode, the quasi docked mode, or the docked mode. In any of these modes, the operating system has five states: a user mode 590, a memory kernel mode 592, a file system kernel mode 594, an T/O device kernel mode 596, and a process kernel mode 598. From the user mode state 590, the operating system may transition to any one of the kernel states in response to a service call or a trap. In a kernel state, the operating system may transition to any other kernel state or back to the user mode state.

As an example, assume that the handheld computing unit is in the remote mode and is executing a user application and the operating system is in the user mode state 590 for this user application. The executing of the user application includes one or more processes that require access to the HH computing unit's resources. When a process needs a resource, it generates a service call and/or evokes a trap. When the process service call or the trap is detected, the operating system transitions to the process kernel state 598 for a process service call, to the I/O kernel mode for an I/O service call, to the memory kernel mode 592 for a memory service call, or to the file system kernel mode for a file service system call. Assuming that the service call was a process service call, the operating system is in state 598 and beings to process the process service call. The process service call may be to have a series of operational instructions executed by the HH processing module, may be to store data, may be to read data, may be use certain data while executing the operational instructions, may be to display data, may be to receive data, etc.

Figures 32, 33:
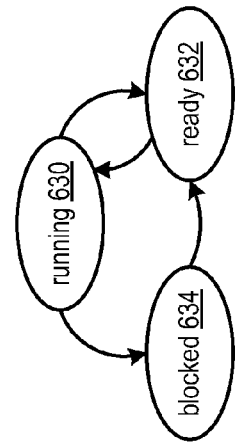
FIG. 32 is a state diagram of an embodiment of a process in accordance with the present invention.
FIG. 33 is a diagram of an example of a process table in accordance with the present invention.

If the process service call is to execute operational instructions, the process management kernel schedules the process for access to the HH processing module based on the state of the process. As shown in FIG. 32, a process may be in a blocked state 634, a running state 630, or a ready state 632. If the process is in a blocked state 634, it is dependent on some other process, memory management function, and/or file management function to be completed before it can execute its current task. When the dependency is removed, the process transitions into the ready state 632. The process remains in this state until the resource it has requested is allocated to it. When allocated, the process transitions to the running state 603.

Returning to the state diagram of FIG. 29, after the process is scheduled and/or the process is completed, the operating system transitions back to the user state 590. If the process service call includes requesting access to the processing module and to store the results, the operating system would also transition to the memory kernel state 592 and the file system kernel state 594 to fulfill the storage request service call.

When an I/O device desires access to the processing module, to a file, and/or to the memory, it issues an interrupt. When the operating system receives the interrupt, it transitions to the I/O device kernel mode to process the interrupt, which may be for access to the file system, access to the processing module, and/or access to the memory. As such, from the I/O kernel state 596, the operating system may transition to the process kernel state 598, the file system kernel state 594, and/or to the memory kernel state 592. Note for from application to application and/or process to process, the operating system may be in different states at any one time.

Figure 30:
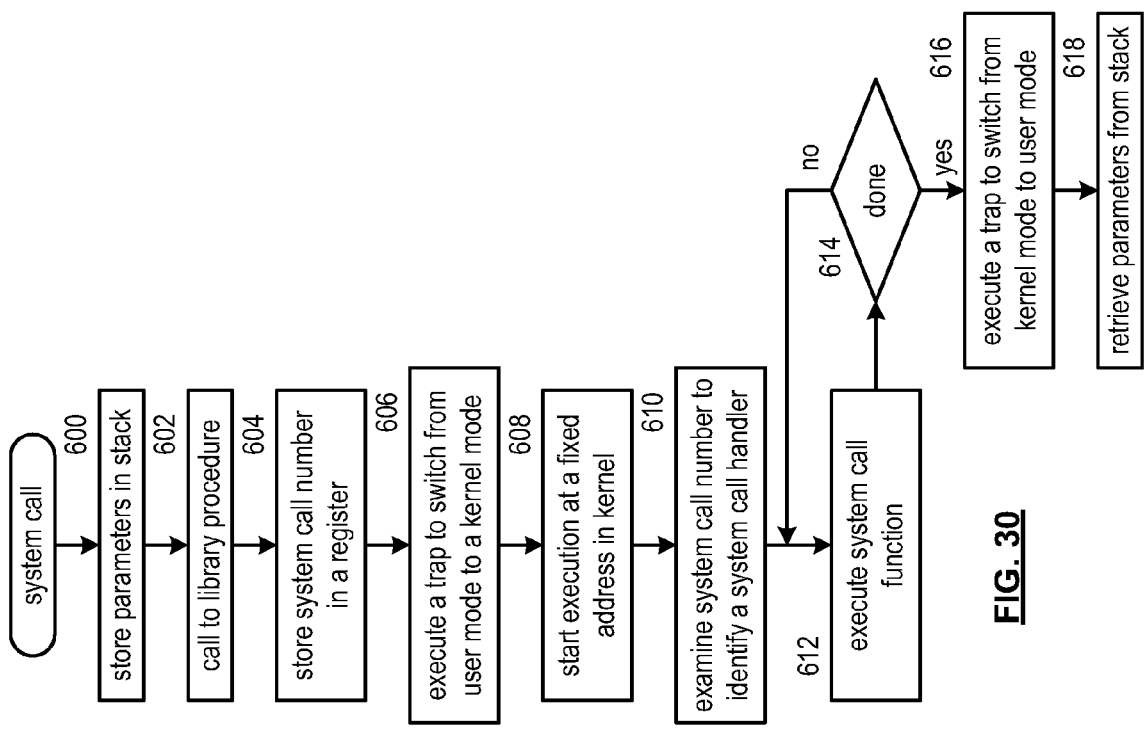
FIG. 30 is a logic diagram of an embodiment of a method processing a service call in accordance with the present invention.

Further examples of service calls include:
Process Management
　create a child process
　create a process (at system initiation, per system call, per user request, per batch job)
　delete a process (normal, error, fatal error, killed by another process)
　wait for child to terminate
　replace a process' core image
　terminate process execution and return status
File Management
　open a file for reading and/or writing
　close an open file
　read data from a file into a buffer
　write data from a buffer into a file
　move the file pointer
　get file status information
Directory and File System Management
　create a new directory
　remove an empty directory
　create a new entry, name, name pointer (shortcut)
　remove a directory entry
　mount a file system
　unmount a file system FIG. 30 is a logic diagram of an embodiment of a method processing a service call that begins at step 600 where, when the handheld device is in a quasi docked mode, the HH processing module receives a system call from a handheld application, a quasi mode application, a handheld block I/O device, an extended block I/O device, or a handheld character I/O device. The method continues at step 602 where the HH processing module store parameters of the system call in a quasi mode stack. The parameters include current location in an application, current pointer information, memory locations, and/or any other data that allows the application to pick up where it left off after its service call is processed.

Figure 31:
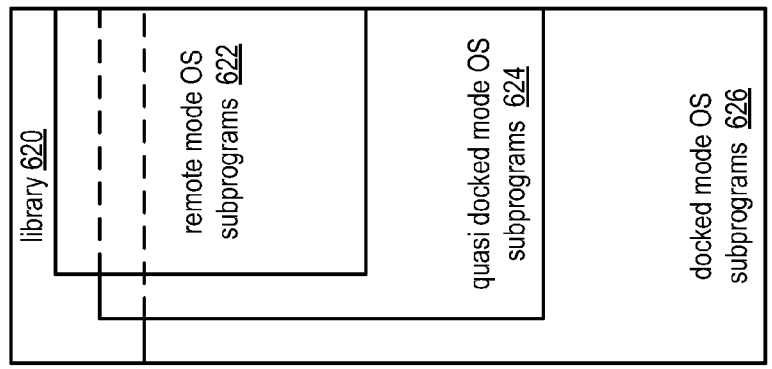
FIG. 31 is a diagram of an example of a subprogram library in accordance with the present invention.

The method continues at step 604 where the HH processing module calls a quasi mode subprogram library to retrieve a subprogram (e.g., a handler) to support the fulfillment of the service call. FIG. 31 is an example of a library 320 that includes remote mode OS subprograms 622, quasi mode OS subprograms 624, and docked mode OS subprograms 624. As shown, the subprograms overlap such that when the handheld computing unit is in the docked mode, it may call a subprogram from any of the OS subprograms 622-626. Conversely, when the handheld computing unit is in the remote mode, it may only call subprograms for the remote OS subprogram section 622.

The library 620 may be static library or a dynamically linked library. An embodiment of a static library includes of a set of routines which are copied into a target application by the compiler, linker, or binder, producing object files and a stand-alone executable file. Actual address, references for jumps and other routine calls are stored in a relative address or symbolic which cannot be resolved until all code and libraries are assigned final static addresses. The linker resolves the unresolved addresses into fixed or virtual addresses.

In an embodiment, a dynamic linking library loads the subroutines of a library into an application program at runtime, rather than at compile time. This reduces the compile time of the linker since it records what library routines the program needs and the index names in the library. At the loading of an application, a loader transfers the relevant portions of the library from the hard disk to the main memory, which may be in the handheld and/or extended computing unit.

Returning to the discussion of FIG. 30, the method continues at step 606 where the HH processing module updates a process table for the system call for the application and/or one of it processes. FIG. 33 illustrates an example of a process table that includes a column for each of the processes that are active. The data stored for each process includes processing information 642 (e.g., register locations, program counter (PC), status word, stack pointer, process state, priority, schedule parameters, process ID<parent process, signals, process start time, processing user time, children use time, time of and/or next alarm), memory information 644 (e.g., pointer to text (e.g., code, instructions, etc.) segment, pointer to data segment, and pointer to stack segment), and file information 646 (e.g., root directory, working directory, file description, user ID, and/or group ID).

Returning to the discussion of FIG. 30, the method continues at step 608 where the HH processing module executes a trap to switch to a kernel quasi docked mode (e.g., process, memory, file, I/O device). The method continues at step 608 where the HH processing module identifies a system call handler to provide access to higher level software layers for the system call. At step 612, the system call is processed, which may be done by the HH processing module executing a higher level layer operation system subroutine. When the system call has been processed, which may done as previously discussed with reference to FIG. 29, the method proceeds from step 614 to step 616.

At step 616, the HH processing module executes another trap to return to a user mode. The method continues at step 608 where the HH processing module retrieves parameters from the stack such that the application can resume processing where it left off when it initiated the service call.

The method of FIG. 30 is also applicable when the handheld computing unit is in the remote mode. At step 600, the HH processing module receives a system call from a handheld application, a handheld block I/O device, or a handheld character I/O device. Steps 602-618 include store parameters of the system call in a remote mode stack, call a remote mode subprogram library; update process table for the system call; execute a trap to switch to a kernel remote mode; identify system call handler for the system call; when processing the system call is complete, executing another trap to return to a user mode; and retrieve parameters.

The method of FIG. 30 is also applicable when the handheld computing unit is in the docked mode. At step 600, the HH processing module receives a system call from a handheld application, a docked mode application, a handheld block I/O device, an extended block I/O device, or an extended character I/O device. Steps 602-618 include store parameters of the system call in a docked mode stack, call a docked mode subprogram library; update process table for the system call; execute a trap to switch to a kernel docked mode; identify system call handler for the system call; when processing the system call is complete, executing another trap to return to a user mode; and retrieve parameters.

Figure 34:
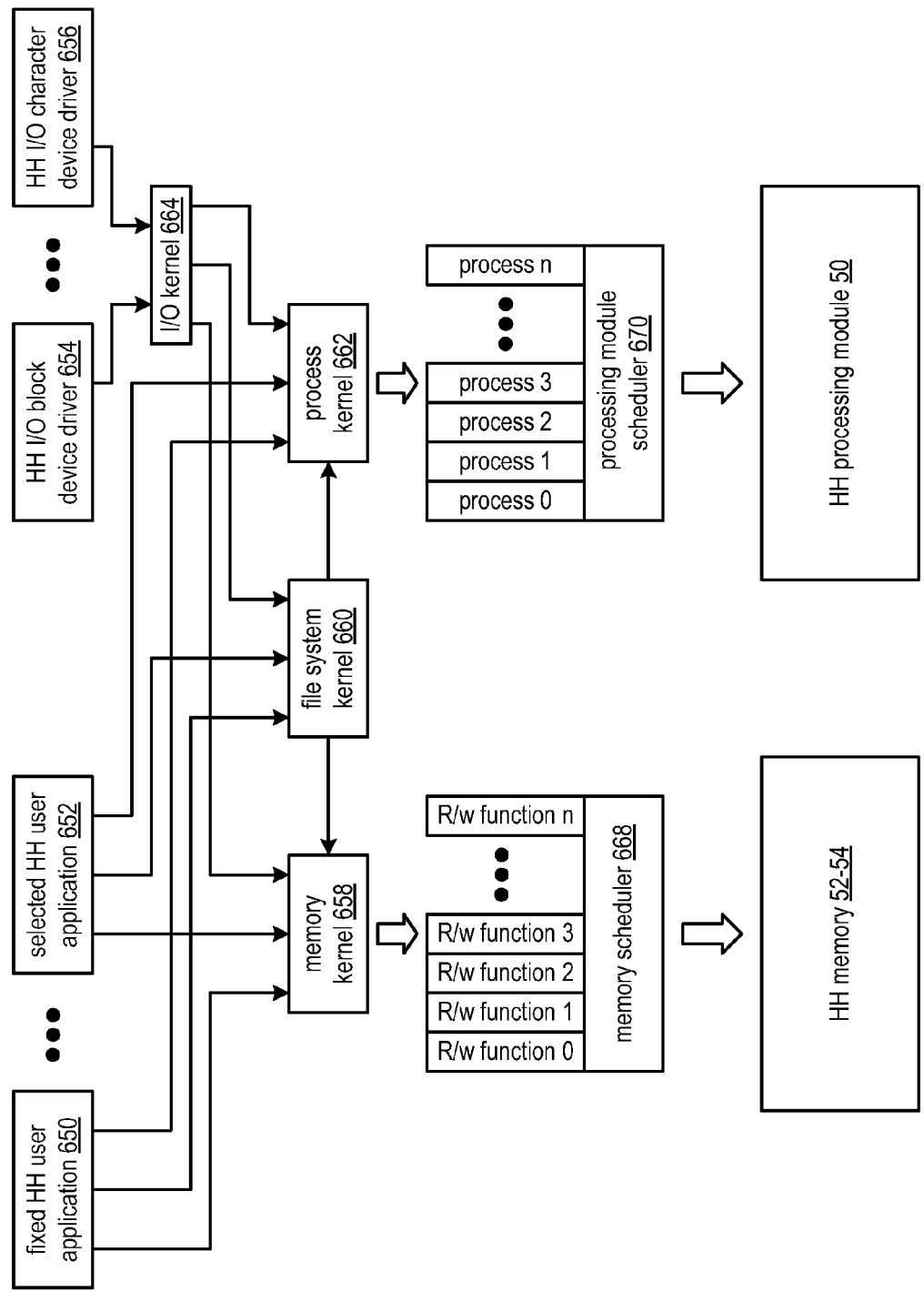
FIG. 34 is a diagram of an example of a remote mode operating system in accordance with the present invention.

FIG. 34 is a diagram of an example of a remote mode operating system. In this example, the remote mode operating system is supporting one or more fixed HH user applications 650, one or more selected HH user applications 652, one or more HH block I/O device drivers 654 (which in turn are coupled one or more corresponding I/O block devices (e.g., hard disk 54, flash memory, etc.)), and one or more HH character I/O device drivers 656 (which in turn are coupled to one or more corresponding I/O character devices (e.g., the HH display, the HH keypad, the HH microphone, the HH speaker, a digital camera, etc.). In an embodiment, the operating system includes one or more memory kernels 658, one or more file system kernels 660, one or more process kernels 662, and one or more I/O device kernels 664. The operating system may further include a memory scheduler 668 and a processing module scheduler 670.

A fixed user application 650 is an application that resides on the HH memory (e.g., hard disk or flash) and cannot be transferred to the EXT memory (e.g., hard disk, flash, tape, RAID, etc.). A selected user application 652 is an application that currently resides on the HH memory but can be transferred to the EXT memory. Fixed and selected applications will be discussed in greater detail with reference to FIGS. 37-44.

In this example, the applications 650-652 and/or the I/O devices via the corresponding driver 654-656 may issue service calls, interrupts, and/or traps that evoke one or more of the operating system kernels 658-664. For example, if the one applications or I/O devices desires to read data from or write data to memory for a specific file, the memory kernel 658 and the file system kernel are evoked. The file system kernel 660 identifies the particular file to the processed and the memory kernel 658 identifies the particular memory location of the file. The memory kernel 658 also provides the read/write (R/W) request to the memory scheduler 668.

The memory scheduler 668 queues up the R/W requests and schedules them for accessing the HH memory 52 and/or 54. The memory scheduler 668 may use one or more scheduling techniques to schedule the memory requests. Such scheduling techniques include Borrowed-Virtual-Time Scheduling (BVT); Completely Fair Scheduler (CFS); Critical Path Method of Scheduling; Deadline-monotonic scheduling (DMS); Deficit round robin (DRR); Dominant Sequence Clustering (DSC); Earliest deadline first scheduling (EDF); Elastic Round Robin; Fair-share scheduling; First In, First Out (FIFO), also known as First Come First Served (FCFS); Gang scheduling; Genetic Anticipatory; Highest response ratio next (HRRN); Interval scheduling; Last In, First Out (LIFO); Job Shop Scheduling; Least-connection scheduling; Least slack time scheduling (LST); List scheduling; Lottery Scheduling; Multilevel queue; Multilevel Feedback Queue; Never queue scheduling; O(1) scheduler; Proportional Share Scheduling; Rate-monotonic scheduling (RMS); Round-robin scheduling (RR); Shortest expected delay scheduling; Shortest job next (SJN); Shortest remaining time (SRT); Staircase Deadline scheduler (SD); "Take" Scheduling; Two-level scheduling; Weighted fair queuing (WFQ); Weighted least-connection scheduling; Weighted round robin (WRR); and Group Ratio Round-Robin.

As a R/W function is processed, the HH memory 52-54 is accessed and the corresponding data is read from or written to the desired location. Once the function is complete the R/W function is removed the memory scheduler's queue. Note the completion of a R/W function may evoke another R/W function, a process for the HH processing module 50, a file system function, and/or an I/O device functions.

The processing module scheduler 670 may use one or more scheduling techniques to schedule process for accessing the HH processing module 50. In this example, the processes may be initiated by one or more of the applications 650-652 and/or one or more of the I/O devices coupled to the drivers 654-656.

As discussed by way of example, the kernels 658-664 and the schedulers 668-670 control the access to the resources of the handheld computing unit. In particular, the memory kernel 658 and the memory scheduler control access to the HH memory 53-54 and the process kernel 662 and the processing module memory scheduler 670 control access to the HH processing module 50.

Figure 35:
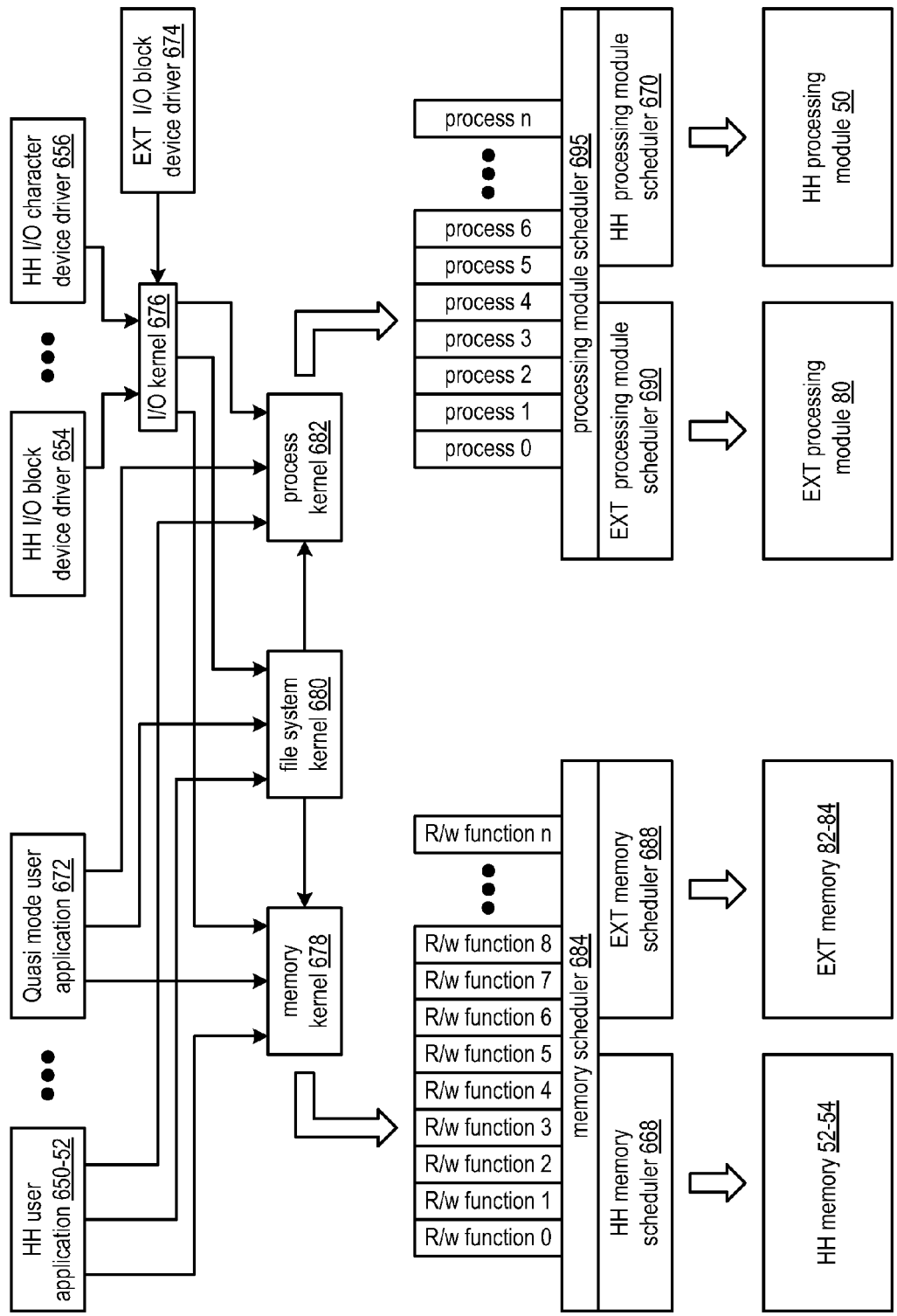
FIG. 35 is a diagram of an example of a quasi docked mode operating system in accordance with the present invention.

FIG. 35 is a diagram of an example of a quasi docked mode operating system. In this example, the quasi mode operating system is supporting one or more fixed HH user applications 650-652, one or more quasi user applications 672, one or more HH block I/O device drivers 654 (which in turn are coupled one or more corresponding I/O block devices (e.g., hard disk 54, flash memory, etc.)), one or more HH character I/O device drivers 656 (which in turn are coupled to one or more corresponding I/O character devices (e.g., the HH display, the HH keypad, the HH microphone, the HH speaker, a digital camera, etc.), and one or more EXT I/O block device drivers 674 (which in turn are coupled one or more corresponding I/O block devices (e.g., hard disk 84, flash memory 190, tape drive, RAID, etc.)). In an embodiment, the operating system includes one or more memory kernels 678, one or more file system kernels 680, one or more process kernels 682, and one or more I/O device kernels 676. The operating system may further include a memory scheduler 684, HH memory scheduler 668, EXT memory scheduler 688, a processing module scheduler 695, an HH processing module scheduler 670, and an EXT processing module scheduler 692.

In this example, the applications 650-652, 672 and/or the I/O devices via the corresponding driver 654-656, 674 may issue service calls, interrupts, and/or traps that evoke one or more of the operating system kernels 676-682. For example, if the one applications or I/O devices desires to read data from or write data to memory for a specific file, the memory kernel 678 and the file system kernel 680 are evoked. The file system kernel 680 identifies the particular file to the processed and the memory kernel 678 identifies the particular memory location of the file. The memory kernel 678 also provides the read/write (R/W) request to the memory scheduler 684.

The memory scheduler 684 queues up the R/W functions and schedules them for the HH memory scheduler 686 and the EXT memory scheduler 688. The HH memory scheduler 686 schedules the R/W functions for accessing the HH memory 52 and/or 54 and the EXT memory scheduler schedules the R/W functions for accessing the EXT memory 82-84. The memory schedulers may use one or more scheduling techniques to schedule the memory requests. Such scheduling techniques include Borrowed-Virtual-Time Scheduling (BVT); Completely Fair Scheduler (CFS); Critical Path Method of Scheduling; Deadline-monotonic scheduling (DMS); Deficit round robin (DRR); Dominant Sequence Clustering (DSC); Earliest deadline first scheduling (EDF); Elastic Round Robin; Fair-share scheduling; First In, First Out (FIFO), also known as First Come First Served (FCFS); Gang scheduling; Genetic Anticipatory; Highest response ratio next (HRRN); Interval scheduling; Last In, First Out (LIFO); Job Shop Scheduling; Least-connection scheduling; Least slack time scheduling (LST); List scheduling; Lottery Scheduling; Multilevel queue; Multilevel Feedback Queue; Never queue scheduling; O(1) scheduler; Proportional Share Scheduling; Rate-monotonic scheduling (RMS); Round-robin scheduling (RR); Shortest expected delay scheduling; Shortest job next (SJN); Shortest remaining time (SRT); Staircase Deadline scheduler (SD); "Take" Scheduling; Two-level scheduling; Weighted fair queuing (WFQ); Weighted least-connection scheduling; Weighted round robin (WRR); and Group Ratio Round-Robin.

As a R/W function is processed, the HH memory 52-54 or the EXT memory 82-84 is accessed and the corresponding data is read from or written to the desired location. Once the function is complete the R/W function is removed the memory scheduler's queue. Note the completion of a R/W function may evoke another R/W function, a process for the HH processing module 50, a file system function, and/or an I/O device functions.

The processing module scheduler 695 queues up the processes and schedules them for the HH processing module scheduler 670 and the EXT processing module scheduler 692. The HH processing module scheduler 670 schedules the processes for accessing the HH processing module 50 and the EXT processing module scheduler 690 schedules the processes for accessing the EXT processing module 80. In this example, the processes may be initiated by one or more of the applications 650-652, 672 and/or one or more of the I/O devices coupled to the drivers 654-656, 674.

Figure 36:
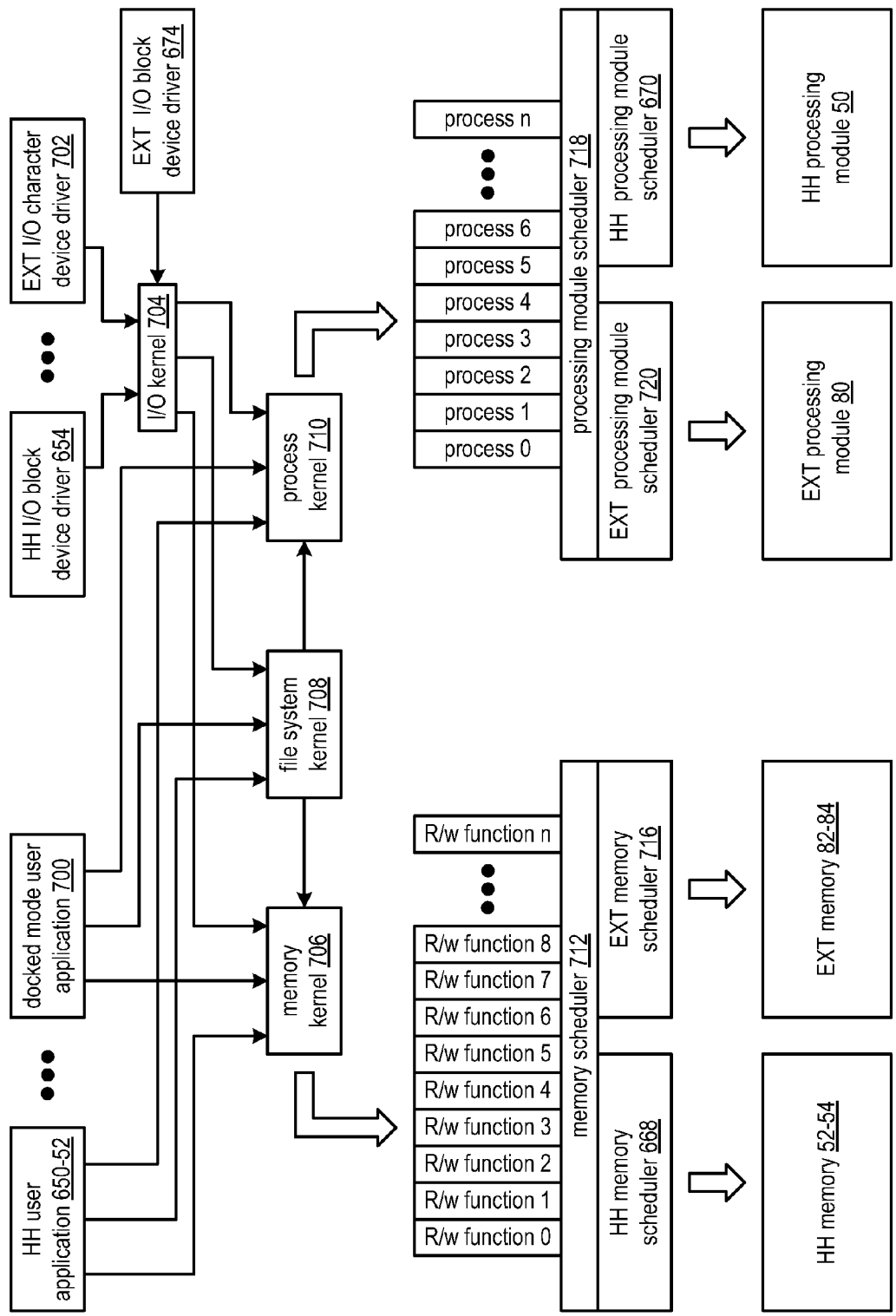
FIG. 36 is a diagram of an example of a docked mode operating system in accordance with the present invention.

FIG. 36 is a diagram of an example of a docked mode operating system. In this example, the docked mode operating system is supporting one or more fixed HH user applications 650-652, one or more docked user applications 700 (which is stored on the hard disk of the extended computing unit and co-processed by the handheld and extended computing units), one or more HH block I/O device drivers 654 (which in turn are coupled one or more corresponding I/O block devices (e.g., hard disk 54, flash memory, etc.)), one or more EXT character I/O device drivers 702 (which in turn are coupled to one or more corresponding I/O character devices (e.g., the EXT display, the EXT keyboard, the EXT mouse, the EXT microphone, the EXT speaker, the printer, etc.), and one or more EXT I/O block device drivers 674 (which in turn are coupled one or more corresponding I/O block devices (e.g., hard disk 84, flash memory 190, tape drive, RAID, etc.)). In an embodiment, the operating system includes one or more memory kernels 706, one or more file system kernels 708, one or more process kernels 710, and one or more I/O device kernels 704. The operating system may further include a memory scheduler 712, HH memory scheduler 668, EXT memory scheduler 716, a processing module scheduler 718, an HH processing module scheduler 670, and an EXT processing module scheduler 722.

In this example, the applications 650-652, 700 and/or the I/O devices via the corresponding driver 654, 674, 702 may issue service calls, interrupts, and/or traps that evoke one or more of the operating system kernels 704-710. For example, if the one applications or I/O devices desires to read data from or write data to memory for a specific file, the memory kernel 706 and the file system kernel 708 are evoked. The file system kernel 708 identifies the particular file to the processed and the memory kernel 706 identifies the particular memory location of the file. The memory kernel 706 also provides the read/write (R/W) request to the memory scheduler 712.

The memory scheduler 712 queues up the R/W functions and schedules them for the HH memory scheduler 686 and the EXT memory scheduler 716. The HH memory scheduler 686 schedules the R/W functions for accessing the HH memory 52 and/or 54 and the EXT memory scheduler 716 schedules the R/W functions for accessing the EXT memory 82-84. The memory schedulers may use one or more scheduling techniques to schedule the memory requests. Such scheduling techniques include Borrowed-Virtual-Time Scheduling (BVT); Completely Fair Scheduler (CFS); Critical Path Method of Scheduling; Deadline-monotonic scheduling (DMS); Deficit round robin (DRR); Dominant Sequence Clustering (DSC); Earliest deadline first scheduling (EDF); Elastic Round Robin; Fair-share scheduling; First In, First Out (FIFO), also known as First Come First Served (FCFS); Gang scheduling; Genetic Anticipatory; Highest response ratio next (HRRN); Interval scheduling; Last In, First Out (LIFO); Job Shop Scheduling; Least-connection scheduling; Least slack time scheduling (LST); List scheduling; Lottery Scheduling; Multilevel queue; Multilevel Feedback Queue; Never queue scheduling; O(1) scheduler; Proportional Share Scheduling; Rate-monotonic scheduling (RMS); Round-robin scheduling (RR); Shortest expected delay scheduling; Shortest job next (SJN); Shortest remaining time (SRT); Staircase Deadline scheduler (SD); "Take" Scheduling; Two-level scheduling; Weighted fair queuing (WFQ); Weighted least-connection scheduling; Weighted round robin (WRR); and Group Ratio Round-Robin.

As a R/W function is processed, the HH memory 52-54 or the EXT memory 82-84 is accessed and the corresponding data is read from or written to the desired location. Once the function is complete the R/W function is removed the memory scheduler's queue. Note the completion of a R/W function may evoke another R/W function, a process for the HH processing module 50 and/or the EXT processing module 80, a file system function, and/or an I/O device functions.

The processing module scheduler 718 queues up the processes and schedules them for the HH processing module scheduler 670 and the EXT processing module scheduler 692. The HH processing module scheduler 670 schedules the processes for accessing the HH processing module 50 and the EXT processing module scheduler 722 schedules the processes for accessing the EXT processing module 80. In this example, the processes may be initiated by one or more of the applications 650-652, 700 and/or one or more of the I/O devices coupled to the drivers 65, 674, 702.

Figure 37:
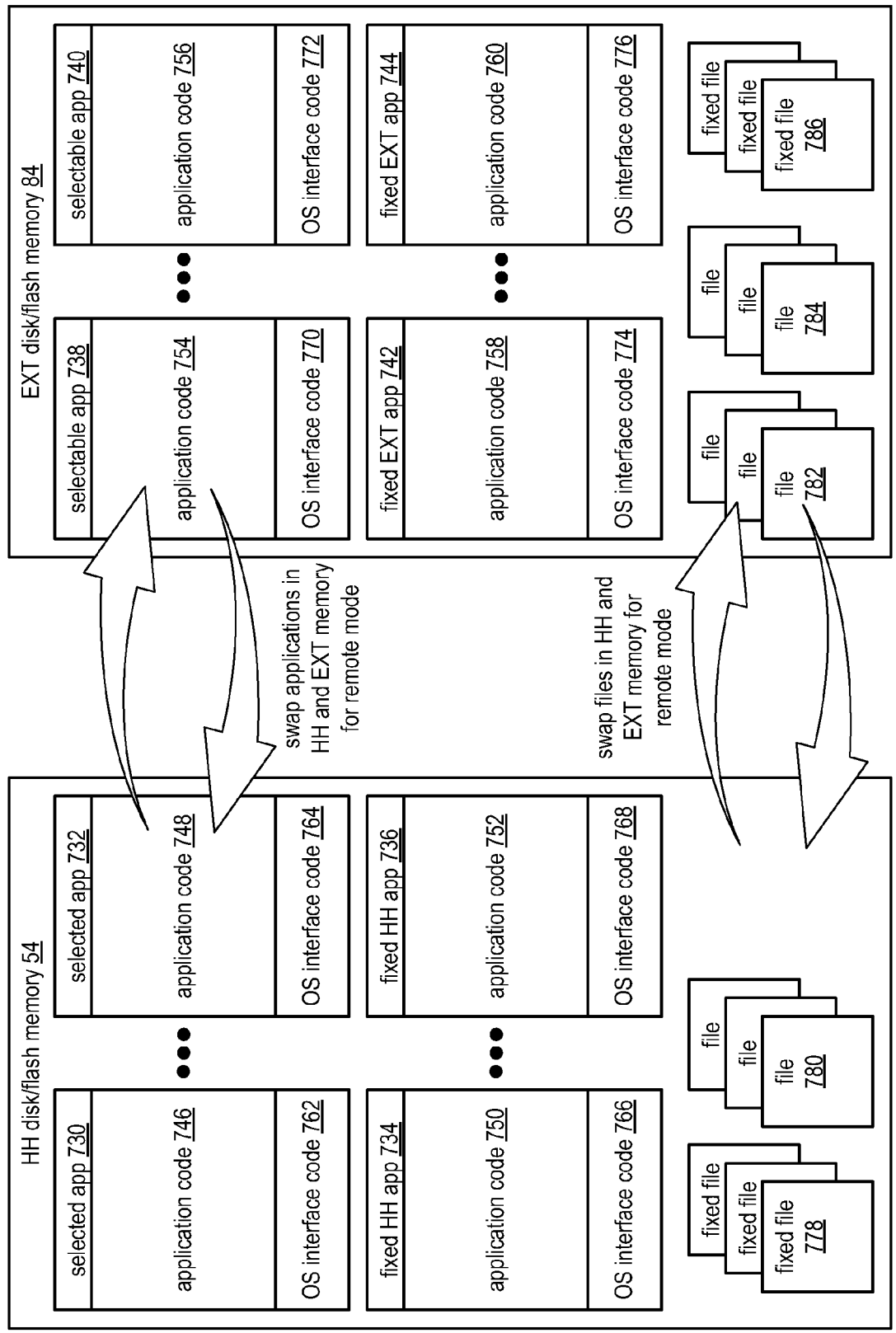
FIG. 37 is a diagram of an example of application and/or file swapping in accordance with the present invention.

FIG. 37 is a diagram of an example of application and/or file swapping between the HH hard disk/flash memory 54 and the EXT disk/flash memory 84. For a file or application transfer to occur, the handheld computing unit is in the quasi docked mode or the docked mode. In this example, the HH disk/flash memory 54 is storing one or more fixed HH applications 734-736, one or more selected applications 730-732, one or more fixed HH files 778, and one or more selected files 780. The EXT disk/flash memory 84 is storing one or more fixed EXT applications 742-744, one or more selectable applications 738-740, one or more fixed EXT files 786, and one or more selectable files 782-784.

Each of the applications 730-744 includes an applications code section 746-760 and an operating system interface code section 762-776. The application code section includes the operational instructions of the application. The operating system interface code section includes code that enables the application to communicate with the operating system, which may be an application programming interface.

In an embodiment, a fixed HH application 734-736 is an application that is only allowed to be stored on the HH memory 54 due to the nature of the application. For example, the application may be for cellular telephone communications, a calendar application, an email application, a contacts application, a favorites web sites application, a notes application, etc. A fixed HH file 778 is a file that is only allowed to be stored on the HH memory due to its corresponding application. For example, the fixed file may be a calendar, an email file, a contacts list, a favorites web sites list, a notes, etc. While these applications and files can be accessed regardless of the mode of the handheld computing unit, these applications and files reside with the handheld computing unit such that when it is in the remote mode, it has these applications and files on it, which avoids the redundancy of applications and files of current PCs and handheld devices. Note that the user can select which files and/or applications to make fixed.

In an embodiment, a selected HH application 730-732 is an application that is currently stored on the HH memory 54 but could be transferred to the EXT memory 84. For example, the application may be a video game, word processing, database, spreadsheet, digital A/V player, etc. A selected HH file 778 is a file that is currently stored on the HH memory but could be transferred to the EXT memory 84. For example, the fixed file may be a word processing document, a spreadsheet, a database record, etc.

In an embodiment, a fixed EXT application 742-744 is an application that is only allowed to be stored on the EXT memory 84 due to the nature of the application. For example, the application may be for tape drive back up, etc. A fixed EXT file 786 is a file that is only allowed to be stored on the EXT memory due to its corresponding application.

In an embodiment, a selectable EXT application 738-740 is an application that is currently stored on the EXT memory 84 but could be transferred to the HH memory 54. For example, the application may be a video game, word processing, database, spreadsheet, digital A/V player, etc. A selectable EXT file 782-784 is a file that is currently stored on the EXT memory but could be transferred to the HH memory 54. For example, the fixed file may be a word processing document, a spreadsheet, a database record, etc.

With the handheld computing unit docked to the extended computing unit a selected application 730-732 may be swapped with a selectable application 738-740. In addition, an selected file 778 may be swapped with a selectable file 782-784 as directed by the user.

Figure 38:
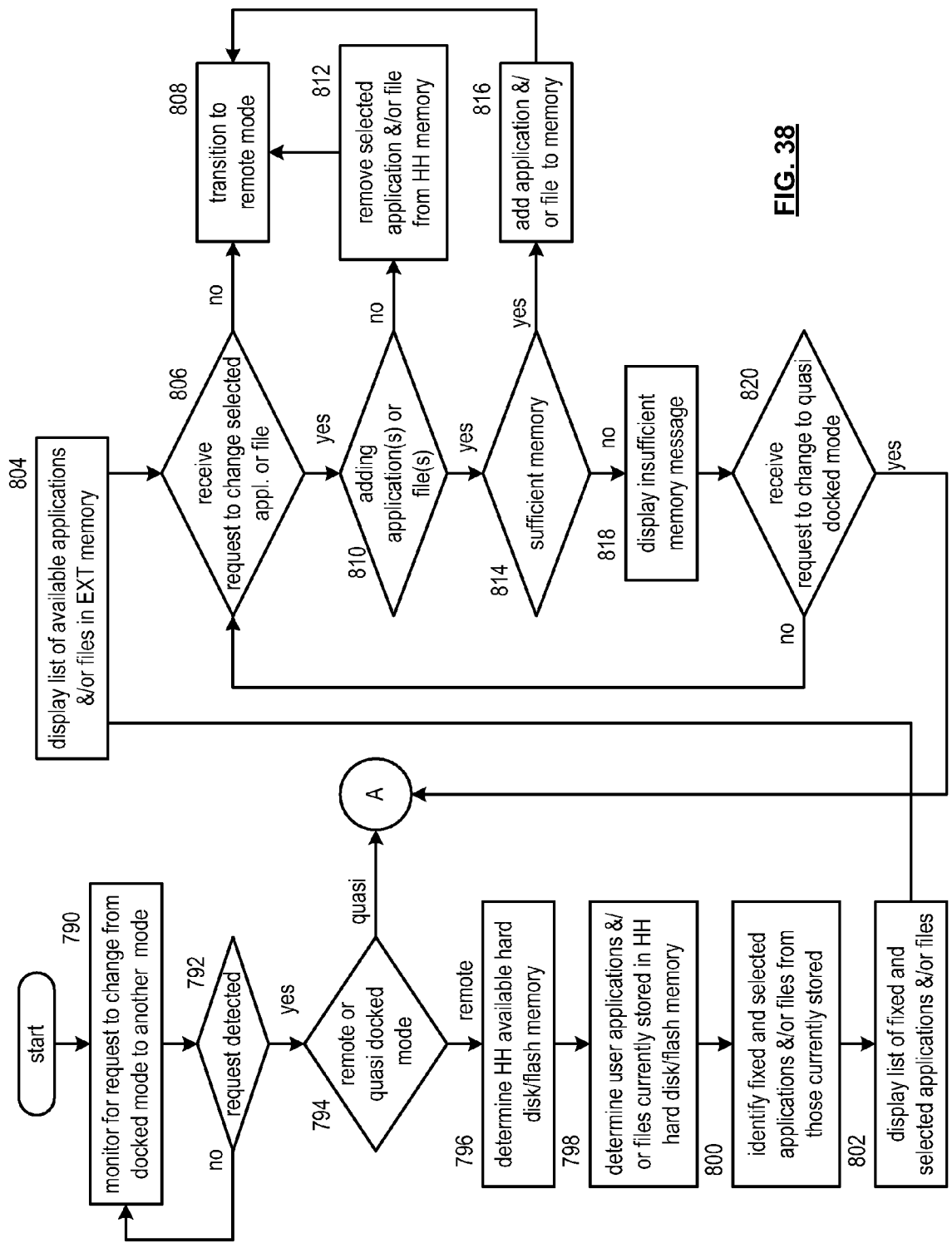
FIGS. 38 and 39 are a logic diagram of an embodiment of a method for changing from a docked mode to another mode in accordance with the present invention.
Figure 39:
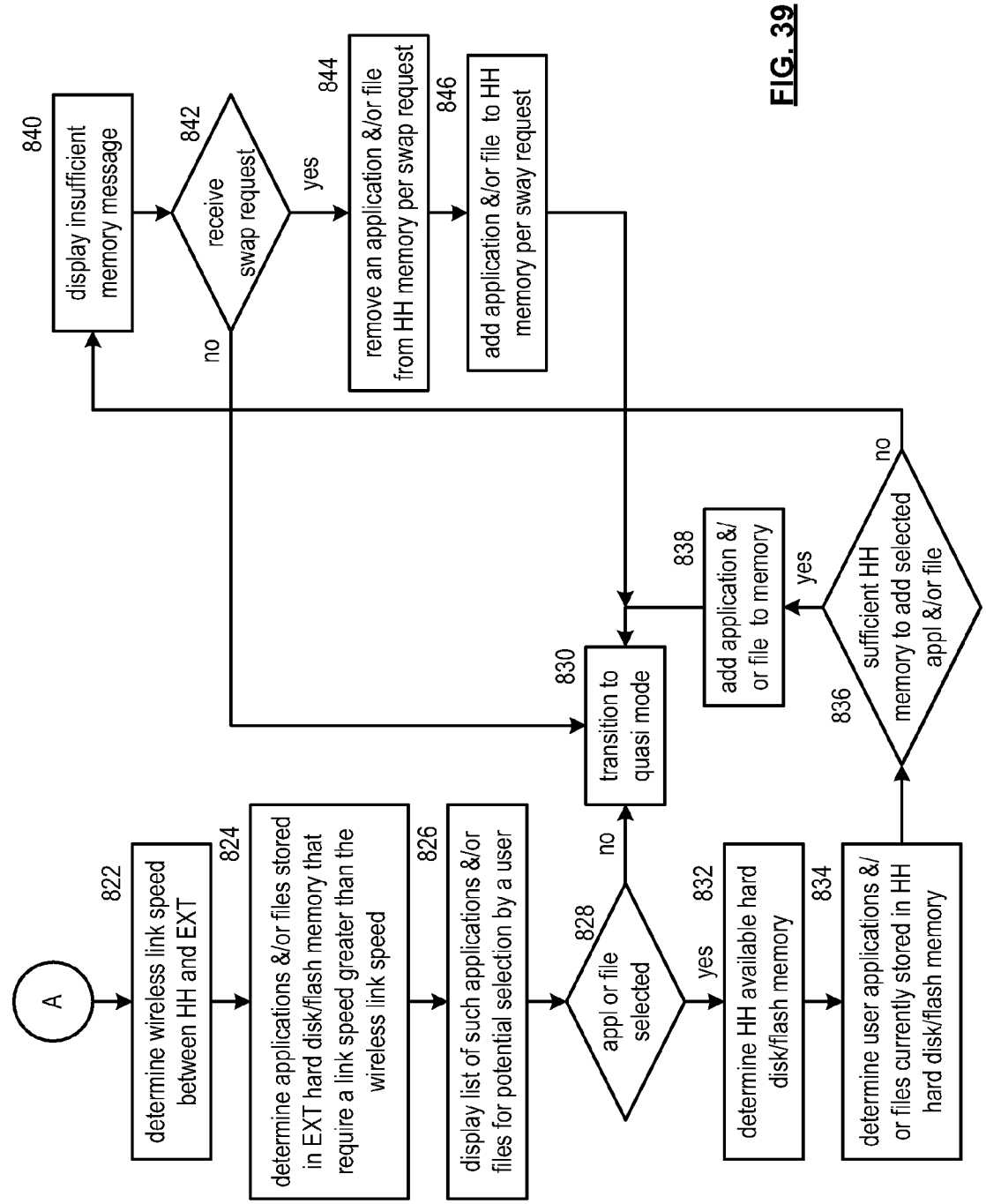

FIGS. 38 and 39 are a logic diagram of an embodiment of a method for swapping files and/or applications between the handheld computing unit and the extended computing unit at a mode change. The method begins at step 790 of FIG. 38 where the HH processing module monitors for a mode change request for changing from a docked mode to another mode. The mode change may be detected via a user input to select the remote mode or quasi docked mode, if currently in the docked mode. The mode change may alternatively be automatically detected when the handheld computing unit has changed from the docked mode to the quasi docked mode. If a change request is detected at step 792, the method continues at 794 otherwise it waits until a request is detected.

At step 794, the HH processing module 50 determines whether the handheld computing unit is to change from the docked mode to the remote mode or the quasi docked mode. For example, the user may provide an input via GUI to indicate the desired mode change or it may be automatically detected by first detecting a loss of coupling between the handheld computing unit and the extended computing unit. If the loss of coupling is detected, the handheld computing unit determines whether it can communication with the extended computing unit via an RF communication path. If yes, it is in the quasi docked mode; if not, it is in the remote mode.

When the mode change request is detected to be a change to the remote mode, the method continues at step 796 where the HH processing module determines available handheld hard disk space. The method continues at step 798 where the HH processing module determines the user applications and files stored on the handheld hard disk. The method continues at step 800 where the HH processing module identifies fixed user applications and selected user applications of the user applications and identifies fixed files and selected files of the files.

The method continues at step 802 where the HH processing module provides a list of the fixed user applications and the selected user applications. The method continues at step 804 where the HH processing module provides a list of available selectable user applications and/or selectable files stored on the extended hard disk. The method continues at step 806 where the HH processing module determines whether it has received a request to change the selected application and/or selected file. If no, the method continues at step 808 where the HH processing module facilitates the transfer to the remote mode.

If a request to change is received at step 806, the method continues at step 810 where the HH processing module determines whether the change is to delete an application and/or file or to add an application and/or file. If the change is to delete, the method continues at step 812 where the HH processing module deletes the selected application and/or selected file. The method continues at step 808 where the HH processing module facilitates the transition to the remote mode.

If the change is to add an application and/or a file, the method continues at step 814 where the HH processing module determines whether there is sufficient memory to store the new application and/or new file. If yes, the method continues at step 814 where the HH processing module adds the new application and/or file to the HH memory 54 and removes it from the EXT memory 84. Note that the HH processing module may facilitate a back up of any of the files and/or applications stored on the HH memory 54 and/or the EXT memory 84 to a back up tape, a back up hard drive, etc.

When the handheld hard disk does not have sufficient available memory to store the new application and/or new file, the method continues at step 818 where the HH processing module provides an insufficient memory message for display. In response to the message, the user may elect to not add the application and/or file to the HH memory 54 prior to going to the remote mode; the user may indicate that he/she desires to swap an application and/or with the EXT memory, or the user may desired to change to the quasi docked mode such that the application and/or file may be accessed via the RF connection. If the response is to swap an application or file, the HH processing module swaps the one of the selected user applications on the handheld hard disk with the available selectable user application on the EXT memory such that the available selectable user application is stored on the handheld hard disk and the one of the selected user applications is stored on the extended hard disk.

If the detected mode is to the quasi docked mode, the method continues at step 822 of FIG. 39 where the HH processing module determines wireless link speed between the handheld computing unit and the extended computing unit. For example, if the wireless link is in accordance with IEEE 802.11g, it may provide a link speed of up to 54 Mega-bits per second (Mbps). The method continues at step 824 where the HH processing module determines user applications and/or files stored on the extended hard disk that require a link speed greater than the wireless link rate. For example, an application may require 128 Mbps memory rate access. Note that while in the quasi docked mode, applications and/or files that have a link speed requirement less than the wireless link rate, the HH processing module can access the EXT memory via the wireless link.

The method continues at step 826 where the HH processing module provides a list of user applications and/or files that require a link speed greater than the wireless link rate for display. The method continues at step 828 where the HH processing module determines whether the user has selected one of the applications and/or files on the list for transferring to the handheld memory 54. If not, the method continues at step 830 where the HH processing module facilitates the transition to the quasi docked mode.

When a selection of one of the user applications of the list of user applications is received, the method continues at step 832 where the HH processing module determines available handheld hard disk space. The method continues at step 834 where the HH processing module determines the user applications and/or files stored on the handheld hard disk. The method continues at step 836 where the HH processing module determines whether the handheld hard disk has sufficient available memory to store the selected user application and/or file. If yes, the method continues at step 838 where the HH processing module adds the selected application and/or file to the HH memory and then proceeds to step 830.

When the handheld hard disk does not have sufficient available memory to store the selected user application and/or file, the method continues at step 840 where the HH processing module provides an insufficient memory message for display. The method continues at step 842 where the HH processing module determines whether it has received a swap request. If not, the method continues at step 830 where the HH processing module facilitates the change to the quasi docked mode.

If, however, a swap request is received, the method continues at step 844 and 846 where the HH processing module swaps the selected user application on the handheld hard disk with the selected user application on the EXT memory such that the new selected user application is stored on the handheld hard disk and the other selected user application is now stored on the extended hard disk.

Figure 40:
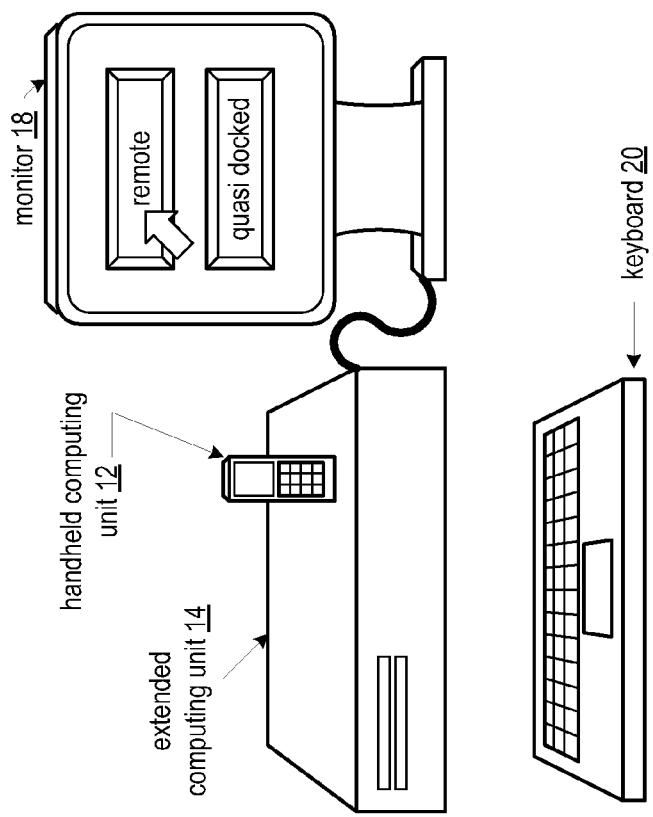
FIG. 40 is a diagram of an example of changing from a docked mode to a remote mode in accordance with the present invention.

FIG. 40 is a diagram of an example of changing from a docked mode to a remote mode. In this example, the handheld computing unit 12 is docked to the extended computing unit 14 and GUI is provided on the monitor 18 that provides a remote icon and a quasi icon for the user to select to switch modes. The selection may be made via the keyboard 20, a mouse, a touch screen, voice recognition, etc. In this example, the remote mode is selected.

Figure 41:
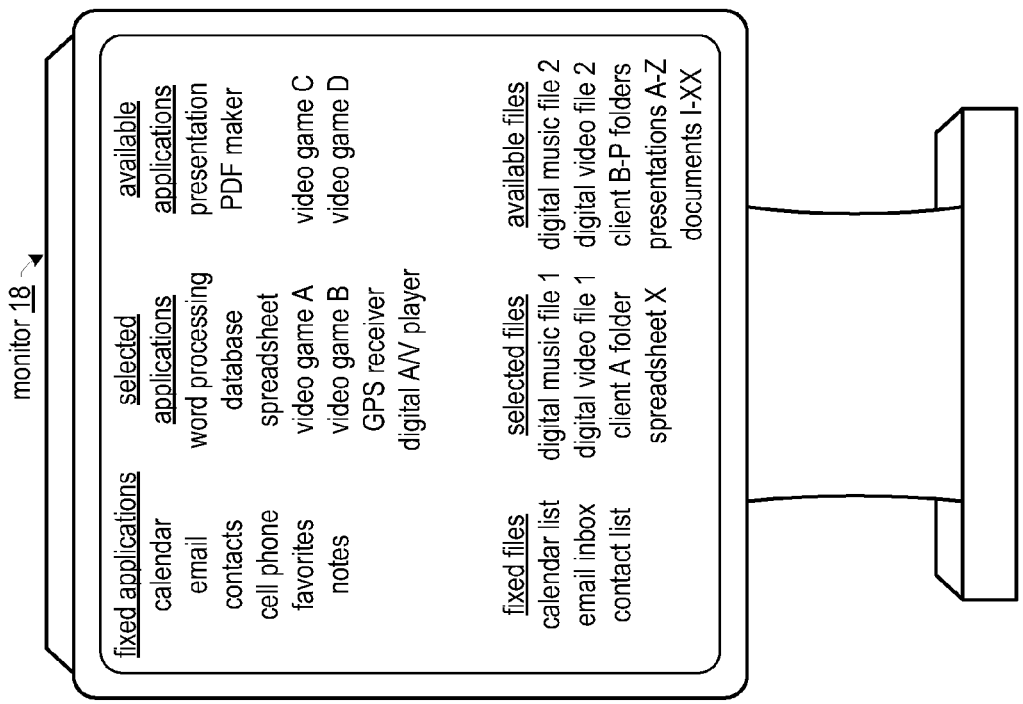
FIG. 41 is a diagram of an example of application and file status prior to changing from a docked mode to a remote mode in accordance with the present invention.

FIG. 41 is a diagram of an example of application and file status prior to changing from a docked mode to a remote mode in accordance with the example of FIG. 40. In this example, the handheld memory is storing the fixed applications of a calendar, email, contacts, cell phone, favorites, and notes. The HH memory is also storing selected applications of word processing, a database, spreadsheet, video game A, video game B, GPS receiver, and a digital A/V player. The HH memory further stores fixed files of a calendar list, an email inbox, and a control list. The HH memory further stores selected files of a digital music file 1, a digital video file 1, client A folder, a spreadsheet X.

In this example, the EXT memory is storing available selectable applications of a presentation application, a PDF maker, video game C, and video game D. The EXT memory is further storing digital music file 2, digital video file 2, clients B-P folders, presentations A-Z, and documents 1-XX.

In this example, prior to transitioning to the remote mode, the user may elect to change the applications and/or files stored on the handheld computing unit. For example, assume that the user is traveling to a client's site to make a presentation and desires only to bring the handheld computing unit. In the example of FIG. 41, the presentation application and the files generated therefrom are stored on the EXT memory. As such, the user may drag and click the presentation application and the desired presentation (e.g., presentation A) to the list of selected applications and selected files, respectively. Note that the lists may be one or more folders and/or other types of file systems. If the HH memory has enough available memory, the presentation application and the selected presentation file are added to the HH memory. If not, the user may swap out a selected application and/or file to make remove for the desired file.

Figure 42:
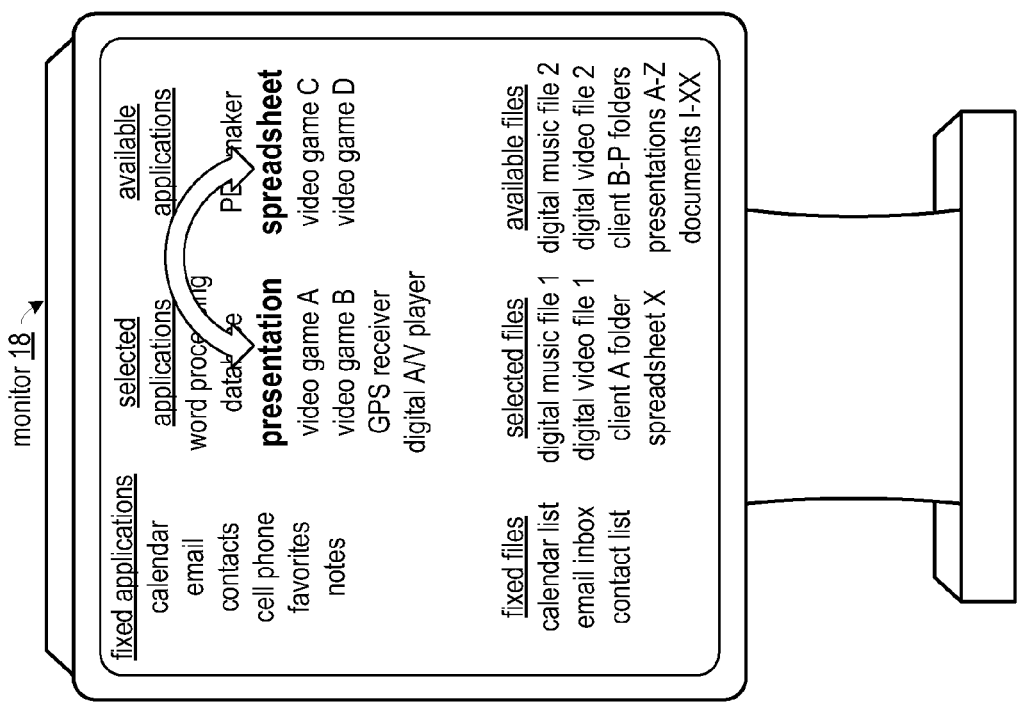
FIG. 42 is a diagram of an example of swapping an application in accordance with the present invention.

FIG. 42 is a diagram continuing with the example of FIG. 41. In this figure, the user is swapping the presentation application with the spreadsheet application. As such, the presentation application is now stored in the HH memory and the spreadsheet is stored in the EXT memory.

Figure 43:
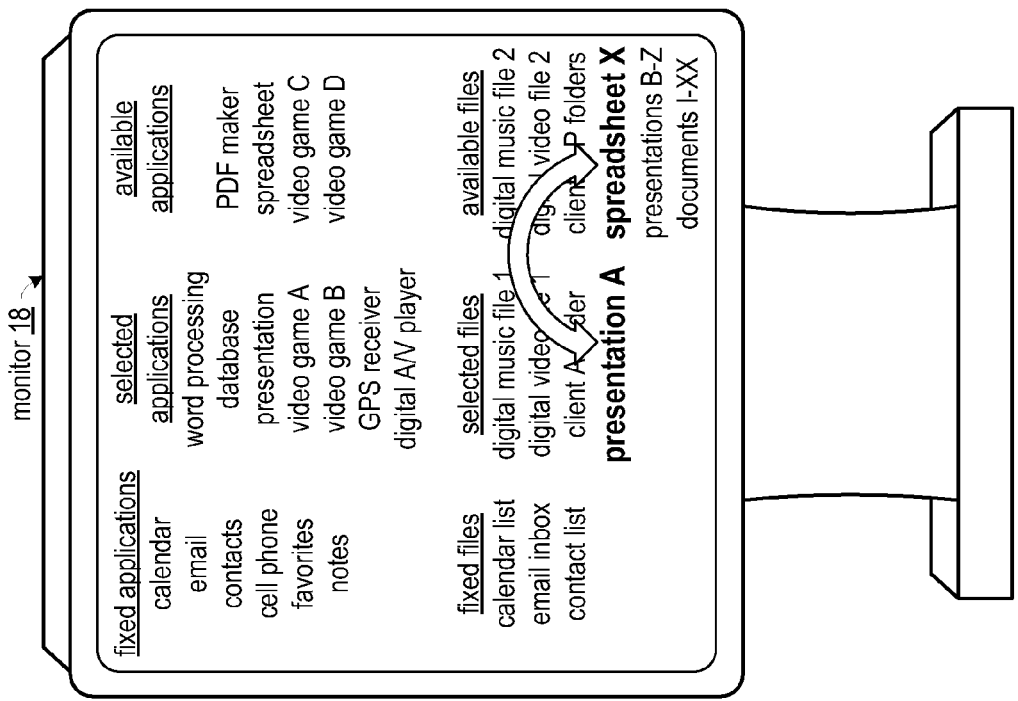
FIG. 43 is a diagram of an example of swapping a file in accordance with the present invention.

FIG. 43 is a diagram continuing with the example of FIG. 41. In this figure, the user is swapping the presentation file A with the spreadsheet file X. As such, the presentation file A is now stored in the HH memory and the spreadsheet file X is stored in the EXT memory.

Figure 44:
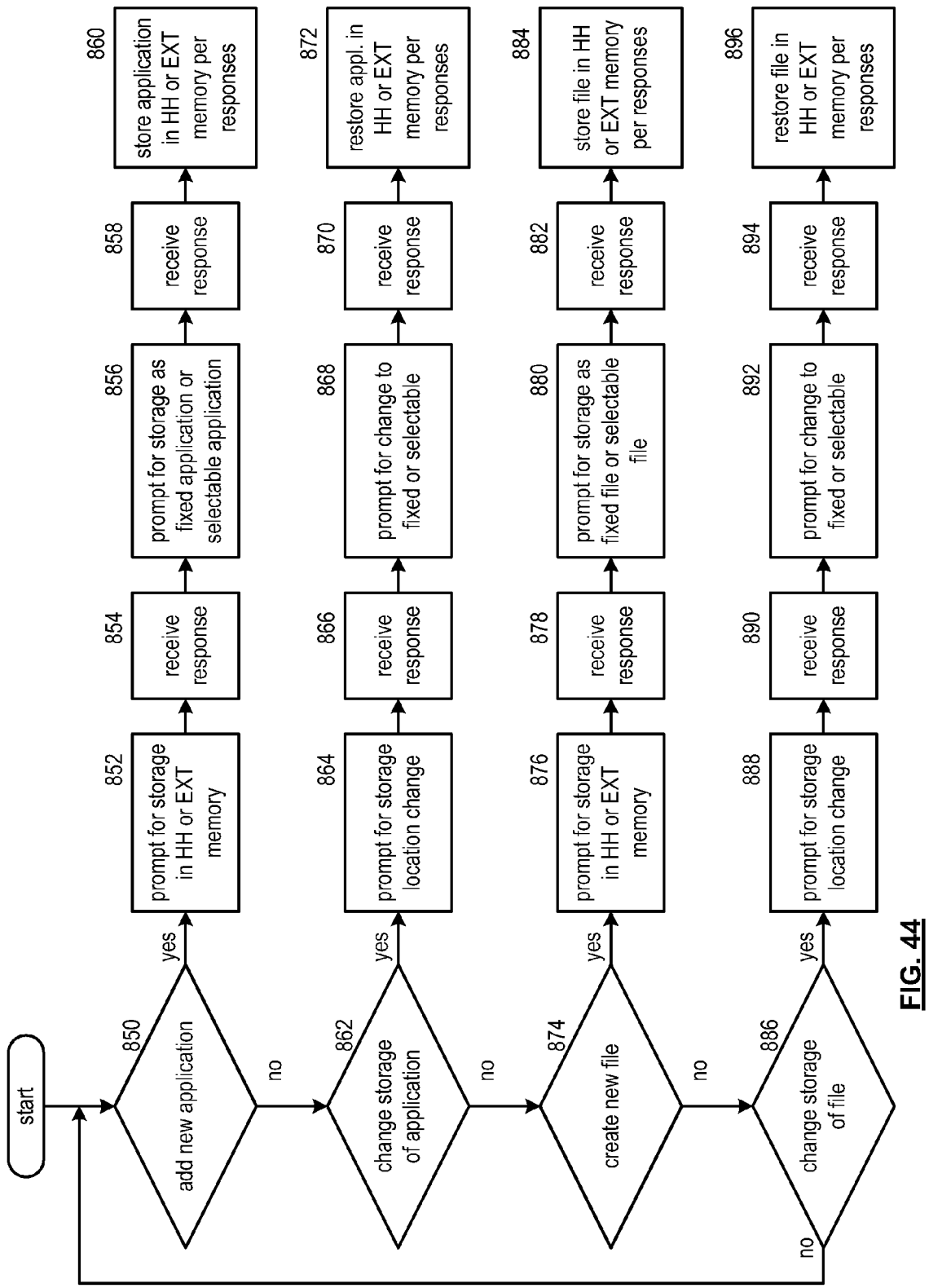
FIG. 44 is a logic diagram of an embodiment of a method for creating and/or changing an application and/or file in accordance with the present invention.

FIG. 44 is a logic diagram of an embodiment of a method for creating and/or changing an application and/or file that begins at step 850 where the HH processing module determines whether a new application is to be stored in the computing device. If yes, the method continues at step 852 where the HH processing module provides a message regarding whether the new application is to be stored in the HH memory or the EXT memory. The method continues at step 854 where the HH processing module receives a response to the storage message. The method continues at step 856 where the HH processing module provides a message prompt regarding whether new application should be stored as a fixed application or a selectable application. The method continues at step 858 where the HH processing module receives a response to the storage type message. The method continues at step 860 where the HH processing module stores the new application as a fixed or selectable application in the HH memory or in the EXT memory based on the responses.

At step 862, the HH processing module determines whether change in storage of an application is to occur. If yes, the method continues at step 864 where the HH processing module provides a message regarding a change of memory location regarding the application. The method continues at step 866 where the HH processing module receives a response to the change storage location message. The method continues at step 868 where the HH processing module provides a message prompt regarding whether the application storage type should change. The method continues at step 870 where the HH processing module receives a response to the storage type message. The method continues at step 872 where the HH processing module stores the application as a fixed or selectable application in the HH memory or in the EXT memory based on the responses.

At step 874, the HH processing module determines whether a new file is to be stored in the computing device. If yes, the method continues at step 876 where the HH processing module provides a message regarding whether the new file is to be stored in the HH memory or the EXT memory. The method continues at step 878 where the HH processing module receives a response to the storage message. The method continues at step 880 where the HH processing module provides a message prompt regarding whether new file should be stored as a fixed file or a selectable file. The method continues at step 882 where the HH processing module receives a response to the storage type message. The method continues at step 884 where the HH processing module stores the new file as a fixed or selectable file in the HH memory or in the EXT memory based on the responses.

At step 886, the HH processing module determines whether change in storage of a file is to occur. If yes, the method continues at step 888 where the HH processing module provides a message regarding a change of memory location regarding the file. The method continues at step 890 where the HH processing module receives a response to the change storage location message. The method continues at step 892 where the HH processing module provides a message prompt regarding whether the file storage type should change. The method continues at step 894 where the HH processing module receives a response to the storage type message. The method continues at step 896 where the HH processing module stores the file as a fixed or selectable file in the HH memory or in the EXT memory based on the responses.

Figure 45:
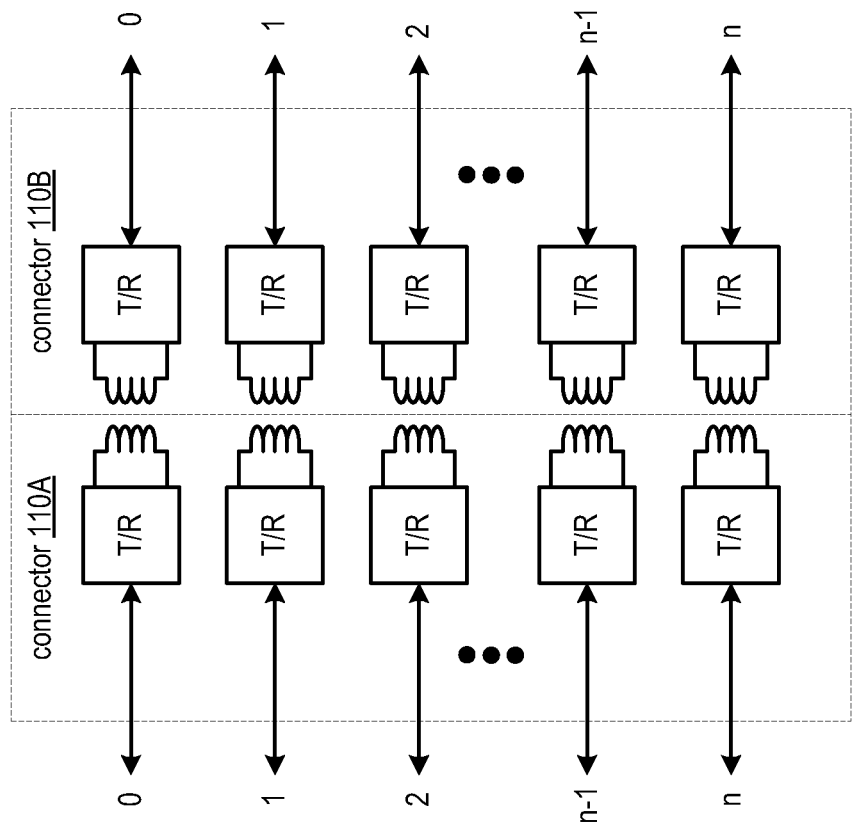
FIG. 45 is a schematic block diagram of an embodiment of a connector structure in accordance with the present invention.

FIG. 45 is a schematic block diagram of an embodiment of a connector structure that may be used to connect the handheld computing unit to the extended computing unit. Alternatively, or in addition to, the connector structure may be used on connection on-chip components to off-chip components within the handheld computing unit and/or in the extended computing. In this embodiment, the connector 110A and 110B include a plurality of RF transceivers that may transceive signals at 60 GHz or other microwave frequency. Such an RF connection 110 may be implemented in accordance with the teachings of co-pending patent applications (1) RF BUS CONTROLLER, having a serial number of 11/700,285, and a filing date of Jan. 31, 2007; (2) INTRA-DEVICE RF BUS AND CONTROL THEREOF, having a Ser. No. 11/700,421, and a filing date of Jan. 31, 2007; (3) SHARED RF BUS STRUCTURE, having a Ser. No. 11/700,517, and a filing date of Jan. 31, 2007; (4) RF TRANSCEIVER DEVICE WITH RF BUS, having a Ser. No. 11/700,592, and a filing date of Jan. 31, 2007; and (5) RF BUS ACCESS PROTOCOL AND TRANSCEIVER, having a Ser. No. 11/700,591, and a filing date of Jan. 31, 2007.

Figure 46:
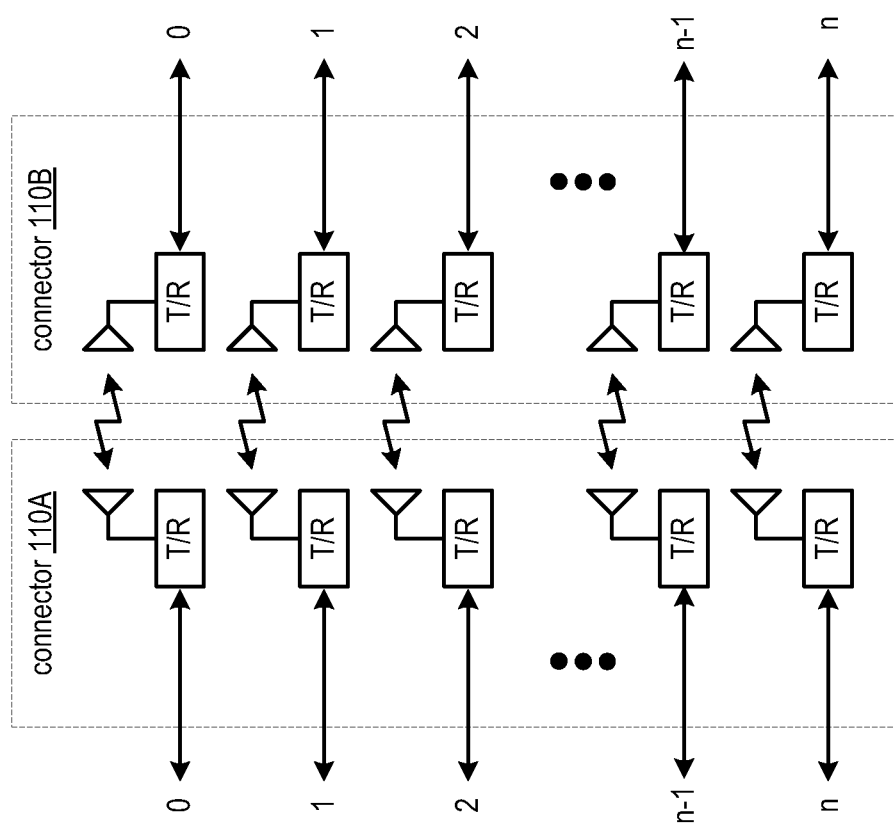
FIG. 46 is a schematic block diagram of another embodiment of a connector structure in accordance with the present invention.

FIG. 46 is a schematic block diagram of another embodiment of a connector structure 110A and 110B. The connector structure may be used to connect the handheld computing unit to the extended computing unit. Alternatively, or in addition to, the connector structure may be used on connection on-chip components to off-chip components within the handheld computing unit and/or in the extended computing. In this embodiment, the connector 110A and 110B include a plurality of magnetic transceivers to provide a plurality of near field communication paths.

Figure 47:
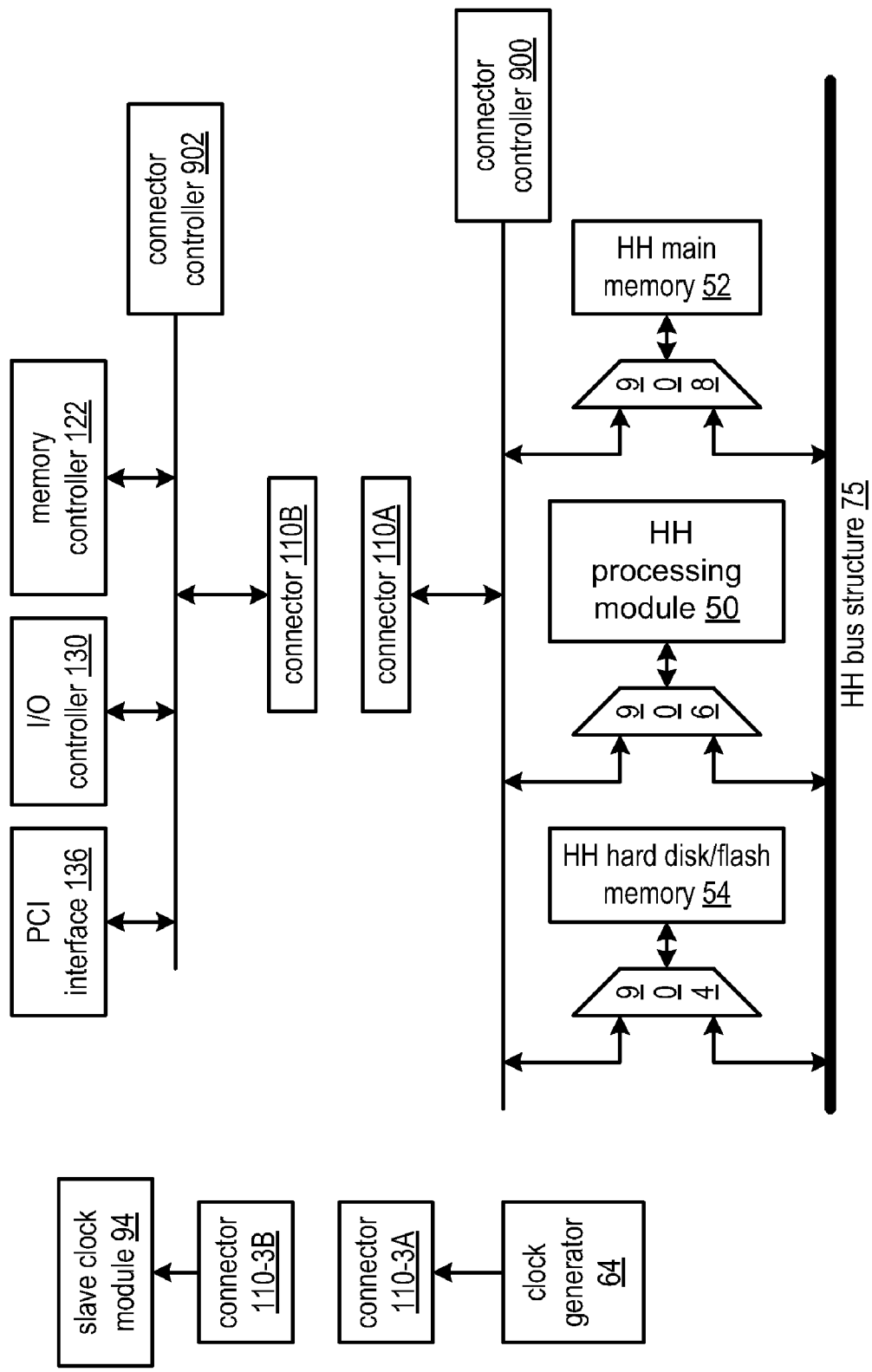
FIG. 47 is a schematic block diagram of another embodiment of a connector structure in accordance with the present invention.

FIG. 47 is a schematic block diagram of another embodiment of a connector structure 110-3, where the connection between the clock generator circuit 64 and the slave clock module 94 may be implemented using a standard male/female connector. The remainder of the connector structure 110A and 110B may be implemented using one of the embodiments of FIG. 45 or 46. In addition, the bus structure may include connector controllers 900 and 902 that control access the respective connectors 110A and 110B. Further, multiplexers may be included to switch the coupling of the HH memory 54, the HH processing module 50, and the HH main memory 52 to the HH bus structure 75 and/or to the connector 110A.

Note that many of the examples and/or embodiments were discussed with the HH processing module performing the corresponding function. In an alternative embodiment, the EXT processing module may perform the function when the handheld processing module is in the docked mode. As another alternative embodiment, the EXT processing module and the HH processing module function as co-processing modules to perform the function when the handheld processing module is in the docked mode.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An integrated circuit (IC) for a handheld computing unit to facilitate docking to an extended computing unit in one of a plurality of docking modes, the IC comprises:
    a processing module;
    on-chip memory;
    one or more block input/output (I/O) interfaces for coupling to one or more off-chip block I/O devices;
    one or more character I/O interfaces for coupling to one or more off-chip character I/O devices when active;
    a main memory interface for coupling to off-chip main memory;
    a baseband processing module coupled to convert outbound data into an outbound symbol stream and to convert an inbound symbol stream into inbound data;
    a radio frequency (RF) section coupled to convert the outbound symbol stream into an outbound RF signal and to convert an inbound RF signal into the inbound symbol stream;
    a processing module interface for coupling the processing module to an off-chip connection structure, wherein, when the handheld computing unit that includes the IC is docked to the extended computing unit in the one of a plurality of docking modes, the off-chip connection structure couples the handheld computing unit to the extended computing unit wherein,
        when the IC is in a remote mode of the one of the plurality of docking modes with respect to the extended computing unit, the one or more character I/O interfaces are active and the processing module interface is inactive,
        when the IC is in the docked mode of the one of the plurality of docking modes, at least one of the one or more character I/O interfaces is inactive and the processing module interface is active; and
        when the IC is in a quasi docked mode of the one of the plurality of docking modes, the IC establishes an RF communication path with the extended computing unit and at least one of the one or more block I/O interfaces are active; and
    an IC bus structure coupled to the processing module, the on-chip memory, the one or more block I/O interfaces, the one or more character I/O interfaces, the main memory interface, and the baseband processing module.

2. The IC of claim 1 wherein:
    the one or more block I/O interfaces including at least one of:
        a disk drive interface; and
        flash memory interface;
    the one or more character I/O interfaces including at least one of:
        a data input interface;
        a display interface;
        a video codec;
        an audio codec;
        a camera interface; and
        a camcorder interface.

3. The IC of claim 1, wherein the baseband processing module and RF section function to provide one or more of:
    wireless local area network (WLAN) connectivity; and
    cellular telephone connectivity.

4. The IC of claim 1 further comprises:
    a clock generator coupled to the connector structure, wherein the clock generator generates a master clock signal and one or more handheld clock signals, and wherein the clock generator generates the master clock signal and provides the master clock signal to the connector structure when the IC is in the docked mode.

5. The IC of claim 1, wherein the processing module interface comprises one or more of:
    an on-chip portion of an on-chip to off-chip RF connector;
    one or more IC pins; and
    an on-chip portion of an on-chip to off-chip electromagnetic connector.

6. The IC of claim 1 further comprises:
    a read only memory (ROM) that stores basic input/output system (BIOS), wherein a handheld computing unit incorporating the IC is booted in accordance with the BIOS when the IC is in the remote mode, and the handheld computing unit and an extended computing unit are booted as a combined unit when the IC is in the docked mode.

7. An integrated circuit (IC) for a handheld computing unit to facilitate docking to an extended computing unit in one of a plurality of docking modes, the IC comprises:
- a processing module;
- on-chip memory;
- one or more block input/output (I/O) interfaces for coupling to one or more off-chip block I/O devices;
- one or more character I/O interfaces for coupling to one or more off-chip character I/O devices when active;
- a main memory interface for coupling to off-chip main memory;
- a memory controller coupled to the processing module and the main memory interface;
- a baseband processing module coupled to convert outbound data into an outbound symbol stream and to convert an inbound symbol stream into inbound data;
- a radio frequency (RF) section coupled to convert the outbound symbol stream into an outbound RF signal and to convert an inbound RF signal into the inbound symbol stream;
- a connector interface for coupling the memory controller to an off-chip connection structure, wherein, when the handheld computing unit that includes the IC is docked to the extended computing unit, the off-chip connection structure couples the handheld computing unit to the extended computing unit, wherein,
    - when the IC is in a remote mode of the one of the plurality of docking modes with respect to the extended computing unit, the one or more character I/O interfaces are active and the connector interface is inactive;
    - when the IC is in the docked mode of the one of the plurality of docking modes, at least one of the one or more character I/O interfaces is inactive and the connector interface is active; and
    - when the IC is in a quasi docked mode of the one of the plurality of docking modes, the IC establishes an RF communication path with the extended computing unit and at least one of the one or more block I/O interfaces are active; and
- an IC bus structure coupled to the memory controller, the one or more block I/O interfaces, the one or more character I/O interfaces, the on-chip memory, and the baseband processing module.

8. The IC of claim 7 wherein:
the one or more block I/O interfaces including at least one of:
- a disk drive interface; and
- flash memory interface;

the one or more character I/O interfaces including at least one of:
- a data input interface;
- a display interface;
- a video codec;
- an audio codec;
- a camera interface; and
- a camcorder interface.

9. The IC of claim 7, wherein the baseband processing module and RF section function to provide one or more of:
- wireless local area network (WLAN) connectivity; and
- cellular telephone connectivity.

10. The IC of claim 7 further comprises:
a clock generator coupled to the connector structure, wherein the clock generator generates a master clock signal and one or more handheld clock signals, and wherein the clock generator generates the master clock signal and provides the master clock signal to the connector structure when the IC is in the docked mode.

11. The IC of claim 7, wherein the connector interface comprises one or more of:
- an on-chip portion of an on-chip to off-chip RF connector;
- one or more IC pins; and
- an on-chip portion of an on-chip to off-chip electromagnetic connector.

12. The IC of claim 7 further comprises:
a read only memory (ROM) that stores basic input/output system (BIOS), wherein a handheld computing unit incorporating the IC is booted in accordance with the BIOS when the IC is in the remote mode, and the handheld computing unit and an extended computing unit are booted as a combined unit when the IC is in the docked mode.

13. An integrated circuit (IC) for a handheld computing unit to facilitate docking to an extended computing unit in one of a plurality of docking modes, the IC comprises:
- a processing module;
- on-chip memory;
- one or more block input/output (I/O) interfaces for coupling to one or more off-chip block I/O devices;
- one or more character I/O interfaces for coupling to one or more off-chip character I/O devices when active;
- a main memory interface for coupling to off-chip main memory;
- a memory controller coupled to the processing module and the main memory interface;
- a baseband processing module coupled to convert outbound data into an outbound symbol stream and to convert an inbound symbol stream into inbound data;
- a radio frequency (RF) section coupled to convert the outbound symbol stream into an outbound RF signal and to convert an inbound RF signal into the inbound symbol stream;
- an IC bus structure coupled to the on-chip memory, the main memory interface, the processing module, the memory controller, the one or more block I/O interfaces, the one or more character I/O interfaces, and the baseband processing module; and
- a connector interface for coupling the IC bus structure to an off-chip connection structure, wherein, when the handheld computing unit that includes the IC is docked to the extended computing unit, the off-chip connection structure couples the handheld computing unit to the extended computing unit, wherein,
    - when the IC is in a remote mode of the one of the plurality of docking modes with respect to the extended computing unit, the one or more character I/O interfaces are active and the connector interface is inactive;
    - when the IC is in the docked mode of the one of the plurality of docking modes, at least one of the one or more character I/O interfaces is inactive and the connector interface is active; and
    - when the IC is in a quasi docked mode of the one of the plurality of docking modes, the IC establishes an RF communication path with the extended computing unit and at least one of the one or more block I/O interfaces are active.

14. The IC of claim 13 wherein:
the one or more block I/O interfaces including at least one of:
a disk drive interface; and
flash memory interface;
the one or more character I/O interfaces including at least one of:
a data input interface;
a display interface;
a video codec;
an audio codec;
a camera interface; and
a camcorder interface.

15. The IC of claim 13, wherein the baseband processing module and RF section function to provide one or more of:
wireless local area network (WLAN) connectivity; and
cellular telephone connectivity.

16. The IC of claim 13 further comprises:
a clock generator coupled to the connector structure, wherein the clock generator generates a master clock signal and one or more handheld clock signals, and wherein the clock generator generates the master clock signal and provides the master clock signal to the connector structure when the IC is in the docked mode.

17. The IC of claim 13, wherein the connector interface comprises one or more of:
an on-chip portion of an on-chip to off-chip RF connector;
one or more IC pins; and
an on-chip portion of an on-chip to off-chip electromagnetic connector.

18. The IC of claim 13 further comprises:
a read only memory (ROM) that stores basic input/output system (BIOS), wherein a handheld computing unit incorporating the IC is booted in accordance with the BIOS when the IC is in the remote mode, and the handheld computing unit and an extended computing unit are booted as a combined unit when the IC is in the docked mode.

* * * * *